US010380228B2

(12) United States Patent
Lee

(10) Patent No.: US 10,380,228 B2
(45) Date of Patent: Aug. 13, 2019

(54) OUTPUT GENERATION BASED ON SEMANTIC EXPRESSIONS

(71) Applicant: Microsoft Technology Licensing, LLC, Redmond, WA (US)

(72) Inventor: David Lee, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/430,232

(22) Filed: Feb. 10, 2017

(65) Prior Publication Data

US 2018/0232340 A1   Aug. 16, 2018

(51) Int. Cl.
*G06F 17/21* (2006.01)
*G06F 17/22* (2006.01)
(Continued)

(52) U.S. Cl.
CPC .......... *G06F 17/212* (2013.01); *G06F 17/211* (2013.01); *G06F 17/248* (2013.01);
(Continued)

(58) Field of Classification Search
CPC .......... G06F 17/30864; G06F 17/2247; G06F 17/211–212; G06F 17/30011;
(Continued)

(56) References Cited

U.S. PATENT DOCUMENTS 5,031,121 A   7/1991 Iwai et al.
5,517,621 A   5/1996 Fukui et al.
(Continued)

FOREIGN PATENT DOCUMENTS

CN   1731391 A   2/2006
CN   102360368 A   2/2012
(Continued)

OTHER PUBLICATIONS

Graf, Winfried H., "Towards a Reference Model for intelligent Multimedia Layout", In Proceedings of 12th European Conference on Artificial Intelligence, Aug. 11, 1996, 7 pages.
(Continued)

*Primary Examiner* — Quoc A Tran
(74) *Attorney, Agent, or Firm* — Merchant & Gould P.C.

(57) ABSTRACT

Disclosed embodiments generally relate to logically describing and modeling the layout of an output (e.g., a document or a presentation) by capturing author intent. Author intent can be captured based on the author's selection of visual exemplars (e.g., lists, grids, collages, etc.) with which to express content. Each visual exemplar identifies one or more semantic expressions (e.g., specific, often implied, relationships that are represented in visual exemplars of content) that are represented by those visual exemplars. The identified semantic expressions form a contract that can be observed in any generated output. The output can be formatted and laid out in a variety of different ways (e.g., for a variety of different presentation devices) to provide aesthetic and semantic efficiency in the generated output while maintaining the intent of the author.

20 Claims, 25 Drawing Sheets

(51) Int. Cl.
  *G06F 17/24* (2006.01)
  *G06F 17/27* (2006.01)
  *G06Q 30/02* (2012.01)
  *G06F 17/00* (2019.01)
(52) U.S. Cl.
  CPC ...... *G06F 17/2785* (2013.01); *G06F 17/2247* (2013.01); *G06Q 30/02* (2013.01)
(58) Field of Classification Search
  CPC .. G06Q 30/02; G06Q 3/0482; G06Q 3/04842; G06Q 3/0484
  See application file for complete search history.

(56) References Cited

U.S. PATENT DOCUMENTS

| | | | |
|---|---|---|---|
| 5,742,837 | A | 4/1998 | Fukui et al. |
| 5,911,146 | A | 6/1999 | Johari et al. |
| 6,392,671 | B1 | 5/2002 | Glaser |
| 6,694,053 | B1 | 2/2004 | Burns et al. |
| 6,711,291 | B1 | 3/2004 | Stubler et al. |
| 6,775,675 | B1 | 8/2004 | Nwabueze et al. |
| 7,064,759 | B1 | 6/2006 | Feierbach et al. |
| 7,133,571 | B2 | 11/2006 | Cheatle |
| 7,260,245 | B2 | 8/2007 | Harrington et al. |
| 7,274,832 | B2 | 9/2007 | Nicponski |
| 7,290,006 | B2 | 10/2007 | Xie et al. |
| 7,308,116 | B2 | 12/2007 | Harrington et al. |
| 7,466,875 | B1 | 12/2008 | Siegel et al. |
| 7,492,949 | B1 * | 2/2009 | Jamieson ............... G06F 17/248 382/217 |
| 7,516,401 | B2 | 4/2009 | Chen et al. |
| 7,561,722 | B2 | 7/2009 | Harrington |
| 7,609,847 | B2 | 10/2009 | Widdowson et al. |
| 7,698,340 | B2 | 4/2010 | Ye et al. |
| 7,743,323 | B1 | 6/2010 | Rodriguez |
| 7,895,197 | B2 | 2/2011 | Meyer et al. |
| 7,912,246 | B1 | 3/2011 | Moon et al. |
| 7,978,918 | B2 | 7/2011 | Scalise et al. |
| 8,175,376 | B2 | 5/2012 | Marchesotti et al. |
| 8,363,984 | B1 | 1/2013 | Goldman |
| 8,379,055 | B2 | 2/2013 | Lam et al. |
| 8,406,515 | B2 | 3/2013 | Cheatle |
| 8,462,394 | B2 | 6/2013 | Fan et al. |
| 8,479,092 | B1 | 7/2013 | Pandey |
| 8,538,982 | B2 | 9/2013 | Effrat et al. |
| 8,539,344 | B2 | 9/2013 | Hull et al. |
| 8,572,209 | B2 | 10/2013 | Healey et al. |
| 8,577,913 | B1 | 11/2013 | Hansson et al. |
| 8,660,351 | B2 | 2/2014 | Tang |
| 8,700,604 | B2 | 4/2014 | Roseman et al. |
| 8,849,725 | B2 | 9/2014 | Duan et al. |
| 8,990,140 | B2 | 3/2015 | Michelstein et al. |
| 8,990,235 | B2 | 3/2015 | King et al. |
| 9,009,092 | B2 | 4/2015 | Michelstein et al. |
| 9,208,216 | B2 | 12/2015 | Michelstein et al. |
| 9,595,298 | B2 | 3/2017 | Lee et al. |
| 10,031,893 | B2 | 7/2018 | Lee et al. |
| 2002/0054174 | A1 | 5/2002 | Abbott et al. |
| 2002/0113801 | A1 | 8/2002 | Reavy et al. |
| 2003/0056177 | A1 | 3/2003 | Nara et al. |
| 2003/0080995 | A1 | 5/2003 | Tenenbaum et al. |
| 2003/0174869 | A1 | 9/2003 | Suarez |
| 2003/0202105 | A1 | 10/2003 | Gaubatz et al. |
| 2004/0013302 | A1 | 1/2004 | Ma et al. |
| 2004/0024613 | A1 | 2/2004 | Harnngton et al. |
| 2004/0130566 | A1 | 7/2004 | Banerjee et al. |
| 2004/0133848 | A1 * | 7/2004 | Hunt ............... G06F 17/30905 715/273 |
| 2004/0205643 | A1 | 10/2004 | Harrington |
| 2004/0243930 | A1 | 12/2004 | Schowtka et al. |
| 2005/0060664 | A1 | 3/2005 | Rogers |
| 2005/0089196 | A1 | 4/2005 | Gu et al. |
| 2005/0097463 | A1 | 5/2005 | Yu |
| 2005/0125725 | A1 | 6/2005 | Gatt |
| 2005/0157926 | A1 | 7/2005 | Moravec et al. |
| 2005/0180595 | A1 | 8/2005 | Horii et al. |
| 2006/0044324 | A1 | 3/2006 | Shum et al. |
| 2006/0048042 | A1 | 3/2006 | Sembower et al. |
| 2006/0085466 | A1 | 4/2006 | Ye et al. |
| 2006/0104511 | A1 | 5/2006 | Guo et al. |
| 2006/0150088 | A1 | 7/2006 | Kraft et al. |
| 2006/0200759 | A1 | 9/2006 | Agrawala et al. |
| 2007/0027830 | A1 | 2/2007 | Simons et al. |
| 2007/0028165 | A1 | 2/2007 | Cole |
| 2007/0064278 | A1 | 3/2007 | Sugimoto |
| 2007/0070408 | A1 | 3/2007 | Ono et al. |
| 2007/0101251 | A1 | 5/2007 | Lee et al. |
| 2007/0156757 | A1 | 7/2007 | Tang et al. |
| 2007/0174291 | A1 | 7/2007 | Cooper et al. |
| 2007/0174307 | A1 | 7/2007 | Villaron et al. |
| 2007/0189615 | A1 | 8/2007 | Liu et al. |
| 2007/0204220 | A1 | 8/2007 | Petrov Nickolov et al. |
| 2007/0225996 | A1 | 9/2007 | Haberman et al. |
| 2007/0257929 | A1 | 11/2007 | Wade et al. |
| 2007/0294238 | A1 | 12/2007 | Citron et al. |
| 2007/0299821 | A1 | 12/2007 | Mccully et al. |
| 2007/0300185 | A1 | 12/2007 | Macbeth et al. |
| 2008/0007785 | A1 | 1/2008 | Hashii et al. |
| 2008/0092057 | A1 | 4/2008 | Monson et al. |
| 2008/0120538 | A1 | 5/2008 | Kurz et al. |
| 2008/0141171 | A1 | 6/2008 | Schowtka et al. |
| 2008/0205712 | A1 | 8/2008 | Ionita et al. |
| 2008/0245211 | A1 | 10/2008 | Lemons |
| 2008/0292207 | A1 | 11/2008 | Kang |
| 2008/0301126 | A1 | 12/2008 | Asai |
| 2009/0079764 | A1 | 3/2009 | Lin et al. |
| 2009/0150364 | A1 | 6/2009 | Melander et al. |
| 2009/0240677 | A1 | 9/2009 | Parekh et al. |
| 2009/0278937 | A1 | 11/2009 | Botchen et al. |
| 2009/0287680 | A1 | 11/2009 | Paek et al. |
| 2009/0309894 | A1 | 12/2009 | Lam et al. |
| 2009/0319555 | A1 | 12/2009 | Ragno et al. |
| 2009/0324068 | A1 | 12/2009 | Yamakawa |
| 2010/0017704 | A1 | 1/2010 | Jaffe et al. |
| 2010/0036717 | A1 | 2/2010 | Trest |
| 2010/0036828 | A1 | 2/2010 | Carmel et al. |
| 2010/0037273 | A1 | 2/2010 | Dressel et al. |
| 2010/0046842 | A1 | 2/2010 | Conwell |
| 2010/0088605 | A1 | 4/2010 | Livshin et al. |
| 2010/0153841 | A1 | 6/2010 | Haug et al. |
| 2010/0156919 | A1 | 6/2010 | Bala et al. |
| 2010/0251086 | A1 | 9/2010 | Haumont et al. |
| 2010/0318888 | A1 | 12/2010 | Leshner et al. |
| 2010/0328725 | A1 | 12/2010 | Gaucas et al. |
| 2011/0016421 | A1 | 1/2011 | Krupka et al. |
| 2011/0029635 | A1 | 2/2011 | Shkurko et al. |
| 2011/0029914 | A1 | 2/2011 | Whitby et al. |
| 2011/0052081 | A1 | 3/2011 | Onoe et al. |
| 2011/0055722 | A1 | 3/2011 | Ludwig |
| 2011/0060761 | A1 | 3/2011 | Fouts |
| 2011/0069085 | A1 | 3/2011 | Weber et al. |
| 2011/0125831 | A1 | 5/2011 | Adelman |
| 2011/0157226 | A1 | 6/2011 | Ptucha et al. |
| 2011/0158510 | A1 | 6/2011 | Aguilar et al. |
| 2011/0161308 | A1 | 6/2011 | Andersen et al. |
| 2011/0169835 | A1 | 7/2011 | Cardno et al. |
| 2011/0231754 | A1 | 9/2011 | Campbell et al. |
| 2011/0305397 | A1 | 12/2011 | Piramuthu et al. |
| 2012/0007900 | A1 | 1/2012 | Murai et al. |
| 2012/0053986 | A1 | 3/2012 | Cardno et al. |
| 2012/0059838 | A1 | 3/2012 | Berntson et al. |
| 2012/0079400 | A1 | 3/2012 | Nauerz et al. |
| 2012/0095863 | A1 | 4/2012 | Schiff et al. |
| 2012/0099158 | A1 | 4/2012 | Matsunaga et al. |
| 2012/0159314 | A1 | 6/2012 | Schrier et al. |
| 2012/0278704 | A1 | 11/2012 | Ying et al. |
| 2012/0303706 | A1 | 11/2012 | Young et al. |
| 2013/0021346 | A1 | 1/2013 | Terman |
| 2013/0036113 | A1 | 2/2013 | Damera-venkata et al. |
| 2013/0073998 | A1 | 3/2013 | Migos et al. |
| 2013/0094034 | A1 | 4/2013 | Heckler et al. |
| 2013/0108122 | A1 | 5/2013 | Ptucha |
| 2013/0108168 | A1 | 5/2013 | Ptucha |

(56) References Cited

U.S. PATENT DOCUMENTS

| | | | |
|---|---|---|---|
| 2013/0129233 A1 | 5/2013 | Schiller et al. | |
| 2013/0211819 A1 | 8/2013 | Kagan et al. | |
| 2013/0212487 A1 | 8/2013 | Cote | |
| 2013/0219263 A1* | 8/2013 | Abrahami | G06F 17/211 715/234 |
| 2013/0246926 A1 | 9/2013 | Vemireddy | |
| 2013/0254655 A1 | 9/2013 | Nykyforov | |
| 2013/0262988 A1 | 10/2013 | Nakagawa | |
| 2013/0272611 A1 | 10/2013 | Nakamura et al. | |
| 2013/0273968 A1 | 10/2013 | Rhoads et al. | |
| 2013/0311877 A1 | 11/2013 | Ebner | |
| 2013/0326343 A1 | 12/2013 | Phillips et al. | |
| 2013/0332475 A1 | 12/2013 | Michelstein et al. | |
| 2013/0346843 A1 | 12/2013 | Murray et al. | |
| 2014/0006424 A1 | 1/2014 | Al-kofahi et al. | |
| 2014/0025619 A1 | 1/2014 | Michelstein et al. | |
| 2014/0025650 A1 | 1/2014 | Lee et al. | |
| 2014/0026038 A1 | 1/2014 | Lee et al. | |
| 2014/0032529 A1 | 1/2014 | Chang | |
| 2014/0075280 A1 | 3/2014 | Laakmann et al. | |
| 2014/0075289 A1 | 3/2014 | Brant | |
| 2014/0129969 A1 | 5/2014 | Chasman et al. | |
| 2014/0149845 A1 | 5/2014 | Ansel et al. | |
| 2014/0164911 A1 | 6/2014 | Nickolov et al. | |
| 2014/0189525 A1 | 7/2014 | Trevisiol et al. | |
| 2014/0208203 A1 | 7/2014 | Tang | |
| 2014/0215312 A1 | 7/2014 | Hicks et al. | |
| 2014/0281847 A1 | 9/2014 | Marra et al. | |
| 2014/0337723 A1 | 11/2014 | Van tol et al. | |
| 2015/0019545 A1 | 1/2015 | Chedeau et al. | |
| 2015/0019958 A1 | 1/2015 | Ying et al. | |
| 2015/0055871 A1 | 2/2015 | Muthuswamy | |
| 2015/0073922 A1 | 3/2015 | Epperson et al. | |
| 2015/0082159 A1 | 3/2015 | Deluca et al. | |
| 2015/0154303 A1 | 6/2015 | Shin et al. | |
| 2015/0178376 A1 | 6/2015 | Michelstein et al. | |
| 2015/0199605 A1 | 7/2015 | Michelstein et al. | |
| 2015/0248423 A1 | 9/2015 | Christolini et al. | |
| 2015/0278234 A1* | 10/2015 | Masterson | G06F 17/30905 715/234 |
| 2015/0317406 A1 | 11/2015 | Bort | |
| 2016/0062960 A1 | 3/2016 | Eggleston et al. | |
| 2016/0085786 A1 | 3/2016 | Michelstein Halberstam et al. | |
| 2016/0092404 A1 | 3/2016 | Farouki et al. | |
| 2016/0092405 A1* | 3/2016 | Lee | G06F 17/212 715/202 |
| 2016/0092406 A1 | 3/2016 | Farouki et al. | |
| 2016/0092419 A1 | 3/2016 | Farouki et al. | |
| 2016/0092428 A1* | 3/2016 | Ilic | G06F 3/04847 715/765 |
| 2016/0093059 A1 | 3/2016 | Tumanov et al. | |
| 2016/0093080 A1 | 3/2016 | Tumanov et al. | |
| 2016/0103927 A1* | 4/2016 | Garris | G06F 17/30905 715/238 |
| 2017/0139877 A1 | 5/2017 | Lee et al. | |

FOREIGN PATENT DOCUMENTS

| | | |
|---|---|---|
| CN | 102663010 A | 9/2012 |
| CN | 103377051 A | 10/2013 |
| CN | 104350493 A | 2/2015 |
| EP | 1220531 A2 | 7/2002 |
| EP | 1555634 A1 | 7/2005 |
| EP | 1630703 A1 | 3/2006 |
| EP | 2584509 A1 | 4/2013 |
| WO | 0150349 A1 | 7/2001 |
| WO | 2007021556 A2 | 2/2007 |
| WO | 2013051218 A1 | 4/2013 |
| WO | 2014015081 A2 | 1/2014 |
| WO | 2014069755 A1 | 5/2014 |

OTHER PUBLICATIONS

Csinger, Andrew, "User Models for Intent-Based Authoring", In Master's Thesis, Nov. 1995, 202 pages.

Gu, et al., "Visual Based Content Understanding towards Web Adaptation", In Proceedings of the Second International Conference on Adaptive Hypermedia and Adaptive Web-Based Systems, May 29, 2002, 10 pages.

Bickmore, et al., "Digestor: Device-independent Access to the World Wide Web", In Journal of the Computer Networks and ISDN Systems, vol. 29, Issue 8-13, Sep. 1, 1997, pp. 1075-1082.

"International Search Report and Written Opinion Issued in PCT Application No. PCT/US2018/016780", dated May 2, 2018, 11 Pages.

"All Things Seen and Unseen", Retrieved from <<https://web.archive.org/web/20121207210604/http://rmarsh.com/plugins/similar-posts/>>, Dec. 2012, 63 Pages.

"Captivate 4: Produce Interactive Simulations and Demonstrations", Retrieved from <<http://cit.jmu.edu/useruploads/files/captivate4tutorial.pdf>>, Retrieved Date: Dec. 27, 2011, 11 Pages.

"Cognitive Informatics", Retrieved from <<http://www.pnl.gov/coginformatics/elearning_approach.stm>>, Retrieved Date: Dec. 27, 2011, 2 Pages.

"Feedback", Retrieved from <<http://dictionary.reference.com/browse/feedback>>, Retrieved Date: Feb. 5, 2014, 3 Pages.

"Flexible Authoring Solutions for Learning Professionals", Retrieved from <<http://www.adobe.com/resources/elearning/pdfs/flexible_authoring_solutions_wp.pdf>>, Nov. 2007, 4 Pages.

"Fonts", Retrieved From: https://docs.microsoft.com/en-us/windows/desktop/uxguide/vis-fonts, May 31, 2018, 4 Pages.

"How to Configure Desktop Themes in Windows 2000", Retrieved from >>http://support.microsoft.com/kb/2578741>>, Retrieved Date: Sep. 26, 2013, 2 Pages.

"Loducca: Twipsum", Retrieved from >>http://adsoftheworld.com/media/online/loduccaiwipsum>>, Sep. 1, 2011, 2 Pages.

"Maximum Volume Sizes", Retrieved from: <<http://technet.microsoft.com/en-us/library/cc938432.aspx>>, Sep. 26, 2013, 3 Pages.

"NTFS.com: Complete Info Source: NTFS & FAT File Systems and Data Recovery", Retrieved from <<http://ntfs.com/ntfs.htm>>, Retrieved Date: Sep. 26, 2013, 4 Pages.

"Present", Retrieved from <<http://dictionary.reference.com/browse/present?s=t>>, Retrieved Date: Apr. 3, 2015, 9 Pages.

"Script and Font Support in Windows", Retrieved From: https://msdn.microsoft.com/en-us/globalization/mt791278.aspx, Dec. 5, 2016, 10 Pages.

"Split-Screen User Interface", Retrieved from <<https://web.archive.org/web/20121030170412/http://www.uscellular.com/uscellular/pdf/samsung-note-2-split-screen.pdf>>, Oct. 30, 2012, 1 Page.

"Suggest", Retrieved from <<http://dictionary.reference.com/browse/suggest?s=t>>, Retrieved Date: Apr. 3, 2015, 5 Pages.

"Techniques for WCAG 2.0", In W3C Working Draft, Techniques and Failures for Web Content Accessibility Guidelines 2.0, May 17, 2007, 229 Pages.

"This Project Viewer Lets Landowners Control Environment Settings", Retrieved from <<http://community.secondlife.com/t5/Land/bg-p/landandbusiness>>, Jun. 13, 2011, 3 Pages.

"YARPP Basic vs. Pro? Why choose?", Retrieved from <<http://web.archive.org/web/20131213003756/http://www.yarpp.com/>>, Dec. 26, 2013, 2 Pages.

"Non Final Office Action Issued in U.S. Appl. No. 13/491,612", dated Jul. 16, 2014, 8 Pages.

"Final Office Action Issued in U.S. Appl. No. 13/551,638", dated Feb. 10, 2014, 32 Pages.

"Final Office Action Issued in U.S. Appl. No. 13/551,638", dated Nov. 6, 2014, 22 Pages.

"Final Office Action Issued in U.S. Appl. No. 13/551,638", dated Oct. 23, 2015, 22 Pages.

"Non Final Office Action Issued in U.S. Appl. No. 13/551,638", dated Apr. 9, 2015, 26 Pages.

"Non Final Office Action Issued in U.S. Appl. No. 13/551,638", dated Oct. 28, 2013, 19 Pages.

"Non Final Office Action Issued in U.S. Appl. No. 13/551,638", dated Jun. 26, 2014, 29 Pages.

(56) References Cited

OTHER PUBLICATIONS

"Final Office Action Issued in U.S. Appl. No. 13/552,416", dated Jul. 7, 2016, 14 Pages.
"Final Office Action Issued in U.S. Appl. No. 13/552,416", dated Jul. 2, 2015, 13 Pages.
"Non Final Office Action Issued in U.S. Appl. No. 13/552,416", dated Jan. 14, 2015, 12 Pages.
"Non-final Office Action Issued in U.S. Appl. No. 13/552,416", dated Dec. 18, 2015, 14 Pages.
"Notice of Allowance Issued in U.S. Appl. No. 13/552,416", dated Oct. 27, 2016, 6 Pages.
"Non Final Office Action Issued in U.S. Appl. No. 13/552,662", dated Jul. 16, 2014, 8 Pages.
"Office Action Issued in European Patent Application No. 13728612.6", dated Jul. 22, 2016, 8 Pages.
"Office Action Issued in European Patent Application No. 13745236.3", dated Jul. 22, 2016, 9 Pages.
"Office Action Issued in European Patent Application No. 13745925.1", dated Jul. 25, 2016, 9 Pages.
"Final Office Action Issued in U.S. Appl. No. 14/503,174", dated May 4, 2017, 20 Pages.
"Non Final Office Action Issued in U.S. Appl. No. 14/503,174", dated Oct. 18, 2016, 42 Pages.
"Final Office Action Issued in U.S. Appl. No. 14/503,188", dated Apr. 27, 2017, 15 Pages.
"Non Final Office Action Issued in U.S. Appl. No. 14/503,188", dated Oct. 4, 2016, 15 Pages.
"Final Office Action Issued in U.S. Appl. No. 14/503,192", dated Apr. 13, 2016, 12 Pages.
"Non Final Office Action Issued in U.S. Appl. No. 14/503,192", dated Dec. 7, 2015, 11 Pages.
"Final Office Action Issued in U.S. Appl. No. 14/503,199", dated Mar. 9, 2017, 16 Pages.
"Non Final Office Action Issued in U.S. Appl. No. 14/503,199", dated Aug. 11, 2016, 12 Pages.
"Final Office Action Issued in U.S. Appl. No. 14/503,207", dated Oct. 24, 2016, 33 Pages.
"Non Final Office Action Issued in U.S. Appl. No. 14/503,207", dated May 6, 2016, 22 Pages.
"Non Final Office Action Issued in U.S. Appl. No. 14/503,207", dated Jun. 2, 2017, 24 Pages.
"Final Office Action Issued in U.S. Appl. No. 14/503,211", dated Sep. 25, 2017, 23 Pages.
"Final Office Action Issued in U.S. Appl. No. 14/503,211", dated Nov. 18, 2016, 22 Pages.
"Non Final Office Action Issued in U.S. Appl. No. 14/503,211", dated Mar. 24, 2017, 22 Pages.
"Non Final Office Action Issued in U.S. Appl. No. 14/503,211", dated May 18, 2016, 19 Pages.
"Final Office Action Issued in U.S. Appl. No. 14/503,216", dated May 18, 2017, 16 Pages.
"Non Final Office Action Issued in U.S. Appl. No. 14/503,216", dated May 6, 2016, 15 Pages.
Malu, et al., "An Approach to Optimal Text Placement on Images", In International Conference on Engineering Psychology and Cognitive Ergonomics, vol. 8019, Jul. 21, 2013, 7 Pages.
Mansmann, et al., "Exploring OLAP Aggregates with Hierarchical Visualization Techniques", In Proceedings of the ACM Symposium on Applied Computing, Mar. 11, 2007, pp. 1067-1073.
Mao, et al., "Document Structure Analysis Algorithms: A Literature Survey", In Proceedings of the SPIE on Optomechatronic Micro/Nano Devices and Components III, vol. 5010, Jan. 2003, pp. 197-207.
Martin, et al., "Automatic Multimedia Creation Enriched with Dynamic Conceptual Data", In International Journal of Artificial Intelligence and Interactive Multimedia, vol. 1, Issue 7, Dec. 2012, 2 Pages.
Mikolajczyk, et al., "A Performance Evaluation of Local Descriptors", In Transactions on Pattern Analysis and Machine Intelligence, vol. 27, Issue 10, Oct. 2005, pp. 1615-1630.

Parker, Jeff, "Yet Another Related Posts Plugin (YARPP)", Retrieved from <<https://wordpress.org/plugins/yet-another-related-posts-plugin/>>, Dec. 2009, 3 Pages.
"International Search Report and Written Opinion Issued in PCT Application No. PCT/U52015/052539", dated Feb. 25, 2016, 16 Pages.
"International Search Report and Written Opinion Issued in PCT Application No. PCT/US13/050961", dated Jan. 29, 2014, 15 Pages.
"International Search Report and Written Opinion Issued in PCT Application No. PCT/US13/050968", dated Jan. 27, 2014, 16 Pages.
"International Search Report and Written Opinion Issued in PCT Application No. PCT/US2013/042954", dated Oct. 4, 2013, 14 Pages.
"International Search Report and Written Opinion Issued in US Patent Application No. PCT/US2013/050964", dated Nov. 12, 2013, 14 Pages.
"International Preliminary Report on Patentability Issued in PCT Application No. PCT/US2015/052538", dated Dec. 16, 2016, 6 Pages.
"International Search Report & Written Opinion Issued in PCT Application No. PCT/US2015/052538", dated Dec. 23, 2015, 11 Pages.
"Second Written Opinion Issued in PCT Application No. PCT/US2015/052538", dated Aug. 31, 2016, 6 Pages.
"International Preliminary Report on Patentability Issued in PCT Application No. PCT/US2015/052539", dated Dec. 8, 2016, 11 Pages.
"International Search Report and Written Opinion Issued in PCT Application No. PCT/US2015/052539", dated Feb. 25, 2016, 16 Pages.
"Second Written Opinion Issued in PCT Application No. PCT/US2015/052539", dated Aug. 26, 2016, 12 Pages.
"International Preliminary Report on Patentability Issued in PCT Application No. PCT/US2015/052540", dated Dec. 13, 2016, 8 Pages.
"International Search Report & Written Opinion Issued in PCT Application No. PCT/US2015/052540", dated Jan. 21, 2016, 12 Pages.
"Second Written Opinion Issued in PCT Application No. PCT/US2015/052540", dated Aug. 10, 2016, 6 Pages.
"Corrected International Preliminary Report on Patentability Issued in PCT Application No. PCT/US2015/052758", dated Jan. 18, 2017, 8 Pages.
"International Preliminary Report on Patentability Issued in PCT Application No. PCT/US2015/052758", dated Dec. 20, 2016, 8 Pages.
"International Search Report & Written Opinion Issued in PCT Application No. PCT/US2015/052758", dated Jan. 25, 2016, 11 Pages.
"Second Written Opinion Issued in PCT Application No. PCT/US2015/052758", dated Aug. 29, 2016, 7 Pages.
"International Preliminary Report on Patentability Issued in PCT Application No. PCT/US2015/052763", dated Dec. 8, 2016, 8 Pages.
"International Search Report and Written Opinion Issued in PCT Application No. PCT/US2015/052763", dated Mar. 1, 2016, 13 Pages.
"Second Written Opinion Issued in PCT Application No. PCT/US2015/052763", dated Aug. 26, 2016, 7 Pages.
"International Preliminary Report on Patentability Issued in PCT Application No. PCT/US2015/052764", dated Nov. 28, 2016, 8 Pages.
"International Search Report and Written Opinion Issued in PCT Application No. PCT/US2015/052764", dated Feb. 26, 2016, 14 Pages.
"Second Written Opinion Issued in PCT Application No. PCT/US2015/052764", dated Aug. 23, 2016, 7 Pages.
"International Preliminary Report on Patentability Issued in PCT Application No. PCT/US2015/052765", dated Nov. 28, 2016, 7 Pages.
"International Search Report & Written Opinion Issued in PCT Application No. PCT/US2015/052765", dated Jan. 11, 2016, 11 Pages.

(56) References Cited

OTHER PUBLICATIONS

"Second Written Opinion Issued in PCT Application No. PCT/US2015/052765", dated Aug. 26, 2016, 6 Pages.
Rowe, et al., "Implementation and Evaluation of an Adaptive Multimedia Presentation System (AMPS) with Contextual Supplemental Support Media", In Proceedings of the 2nd International Conferences on Advances in Multimedia, Jun. 13, 2010, pp. 134-139.
Sano, et al., "A Web Page Segmentation Method based on Page Layouts and Title Blocks", In International Journal of Computer Science and Network Security, vol. 11, Issue 10, Oct. 2011, 7 Pages.
Savill, John, "How Can I Modify the Icon Spacing on the Desktop?", Retrieved From: https://www.itprotoday.com/management-mobility/how-can-i-modify-icon-spacing-desktop, Sep. 27, 2001, 6 Pages.
Schiller, "Related Entries", Retrieved from <<http://wasabi.pbworks.com/w/page/5264043/Related%20Entries>>, Sep. 2, 2011, 1 Page.
Schrier, et al., "Adaptive Layout for Dynamically Aggregated Documents", In Proceedings of the 13th International Conference on Intelligent User Interfaces, Jan. 13, 2008, pp. 99-108.
Shultz, Gregory, "Associating File types with Multiple Applications", Retrieved from <<msdn.microsoft.com/enus/library/ms977165.aspx>>, Apr. 2001, 5 Pages.
Snakefoot, "Disable Visual Effects to Make the Desktop Faster", Retrieved From: http://smallvoid.com/article/windows-visual-effects.html, Dec. 5, 2016, 3 Pages.
Sovrn, Zemanta, "Editorial Assistant by Zemanta", Retrieved from <<https://wordpress.org/plugins/zemanta/>>, May 20, 2013, 5 Pages.
Stewart, et al., "Software Environments for Scenario-based Learning", Retrieved from <<http://akoaotearoa.ac.nz/downloading/file/group-6/n3498-softwareenvironments-for-scenario-based-learning-a-snapshot-comparison-of-some-available-tools.pdf>>, Aug. 20, 2009, 24 Pages.
Stewart, et al., "Software Environments for Scenario-based Learning", In Publication—An Ako Aotearoa Publication, Aug. 20, 2009, 24 Pages.
Stolte, et al., "Multiscale Visualization Using Data Cubes", In Proceedings of IEEE Transactions on Visualization and Computer Graphics, vol. 9, Issue 2, Apr. 2003, pp. 176-187.
Suh, et al., "Automatic Thumbnail Cropping and Its Effectiveness", In Proceedings of the 16th Annual ACM Symposium on User Interface Software and Technology, Nov. 2, 2003, 10 Pages.
Tao, et al., "Contextual Modeling for Logical Labeling of PDF Documents", In Proceedings of the Computers & Electrical Engineering, vol. 40, Issue 4, May 1, 2014, pp. 1363-1375.
Thurrott, Paul, "Microsoft Ships Final Windows 2000 Update", Retrieved From: https://www.itprotoday.com/management-mobility/microsoft-ships-final-windows-2000-update, Jun. 27, 2005, 3 Pages.
Wade, et al., "Ontology Add-in for Word", Retrieved from <<https://web.archive.org/web/20110326142453/http://research.microsoft.com/en-us/projects/ontology/>>, Apr. 24, 2011, 1 Page.
Wichary, "Mouse 2006", Retrieved from <<http://www.guidebookgallery.org/screenshots/mouse>>, Retrieved on: Sep. 26, 2013, 26 Pages.
Witten, et al., "Importing Documents and Metadata into Digital Libraries: Requirements Analysis and an Extensible Architecture", In Research and Advanced Technology for Digital Libraries, vol. 2458, Jan. 2002, pp. 390-405.
Wunsche, "A Survey, Classification and Analysis of Perceptual Concepts and their Application for the Effective Visualisation of Complex Information", In Proceedings of the Australasian Symposium on Information Visualisation, vol. 35, Feb. 1, 2004, 8 Pages.
Yang, et al., "Detecting Faces in Images: A Survey", In IEEE Transactions on Pattern Analysis and Machine Intelligence, vol. 24, Issue 01, Jan. 1, 2002, 25 Pages.
Zhang, et al., "Auto Cropping for Digital Photographs", In IEEE International Conference on Multimedia and Expo, Jul. 6, 2005, 4 Pages.
"Non Final Office Action Issued in U.S. Appl. No. 14/503,216", dated Sep. 26, 2016, 19 Pages.
"Non Final Office Action Issued in U.S. Appl. No. 14/640,446", dated May 7, 2015, 6 Pages.
"Final Office Action Issued in U.S. Appl. No. 14/670,476", dated Jan. 29, 2016, 7 Pages.
"Non Final Office Action Issued in U.S. Appl. No. 14/670,476", dated Sep. 21, 2015, 7 Pages.
"Non-Final Office Action Issued in U.S. Appl. No. 14/670,476", dated May 12, 2016, 9 Pages.
"Non Final Office Action Issued in U.S. Appl. No. 14/954,447", dated Jan. 5, 2016, 5 Pages.
"Non-final Office Action Issued in U.S. Appl. No. 14/954,447", dated Jul. 14, 2016, 10 Pages.
"Non Final Office Action Issued in U.S. Appl. No. 15/416,953", dated Nov. 30, 2017, 6 Pages.
"Non Final Office Action Issued in U.S. Appl. No. 15/464,157", dated May 19, 2017, 15 Pages.
"Office Action Issued in Chinese Patent Application No. 201380030239.7", dated Apr. 13, 2016, 14 Pages.
"First Office Action and Search Report Issued in Chinese Patent Application No. 201380038361.9", dated Jul. 1, 2016, 22 Pages.
"First Office Action and Search Report Issued in Chinese Patent Application No. 201380038452.2", dated Jul. 4, 2016, 19 Pages.
Abidi, Syed Sibte Raza, "Intelligent Information Personalization from Issues to Strategies", In Book Intelligent Information Personalization from Issues to Strategies, IGI Global Press, Sep. 30, 2008, 21 Pages.
Baluja, Shumeet, "Browsing on Small Screens: Recasting Web-Page Segmentation into an Efficient Machine Learning Framework", In Proceedings of the 15th International Conference on World Wide Web, May 23, 2006, pp. 33-42.
Baumann, Alex, "Machine Learning for User Interfaces", Retrieved from <<http://www.cs.uml.edu/~abaumann/HCI/HCI_-_Final_Paper-Machine_Learning.pdf>>, Aug. 28, 2014, 8 Pages.
Beale, Russell, "Supporting Serendipity: Using Ambient Intelligence to Augment User Exploration for Data Mining and Web Browsing", In Proceedings of the International Journal of Human-Computer Studies, vol. 65, Issue 5, May 2007, 26 Pages.
Bloechle, et al., "OCD Dolores—Recovering Logical Structures for Dummies", In Proceedings of the 10th IAPR International Workshop on Document Analysis Systems, Mar. 27, 2012, pp. 245-249.
Blokzijl, et al., "The Effect of Text Slides Compared to Visualizations on Learning and Appreciation in Lectures", In IEEE International Professional Communication Conference, Oct. 1, 2007, 9 Pages.
Bradley, Tony, "Last Patch Tuesday for Windows 2000 and Windows XP SP2", Retrieved From: https://www.pcworld.com/article/200752/last_patch_tuesday_for_windows_2000_and_windows_xp_sp2.html, Jul. 9, 2010, 3 Pages.
Bucaro, Stephen, "Configure Folder Options", Retrieved from <<http://bucarotechelp.com/computers/wintips/94052503.asp>>, Sep. 26, 2013, 6 Pages.
Chen, et al., "A Survey of Document Image Classification: Problem Statement, Classifier Architecture and Performance Evaluation", In Proceedings of the International Journal of Document Analysis and Recognition, vol. 10, Issue 1, Aug. 3, 2006, pp. 1-16.
Choi, et al., "Exploring Factors of Media Characteristic Influencing Flow in Learning through Virtual Worlds", Retrieved from >>http://scholarworks.boisestate.edu/cgi/viewcontent.cgi?article=1025&context=edtech_facpubs>>, Jan. 12, 2011, pp. 2382-2394.
Coe, Jim, "Text Over a Picture: How to Make it Readable", Retrieved from <<http://www.well-made-webs.com/visual-marketing/text-work/text-over-images/>>, May 3, 2012, 5 Pages.
Dobrikov, et al., "The Architecture of a Corporate Information and News Engine", In Proceedings of the 4th International Conference on Computer Systems and Technologies e-Learning, Jun. 19, 2013, 6 Pages.
El-Bakry, Hazem M., "Face Detection Using Neural Networks and Image Decomposition", In Proceedings of the International Joint Conference on Neural Networks, May 12, 2002, pp. 1045-1050.
Eisenstein, et al., "Adaptation in Automated User-Interface Design", In Proceedings of the 5th International Conference on Intelligent User Interfaces, Jan. 9, 2000, 8 Pages.

(56) References Cited

OTHER PUBLICATIONS

Esposito, Dino, "More Windows 2000 UI Goodies: Extending Explorer Views by Customizing Hypertext Template Files", Retrieved from <<http://web.archive.org/web/20081216015137/http://msdn.microsoft.cornien-us/magazine/cc302292.aspx>>, Jun. 2000, 12 Pages.

Farray, "How Do I Preserve Legibility When Overlaying Text on Images?", Retrieved from <<http://graphicdesign.stackexchange.com/questions/4561/how-do-i-preserve-legibility-when-overlaying-text-on-images>>, Dec. 31, 2011, 1 Page.

Feng, et al., "Salient Object Detection by Composition", In IEEE International Conference on Computer Vision, Nov. 6, 2011, 8 Pages.

Fitzpatrick, Jason, "Fillerati Generates Dummy Text from Classic Literary Works", Retrieved from <<http://web.archive.org/web/20140527042603/http://lifehacker.com/5656091/fillerati-generates-dummy-text-from-classic-literary-works>>, May 27, 2014, 3 Pages.

Flynn, Paul K., "Document Classification in Support of Automated Metadata Extraction from Heterogeneous Collections", Retrieved from << http://www.cs.odu.edu/~pflynn/dissertation/flynn-thesis-9apr2014.pdf >>, May 1, 2014, 198 Pages.

Francisco-Revilla, et al., "Interpreting the Layout of Web Pages", In Proceedings of the 20th ACM Conference on Hypertext and Hypermedia, Jun. 29, 2009, 10 Pages.

Gabe, "Fillerama", Retrieved from <<http://web.archive.org/web/20140701213636/http://www.macdrifter.com/2011/11/fillerama-link.html<<, Nov. 30, 2011, 4 Pages.

Gajos, Krzysztof Z., "Automatically Generating Personalized User Interfaces", A Dissertation Submitted in Partial Fulfillment of the Requirements for the Degree of Dissertation of Doctor of Philosophy, Jun. 20, 2010, 210 Pages.

Gajos, et al., "Preference Elicitation for Interface Optimization", In Proceedings of the 18th Annual ACM Symposium on User Interface Software and Technology, Oct. 23, 2005, 10 Pages.

Geigel, et al., "Automatic Page Layout Using Genetic Algorithms for Electronic Albuming", In Proceedings of Electronic Imaging, Jan. 2001, 12 Pages.

Griebel, Gerrit, "Repository Support for Visualization in Relational Databases", In Dissertation Submitted for the Degree of M.Sc. in the Department of Computer Science, Sep. 1996, 121 Pages.

Hasegawa, et al., "Recommendation and Diagnosis Services for Presentation Semantics", In Proceedings of the 18th International Conference on Computers in Education, Nov. 29, 2010, pp. 285-289.

Huang, et al., "Header Metadata Extraction from Semi-structured Documents Using Template Matching", In Proceedings of the International Conference on the Move to Meaningful Internet Systems, vol. 4278, Oct. 29, 2006, pp. 1776-1785.

Jackson, Tim, "Windows 2000 Root Kit Analysis: Attack of Nov. 1, 2003", Retrieved from <<http://users.ece.gatech.edu/owen/Research/HoneyNetlQuarterly/Analysis_oCWindows_2000_root-kit.htm>>, Sep. 26, 2013, 4 Pages.

Jovanovic, et al., "Automating Semantic Annotation to Enable Learning Content Adaptation", In Lecture Notes in Computer Science on Adaptive Hypermedia and Adaptive Web-Based Systems, Jan. 2006, pp. 151-160.

Jovanovic, et al., "Ontology-based Automatic Annotation of Learning Content", In International Journal on Semantic Web & Information Systems, vol. 2, Issue 2, Apr. 2006, pp. 91-119.

Kaiser, et al., "Information Extraction: A Survey", In Technical Report, Vienna University of Technology, May 2005, 32 Pages.

Kamba, et al., "The Krakatoa Chronicle an Interactive, Personalized, Newspaper on the Web", In Proceedings of the Fourth International World Wide Web Conference, Dec. 11, 1995, 15 Pages.

Karlkapp, "Virtual Worlds and Compliance", Retrieved from <http://www.kaplaneduneering.com/kappnotes/index.php/2011/02/virtual-worlds-and-compliance/>>, Feb. 15, 2011, 5 Pages.

Kuan, et al., "Color-Based Image Salient Region Segmentation Using Novel Region Merging Strategy", In Proceedings of the IEEE Transactions on Multimedia, Aug. 2008, 14 Pages.

Leykin, et al., "Automatic Determination of Text Readability Over Textured Backgrounds for Augmented Reality Systems", In Proceedings of the 3rd IEEE and ACM International Symposium on Mixed and Augmented Reality, Nov. 2, 2004, 7 Pages.

Liu, et al., "Optimizing Photo Composition", In Computer Graphics Forum, vol. 29, Issue 2, May 1, 2010, pp. 169-478.

Lumley, John, "Functional, Extensible, SVG-based Variable Documents", In Proceedings of the ACM Symposium on Document Engineering, Sep. 10, 2013, pp. 131-140.

Malerba, et al., "Correcting the Document Layout: A Machine Learning Approach", In Proceedings of the Seventh International Conference on Document Analysis and Recognition, Aug. 3, 2003, 6 Pages.

"Office Action Issued in Australian Patent Application No. 2013292612", dated Dec. 12, 2018, 4 Pages.

"Office Action Issued in Australian Patent Application No. 2013292612", dated Jan. 17, 2019, 4 Pages.

"First Office Action and Search Report Issued in Chinese Application No. 201580053260.8", dated Jun. 4, 2019, 17 Pages.

* cited by examiner

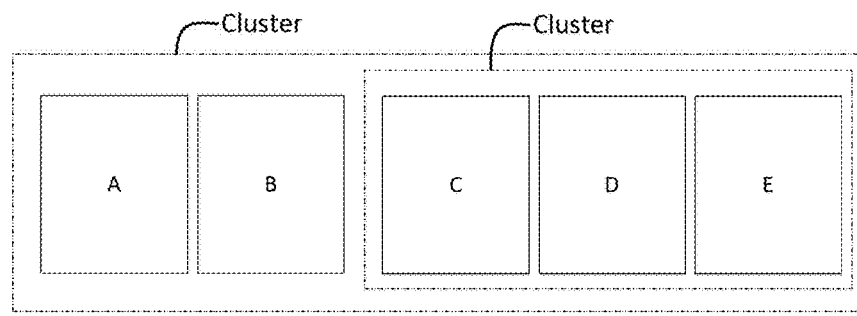
FIG. 4F
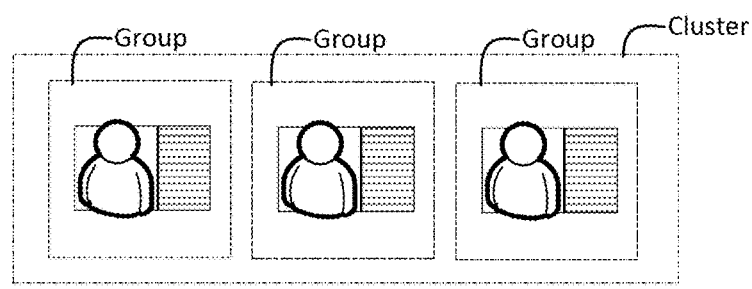
FIG. 4G
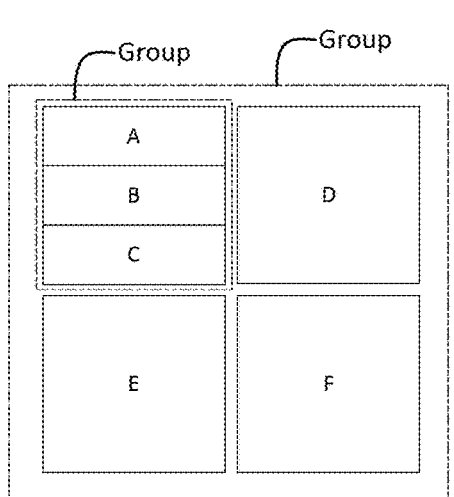 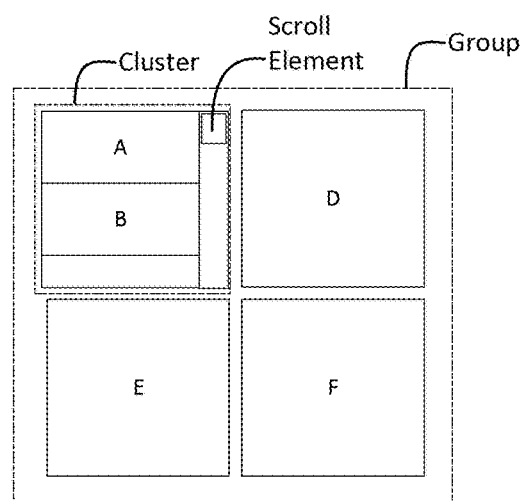
FIG. 4H      FIG. 4I

Examples of Chapter or Title Text over Media

Examples of Poster Text over Media

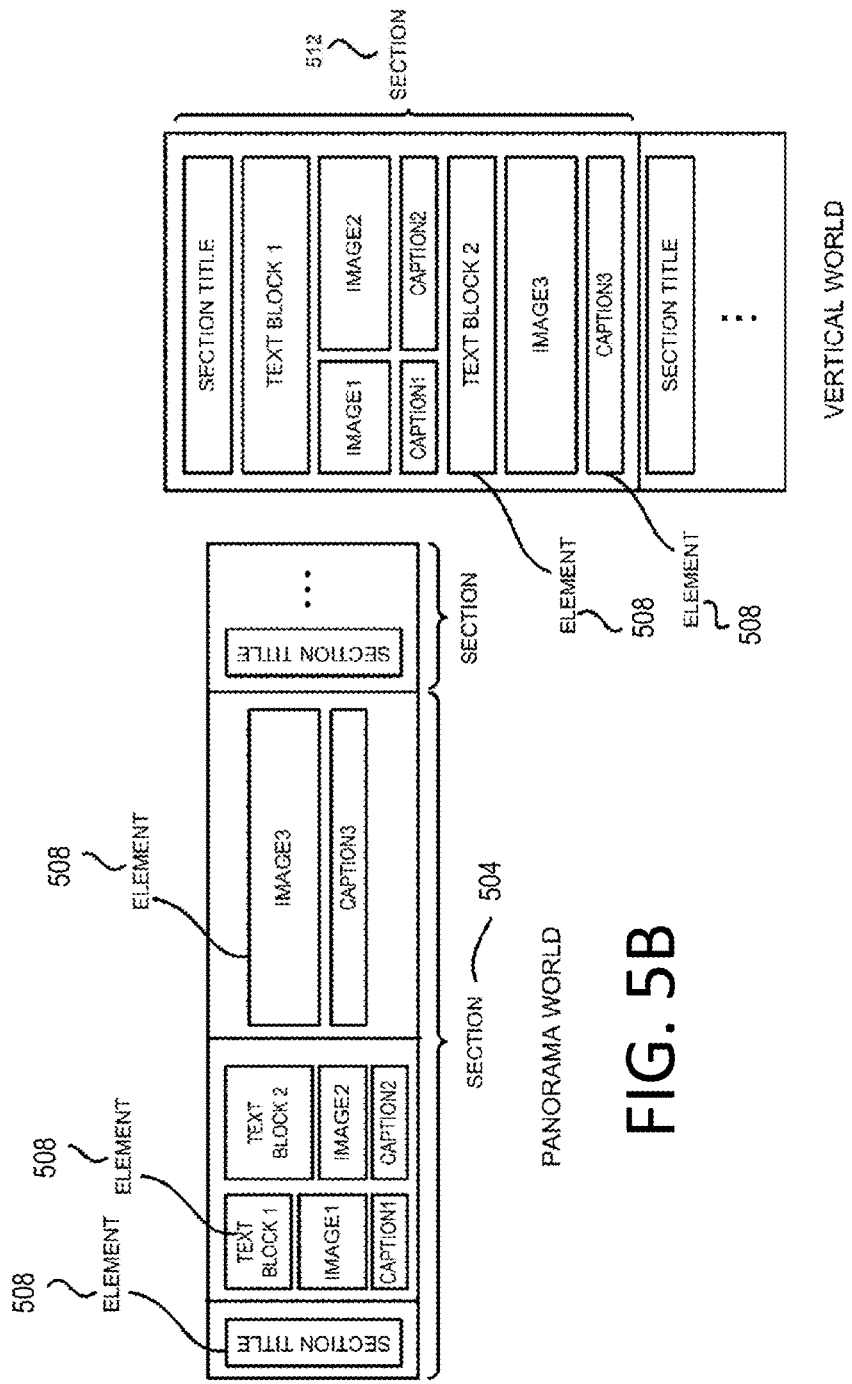

OUTPUT GENERATION BASED ON SEMANTIC EXPRESSIONS

CROSS-REFERENCE TO RELATED APPLICATIONS

This application is related to U.S. patent application Ser. No. 14/503,211, entitled "Intent Based Authoring", filed Sep. 30, 2014, and published on Mar. 31, 2016, as U.S. Patent Publication No. 2016/0092405, the contents of which are herein incorporated by reference.

This application is related to U.S. patent application Ser. No. 14/503,216, entitled "Inferring Layout Intent", filed Sep. 30, 2014, and published on Mar. 31, 2016, as U.S. Patent Publication No. 2016/0092406, the contents of which are herein incorporated by reference.

BACKGROUND

The increased diversity of display devices available to consumers poses a number of challenges to content authors. For example, in some scenarios, authors may compose documents that are optimized for display on a mobile phone in portrait mode that may not be suitable for presentation when the device is used in landscape mode. The readability and appearance of such a document may be compromised further when displayed using a desktop monitor, a virtual reality display device, a wearable display device, an 80-inch screen, a video or a printed page.

At another level, the growing diversity in available display devices is in contrast with the static formatting instructions that are typically used to generate documents. For example, authors are generally limited to providing specific formatting instructions such as "set these two words to 18-point, bold font," "place this text ¾ of an inch from the top of the page," or "place these 2 images side-by-side with a 48-point gutter between the two of them." Such static formatting instructions may only be suitable for a few display formats, and such instructions do not typically anticipate or accommodate other display formats. When displaying such content in a format that was not anticipated, the content may be presented in a way that is completely different from what the author originally had in mind or was intended. In addition, the display of such content on small screens may reduce the size of images or text to a point where it may not be readable.

In addition, by only relying on specific formatting instructions, some of the author's intent may not be fully expressed. For instance, a manually-generated layout may be limited by the author's knowledge of formatting instructions. There may be a large number of formatting options that are available to present the content, but may not be used because they are unknown to the author or because the author does not have sufficient time to add this explicit formatting. As a result, the content may not be presented in a way that is consistent with the author's intentions.

It is with respect to these and other considerations that the disclosure made herein is presented.

SUMMARY

Technologies are described herein for content authoring based on author intent. Generally described, in some aspects, a taxonomy of semantic expressions can be used to capture and model what an author wants to convey. The semantic expressions can be expressed by configurable visual exemplars of editorial intent. The author can chose visual exemplars to use with particular content, which can shape a high-level organization of the content. These visual exemplars and their underlying semantic expressions can be used to generate output layouts of content for a variety of presenting devices. Contracts can be established that identify one or more semantic expressions that will intentionally be expressed in the output regardless of how the content is laid out for various presenting formats. When creating the output, a layout engine can automatically permute among visualizations that adhere to the contract semantic expressions but vary on other semantic expressions, as well as shape and style. This can ensure that the author's intent does not get lost even if the style, navigation models, and target devices of the output changes to match particular presenting formats. Advantageously, the use of contract semantic expressions can reduce the number of interactions required by the user to create output for a variety of formats or presentation devices (e.g., by eliminating the need for the author to reformat the content for a variety of presentation situations). This can further increase the accessibility of output content by allowing the output content to be varied according to accessibility parameters (e.g., avoiding certain colors that may be affected by color blindness) while maintaining the author's intent.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4F illustrates an example of a cluster of content elements and a cluster.

FIG. 4G illustrates an example of a cluster of groups.

FIG. 4H illustrates an example group including content elements, along with a group of content elements.

FIG. 4I illustrates an example group including content elements and a cluster of elements.

FIGS. 5B and 5C illustrate two example layouts and the components of each of the example layouts.

DETAILED DESCRIPTION

Figure 1:
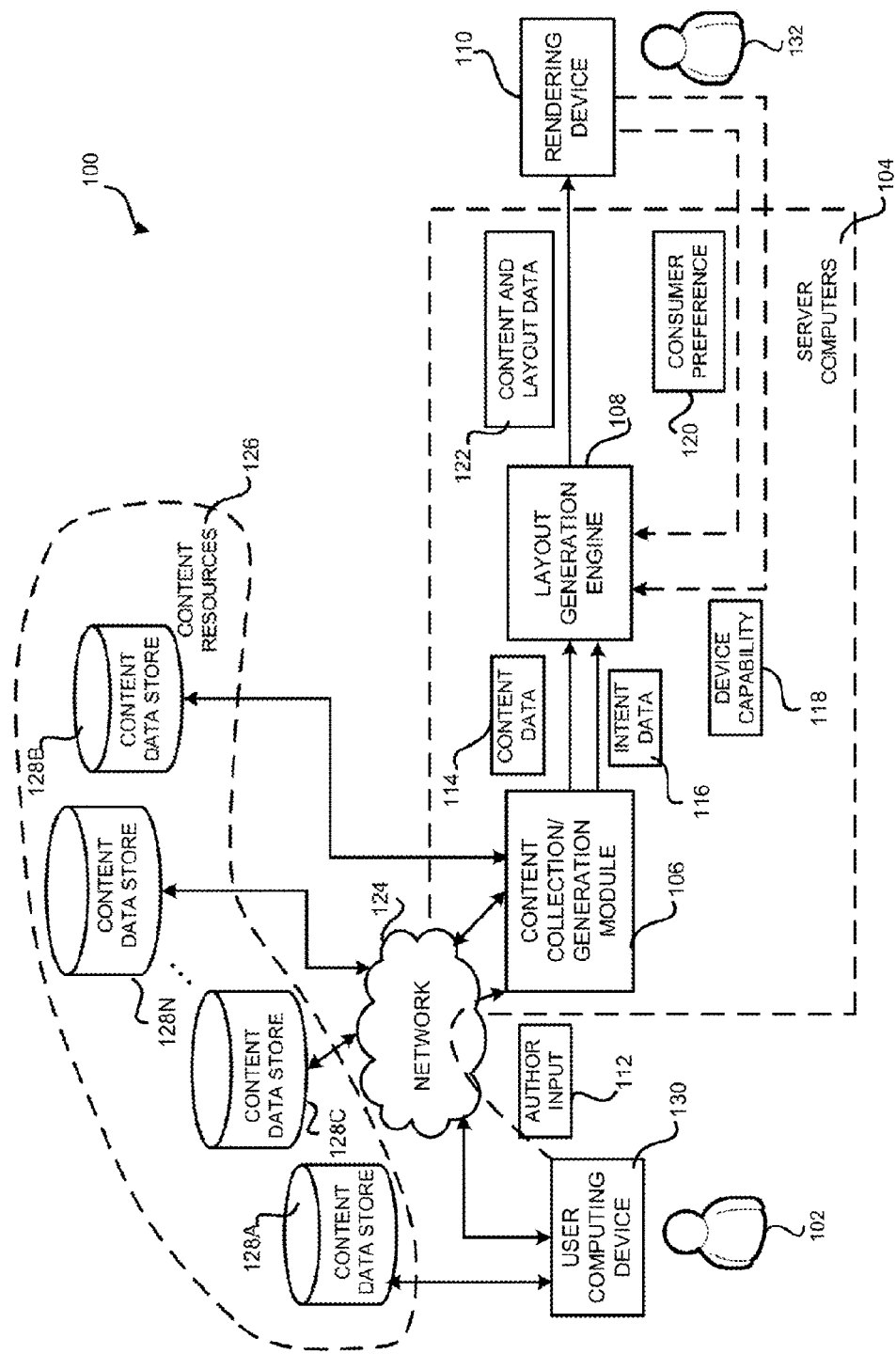
FIG. 1 is a system diagram providing an overview description of one mechanism disclosed herein for providing a content authoring service for generating a layout for content data based on user intent.

The following detailed description is directed to concepts and technologies for content authoring based on user intent. Generally described, techniques disclosed herein may be used to provide a service to generate a layout for content data provided or selected by an author. The content data may include various content data elements, such as text, image, video, audio, interactive elements. The author may further specify his/her intent on how to present the content data. The intent of the author may be described as the intent of the author to communicate something specific and meaningful through a mixed media narrative. Author intent can include an intent regarding various relationships among content elements contained in the content data.

Techniques described herein may use an intent specified by the author to generate a layout for the content data. As the term is used herein, a "layout" of content data may include a macro-level scheme for presenting the content data, a mid-level scheme of arrangement for a group of content data elements of the content data, and a micro-level scheme for each of the content data elements. In other aspects, capabilities of a display device on which the content data is to be displayed may also be taken into account when generating the layout. Other factors may also be considered in generating the layout, such as the preference of the consumer of the authored content and how the consumer may experience the content. By using the technologies described herein, content data may be laid out properly on various different display devices dynamically while respecting the intent of the author of the content. Further, disclosed techniques can allow the creation of layouts and other content based on the author specifying what he or she wants to convey, without necessarily needing the author to specify direct formatting parameters.

Laying out content without direct layout parameters from the author can introduce challenges because layouts can change the meaning and impact of stories. For example, an author may want to present photos of members of a team. A layout where the images of some members are larger than others can convey a different meaning (e.g., importance) than a layout where the images are the same size (e.g., equality). Disclosed examples can be relevant to addressing these or other changes by, for example, capturing what the author intends to convey and using that information to determine how to lay out and format the content in a way that maintains the author's intent, even when the layout is modified for output using a variety of platforms.

In an example, a system can generate output by capturing an understating of an author's intent. This can begin by presenting the author with a selection of visual exemplars (e.g., lists, grids, collages, etc.) and then generating output content laid out based on the semantic expressions that are represented by those visual exemplars. Semantic expressions can be described as the specific, often implied, relationships that are represented in visual exemplars of content For example, the visual exemplar of a stack of images implies an unseen number of additional images, that a person can view if they are interested (e.g., optional). The images are shown one-at-a-time, and therefore not tightly related to each other. In this manner, the visual exemplar of a stack of images conveys the semantic expressions of loose continuity and optionality. The semantic expression of continuity can describe how closely a set of content is related, whether the content goes together, whether the content should be shown together, and how separate the content is from other content (see, e.g., FIG. 4D and associated disclosure). The semantic expression of optionality can describe content that is available for presentation but is not obligatory.

As another example, the visual exemplar of a filmstrip can convey a comparative sense. The filmstrip can be used to show several images of an arbitrary number of images at once in a uniform manner, but the images never get so small that a viewer cannot take in the details. In this manner, the filmstrip visual exemplar can convey the semantic expression of tight uniformity and loose continuity. The semantic expression of uniformity can describe the homogeneity of sets of content (see, e.g., FIG. 4G and associated disclosure).

In yet another example, a user may want to present flags using the visual exemplar of a grid. In this manner, the user may intend to present all of the flags at once, even if the features of individual flags are less distinct. In this manner, the grid visual exemplar can convey the semantic expression of tight uniformity and tight continuity.

There can be a variety of different visual exemplars. For ease of understanding, visual exemplars can be considered as falling into different types, such as those described in TABLE I, below.

TABLE I

| Type | Notes | Example Visual Exemplars |
|---|---|---|
| Content: Atomic Media | This type includes individual units of media content | Pictures, video, audio |
| Content: Text | This type includes text, such as one or more text paragraphs. Text can be made up of runs that can include overlapping run-level attributes, such as emphasis or quotation. | Text |
| Structure | This type can affect the structure of the output, such as by turning content into an outline or introducing branches. | Headings, subheadings, branching, drill-in, sidebar, hyperlink |
| Organizational: Group | This type describes homogeneous content that are visualized in understandable patterns | Grid, comparison, gallery, stack |
| Organizational: Composite | This type includes name-value pairs with specific meaning, similar to a form with specially named fields. | Images with captions, story titles (e.g., with title, subtitle, background, and author fields) |
| Extensibility | This type includes content that allows the introduction of new, complex datatypes. May have interactivity. | Charts, tables, maps, embeds, web extensions. |

A layout system can capture one or more various semantic expressions conveyed in the visual exemplars and express the semantic expressions across a variety of target outputs and visual styles. For instance, rather than reproducing each output content exactly from one target presentation device to the next, which can create challenges as previously described, the system can generate various kinds of layouts while still respecting the author's intent. The system can respect the author's intent by maintaining particular semantic expressions that make up the contract of the visual exemplar across the different templates, layouts and output while modifying other aspects of the content. This can include modifications that change, add or emphasize other, non-contract semantic expressions.

The contract semantic expressions can include one or more primary semantic expressions behind the visual exemplar. The contract can be determined by what most users will expect when they see the visual exemplar. In an example, a system can predict what that contract is, but may later find that users expect something different. In this case the system can change the contract in order to deliver what the user wants. In an example, if the visual does not match what the author intended, then the author can be shown alternatives that are near the contract from which to choose. If the author selects an alternative, then the contract can be replaced with a new contract. For example, this can occur where the author includes more or fewer content items than can be shown in a visual exemplar. For instance rather than using nine or twelve items, the author places one-hundred. In that case, the user may not like how small the content is displayed (e.g., in cells of a grid visual exemplar) and would rather have loose continuity than tight continuity.

In another example, each visual exemplar can be scored based on the extent to which the visual exemplar expresses each possible semantic expression. The scores are then used to generate layouts and output. This approach can be contrasted with the use contracts, in which a small number of contract semantic expressions that are strongly conveyed in a selected visual exemplar are maintained in the output. Advantageously, the use of contracts allows the process to produce many different output variations that tell the story because they permute on other semantic expressions while maintaining the contract semantic expressions to convey the author's intent. Further, the use of contracts can conserve processing resources that would otherwise be used to calculate the scores for each possible semantic expression.

In an example of output processing using contract semantic expressions, templates and layouts can be selected that include non-contract semantic expressions, even if those semantic expressions are strongly present in the output. For instance, an author may have selected a visual exemplar of a stack. The contract of the stack visual exemplar can identify optional as the relevant semantic expression, but the contract may not specify the semantic expression of uniformity. Outputs can be chosen that express optional that also express various levels of uniformity. For instance, the outputs can show the stack either with each content rotated differently, one over the other, or to show a different visual that looks like a gallery (e.g., a visual exemplar in which there is only one visible element but a clear next and previous selector that can move through the sequence).

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for content authoring based on user intent. As will be described in more detail, a number of applications and services can embody the functionality and techniques described herein.

FIG. 1 is a system diagram providing an overview description of one mechanism disclosed herein for providing a content authoring service for generating a layout for content data based on user intent. As shown in FIG. 1, a system 100 may include one or more server computers 104 supporting content authoring. The server computers 104 might include web servers, application servers, network appliances, dedicated computer hardware devices, personal computers, or any combination of these and/or other computing devices known in the art.

The server computers 104 may execute a number of modules in order to provide content authoring services. For example, as shown in FIG. 1, the server computers 104 can include a content collection/generation module 106 for collecting and/or generating content data 114. The content data 114 may include various content data elements, such as text, images, video, audio, tweets, charts, graphs, tables, opaque web data, and/or any data elements that may be used in content authoring.

Among other kinds of data, the content data 114 can include static, dynamic, and interactive content. Interactive content can include elements with which the consumers of the content can interact. The interactive content can include, for example, a whiteboard, a wiki, a mind map, a communication application, a table, a package tracker, a calculator, an audio track, a quiz, ink, or other interactive content elements. In some examples, the content of an output of the system can be converted into and back from an interactive element. Depending on how the interactive element is created, this transition process can be a lossy process where some or all of the author's original intent is lost and may need to be inferred from the arrangement of content in the interactive element.

The content data 114 can also include data regarding features or styles according to which the content can be presented, such as typography (e.g., typeface, serifs, leading, capitalization, font sets, etc.), color (palettes, interaction with images, etc.), decorators (e.g., lines, bars, symbols, borders, etc.), layout (margins, alignment, rotation, density, etc.), animations (tempo, quantity, paths, etc.), background, and others. In an example, the content data 114 can include layout density style information, which can inform the degree of compactness used to present the content. Density style information can affect different aspects of the layout, including the use of padding, whitespace, overlapping content, and cropping content. Density style information can also be used to convey sparseness, such as through scattering content and the use of negative space.

The content data 114 may be obtained from an author 102 as an author input 112 through a user computing device 130. For illustrative purposes, the author input 112 may also be referred to herein as content data where the content data retrieved from the content resource comprises a description of the identified entity. The user computing device 130 may be a personal computer, a desktop workstation, a laptop, a tablet, a notebook, a personal digital assistant, an electronic-book reader, a smartphone, a game console, a set-top box, a consumer electronics device, a server computer, or any other computing device capable of connecting to the network 124 and communicating with the content collection/generation module 106. The network 124 may be a local-area network, a wide-area network, the Internet, or any other networking topology known in the art that connects the user computing device 130 to the content collection/generation module 106.

When providing content data elements, the author 102 may, for example, type in text, upload images, paste data, or upload an existing file that contains the content data elements through a user interface presented to the author 102 by the content collection/generation module 106. The author 102 may also provide other data, such as the metadata for the content data elements, through the user interface. Alternatively, or additionally, the author 102 may submit content elements and/or any other data associated therewith through the user computing device 130 by using an application programming interface ("API") exposed by the layout generation services.

According to further aspects, content data elements may also be obtained from various content resources 126. The content resources 126 may include local content in content data store 128A that is locally accessible to the user computing device 130 and/or in content data store 128B that is locally accessible to the server computers 104. The content resources 126 may also include remote content on content stores 128C-128N that are accessible through the network 124. For example, the remote content may include content in the author's social media account, such as posts, blogs that have been written by the author, or audio, images and/or video that have been saved under the author's account, etc. The remote content may further include content that is publicly available.

In addition to the content data 114, the content collection/generation module 106 may further obtain intent of the author 102 on how the content data 114 should be presented to consumers. For example, an author 102 may want one image to be presented more prominently than its surrounding content data. The intent of the author 102 may be obtained as intent data 116 that describes relationships among two or more of the content elements in the content data 114. For example, the intent data 116 can specify particular visual exemplars (and therefore also their underlying semantic expressions) with which particular content should be displayed. The intent data 116 can convey the intent of the author to communicate something specific and meaningful through a mixed media narrative. The intent data 116 may further indicate an intended use of the content data 114, such as being published as a blog article posted online, an article to be printed out in a newspaper, a video to be presented to consumers, an audio to be played back to consumer and others. In other examples, the author 102 may want several pieces of content to be kept together (e.g., the author 102 may want to identify a block of text as a quotation). It should be noted that the intent may be conveyed through high level description, and the intent data 116 need not contain specific formatting instructions. Additional details regarding the content data 114 and the intent data 116 are provided with regard to FIG. 3.

Once the content data 114 and the intent data 116 are obtained, the server computers 104 may employ a layout generation engine 108 to generate the layout for the content data 114 based on the intent data 116. A layout of content data may include a macro-level scheme for presenting the content data, a mid-level scheme of arrangement for a group of content data elements of the content data, and a micro-level scheme for formatting each of the content data elements. The macro-level scheme for presenting the content data may include a high-level structure of the content data, an overall color scheme of the content data, a mood to be conveyed to the consumer of the content, a high-order interaction model, and/or other design elements that may be applied to the content data on a macro level. An example of the macro-level scheme may be a world scheme, which will be discussed in detail with regard to FIGS. 3 and 5.

The mid-level scheme of arrangement may include arrangement and/or design for a group of content data elements. To illustrate aspects of the mid-level scheme, consider an example macro-level scheme having a high-level structure organizing content data into one or more sections, where each section contains one or more content data elements. In such an example, a mid-level scheme of an arrangement may include various design aspects for each of the sections, such as the arrangement of data elements in each section, the color scheme to be applied to each of the sections, a different mood to be applied, and so on.

A layout may include a micro-level scheme for each of the content data elements in the content data 114. In some configurations, the micro-level scheme may vary depending on the type of the content data element. For example, for a text content data element, the micro-level scheme may include a font design for the text, such as a font size, a font color, a typeface, and so on. The micro-level scheme for a text content data element may also include line and paragraph spacing, text alignment, bulleting or numbering, and the like. For an image content data element, the micro-level scheme may include a size of the image, a position, an aspect ratio, and/or other aspects of the image. For example, the micro-level scheme can include image cropping, which can include altering the original aspect ratio of the image to better fit an output. Techniques described herein may also process combinations of micro-level content, such as an image with a caption. It should be understood that the macro-level scheme, the mid-level scheme and the micro-level scheme described above are for illustration only, and should not be construed as limiting. Additional layout schemes may be contained in a layout beyond those described herein, and that not every scheme described will be available for generated layout.

Once the layout is generated, data defining the layout and the content data may be communicated as an output, which for illustrative purposes is referred to herein as "content and layout data 122." The content and layout data 122 may be then sent to a rendering device 110 and be presented to a consumer 132 (e.g., an individual or an audience) of the content for consumption or be presented to the author 102 for testing and/or reviewing purposes. The rendering device 110 may be a PC, a desktop workstation, a laptop or tablet, a notebook, a PDA, an electronic-book reader, a smartphone, a wearable computing device (such as a smart watch, a smart glass, a virtual reality head-mounted display), a game console, a set-top box, a consumer electronics device, a server computer, a kiosk, or any other computing device having an output element associated therewith and capable of providing content according to content and layout data 122. If the output format of the content data 114 is a printed page, the rendering device 110 may also include a printer. Furthermore, the content data 114 may include an audio signal, and in that case, the rendering device 110 may also include an audio rendering device, such as an MP3 player or a smart speaker system. The content data 114 can further include audio transcriptions, text descriptions, braille output, and other output.

It can be appreciated that the examples of the content and layout data 122 are provided for illustrative purposes and are not to be construed as limiting. As it can be appreciated, any information, paradigm, process or data structure from any resource may be used with techniques described herein to process any type of data that may be used as processed data or an output, e.g., content and layout data 122. In addition, although the techniques described herein refer to the processing of "content" or "layout data," it is to be appreciated that the "content" and/or the "layout data" may be a part of, or used in conjunction with, any form of media, such as a video, still image, or any other form of data defining a 2D or 3D display environment. For instance, any data that is generated, processed or obtained by techniques described herein may accommodate any 2D or 3D display environment, such as the display environments that are used by MICROSOFT HOLOLENS, GOOGLE GLASS, or OCULUS RIFT. It can be further appreciated that any data that is obtained, processed or generated by techniques described herein may be in other forms, such as those having an audio-only format, or a format having an audio component related to visual or non-visual data. Thus, data processed using the techniques described herein may include a transcription and/or a translation that describes the layouts and/or the content.

According to further aspects, the layout generation engine 108 may also be able to obtain additional data for the generation of the layout, such as the device capability 118 of the rendering device, consumer preferences 120, and/or potentially other data. The device capability 118 may include various specifications of the rendering device 110, such as resolution, screen size, dots-per-inch value, orientation, memory constraints, graphics capabilities, browser capabilities, paper quality, interaction capabilities (e.g., touch, keyboard, mouse, gesture, etc.), accessibility characteristics, and the like. The device capability 118 may further include static-ness/dynamic-ness, such as a printed page as opposed to usual dynamic experiences with a digital display. The consumer preferences 120 may include various features and/or styles according to which the consumer 132 may prefer the content to be presented, such as the overall structure of the content, color schemes, background, animation style, and others. The consumer preferences 120 may be provided by the consumer 132 to the layout generation engine 108 through the rendering device 110 or through any other computing device that is accessible to the consumer 132. The consumer preferences 120 can also include data regarding an estimated or actual distance between the consumer 132 and the rendering device 110 (e.g., a distance-to-screen value). In an example, the layout generation engine 108 can use the distance value to determine a content size for the output. For example, the output can include a variety of different kinds of text (e.g., titles, headings, sub-headings, block text, block quotes, body text, captions, etc.) that can have a variety of characteristics relative to each other, including font size. The layout generation engine 108 can modify these characteristics based on the distance between the consumer 132 and the rendering device 110 to encourage legibility of the content. Further, the content size can affect layouts generally. For example, larger or smaller content can affect how much content can be displayed using the rendering device at once.

The consumer preferences 120 can further include a manner in which the output will be presented to the consumer 132 or others, such as whether a presenter is using a presentation mode to present the output to an audience, whether the content is being advanced manually, whether the content is being advanced using an auto play setting, or whether the consumer 132 is viewing the output on a kiosk. For example, where the output is provided using an auto play setting (e.g., as opposed to a presenter manually advancing through the output), the system can infer from the author's intent and the content how the output should be paced (e.g., how much time should be spent on each of the content elements before advancing to the next).

The additional data described above may also be taken into account by the layout generation engine 108 when generating the layout. There might be conflicts among the various types of inputs of the layout generation engine 108. For example, the intent data 116 and the consumer preferences 120 may be intrinsically contradictory. In such scenarios, conflicts need to be solved according to various rules and the specific circumstances involved. For instance, the content data 114 may contain premium content/work-products which the authors may want to make sure the generated layout matches their corporate style and intent, and thus the consumer preferences 120 is given little weight. Conversely, consumer preferences 120 may be given a higher weight when, for example, a consumer has accessibility concerns having to do with color selection, font size, and animation style. In any case, when the consumer preferences have included extreme constraints in the past, there was little information to understand how to account for the constraints while respecting the author's intent. Now that the author's intent is available, the system can better meet both the author's intent and the consumer's preferences. As will be described below, in some scenarios, the intent data 116 may be inferred from an existing formatted document that contain related content data, rather than specified by the author 102, and the layout in such scenarios may be generated by assigning more weight to consumer preferences 120 than to the intent data 116. In an example, the document with existing formatting may be formatted using predefined styles (e.g., a heading style, a quotation style, etc.). The style data can be used to infer author intent. In an example, machine learning can be used to infer the author's intent.

It should be understood that the various functionalities of the content collection/generation module 106 and layout generation engine 108 described above may be implemented as a Web service provided to the author 102 for content authoring and to the consumer 132 for content consuming. For example, an author 102 may access these functionalities through a web browser to generate a layout for the content. The content may also be accessible to a consumer 132 through a web browser in which the content is presented in the generated layout.

It should be further appreciated that while the above describes that the content collection/generation module 106 and the layout generation engine 108 execute on the server computers 104, any of these modules, or a portion thereof, may be executed on the user computing device 130 and/or the rendering device 110. For example, the functionality of the content collection/generation module 106 and the layout generation engine 108 may be implemented as a software application running on the user computing device 130 operated by the author 102. In another example, some of the functionality of the content collection/generation module 106, such as obtaining author input 112 from the author 102 and/or retrieving content from content resources 126, may be implemented as a client software application that executes on the user computing device 130. The client software application may send the obtained content data 114 and intent data 116 to the layout generation engine 108 for layout generation.

Similarly, some of the functionality of the layout generation engine 108 may be implemented as a client software application that can execute on the rendering device 110. For example, functionalities such as simple adjustment of the generated layout may be included in and implemented by the client software application without contacting the server computers 104. The client software application may be further configured to collect data, such as the device capability 118 and the consumer preferences 120, and to send to the layout generation engine 108 for layout generation or major layout modification.

Figure 2:
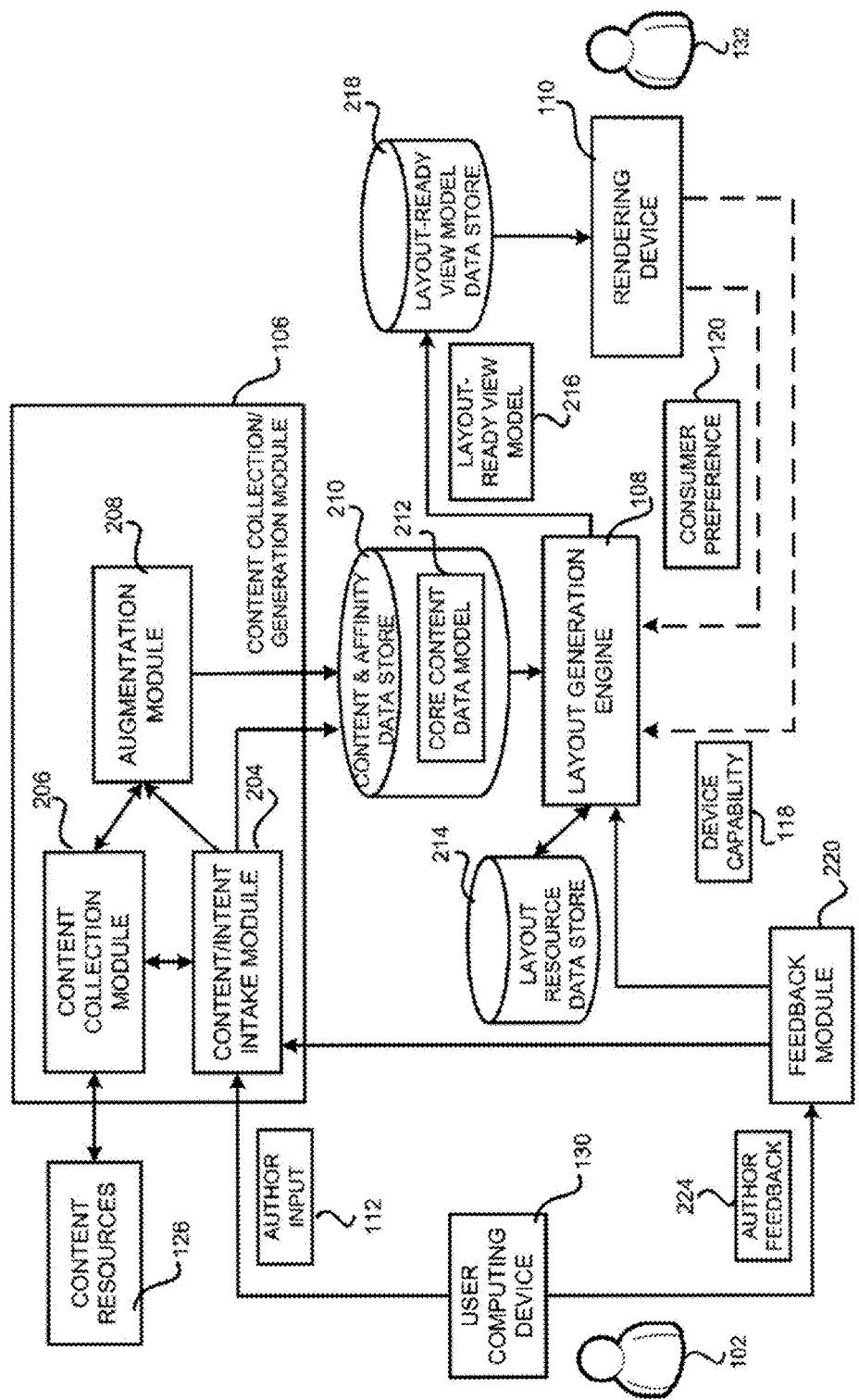
FIG. 2 is a block diagram illustrating further aspects of the techniques and technologies presented herein for content authoring based on author intent.

Turning now to FIG. 2, where a block diagram is shown to illustrate further aspects of the techniques and technologies presented herein for content authoring based on user intent. As shown in FIG. 2, the content collection/generation module 106 may include a content/intent intake module 204 that may be employed to obtain, from the author 102, the content data 114, the intent data 116 for the content data 114, as well as other data provided by the author 102. In some aspects, the content/intent intake module 204 may obtain data from the author 102 through the user interface as discussed above where the author 102 may type in text, upload images, provide metadata for the content data 114, specify intent for the content data 114, and/or perform other operations to convey relevant information. For example, a user may specify intent or relevant information by selecting items from a list of computer generated choices, such as a list of visual exemplars with which to express the content.

Apart from obtaining content data 114 and/or intent data 116 directly from the author 102, content data 114 and/or intent data 116 may also be obtained from various content resources 126. A content collection module 206 may be employed to collect content/intent from the content resources 126. The collected content/intent may be then sent to the content/intent intake module 204 to be combined with the content/intent directly provided by the author 102.

According to further aspects, the content collection/generation module 106 may further include an augmentation module 208 to provide additional functionality to enhance the content authoring service. For example, the augmentation module 208 may provide content suggestions to the author 102 based on the content data 114 provided by the author 102 during the authoring process. For instance, the augmentation module 208 may recognize keywords in the content and find additional data relating to the keywords. The augmentation module 208 can also perform processing on images within the content data 114. This can include identifying faces, salient regions, invariant regions, and other aspects within the images, which can help inform the layout process. This can also be used to identify and flag images that look poor when cropped so they are not cropped later. The identification of content within images can also be used to help the author find related images.

The augmentation module 208 can also correlate the content data 114 with other user data. For example, if the author 102 is preparing a presentation on a vacation, the augmentation module 208 can correlate metadata regarding the vacation (e.g., when and where it occurred) and use that metadata to find other content that the author has regarding that timeframe and location, such as content that may be available on social media. In an example, augmentation can be performed as a background process. For instance, image analysis may take a certain amount of time per image (e.g., three seconds) to perform per image. Because of the time such analysis takes, the analysis can be performed as a background process. In the meantime, the images can be used as though there were no special analysis results. Once the analysis is done, the results can be used to update the presentation of those images.

In another example, the augmentation module 208 may generate sample content as a starting point for the author 102 to begin the authoring process. The suggested content and/or the sample content may be collected through the content collection module 206. The suggested content and/or the generated sample data may be presented to the author 102 through the content/intent intake module 204, where the author 102 may make further selection on the suggested content and/or the generated sample data. One or more aspects of the augmentation module 208 can use machine learning to produce results.

The collected and/or generated content data 114 and intent data 116 may then be provided as an output, and the output may be consumed by the layout generation engine 108 for layout generation. In the example shown in FIG. 2, the content data 114 and the intent data 116 may be organized as a core content data model 212 and stored in a content and affinity data store 210. As described in more detail below, the affinity data store 210 may be a store of the affinities or relationships between content. The affinity data store 210 may include a wide range of items such as hierarchies, clustering, emphasis, summarization, lists and/or related content. Details regarding the core content data model 212 will be provided below with regard to FIG. 3. The layout generation engine 108 may retrieve the core content data model 212 from the content and affinity data store 210 and generate a layout based on the core content data model 212.

According to some aspects, the layout generation engine 108 may further consult a layout resource data store 214 for various layout resources when generating a layout. The layout resource data store 214 may contain various templates for macro-level schemes, mid-level schemes, and/or micro-level schemes. For example, the layout resource data store 214 may store one or more world schemes that can be used as the macro-level scheme for presenting the content data. The layout resource data store 214 may further contain one or more objects that may be used to generate templates for mid-level schemes. The layout resource data store 214 may also contain various interpretations of user intent. For example, for a user intent to emphasize an image, the interpretations may include increasing the image size to be larger than the images next to it, placing the image in a page or a screen so that it has large space from the surrounding content, placing a colored border or frame around the content to emphasize it, and/or other possible interpretations. The interpretations may have one or more rules associated therewith. The rules may describe the relationship among the different interpretations, the conditions under which a particular interpretation may be adopted, suggested formatting commands when an interpretation is adopted, and so on. The layout resource data store 214 may further include other resources, such as color schemes and animation schemes, that may be applicable to the content data 114.

As shown in FIG. 2, the generated layout along with the content data may then be output as a layout-ready view model 216 and stored in a layout-ready view model data store 218. From the layout-ready view model data store 218, the rendering device 110 may obtain and render the layout-ready view model 216 to present the content data in the generated layout to the consumer 132 or the author 102.

According to further aspects, a feedback module 220 may be employed to obtain the feedback 224 from the author 102 with regard to the presented layout. Depending on the nature of the feedback, the feedback may be sent to the layout generation engine 108 to adjust the generated layout, or it may be sent to the content collection/generation module 106 to enable a re-generation of the layout. By way of example, and not limitation, an author 102 may provide an intent feedback that changes his/her intent provided initially, and such an intent feedback may be taken through the content/intent intake module 204 and used to modify the core content data model 212 used for the generation of the layout. Alternatively, or additionally, an author 102 may provide a feedback for refining the generated layout by, for example, asking for an alternative layout to be presented, pointing out what went wrong with the generated layout, offering example solutions to the unsatisfied portion of the layout, or even providing specific formatting commands to be used for certain content data elements.

Figure 3:
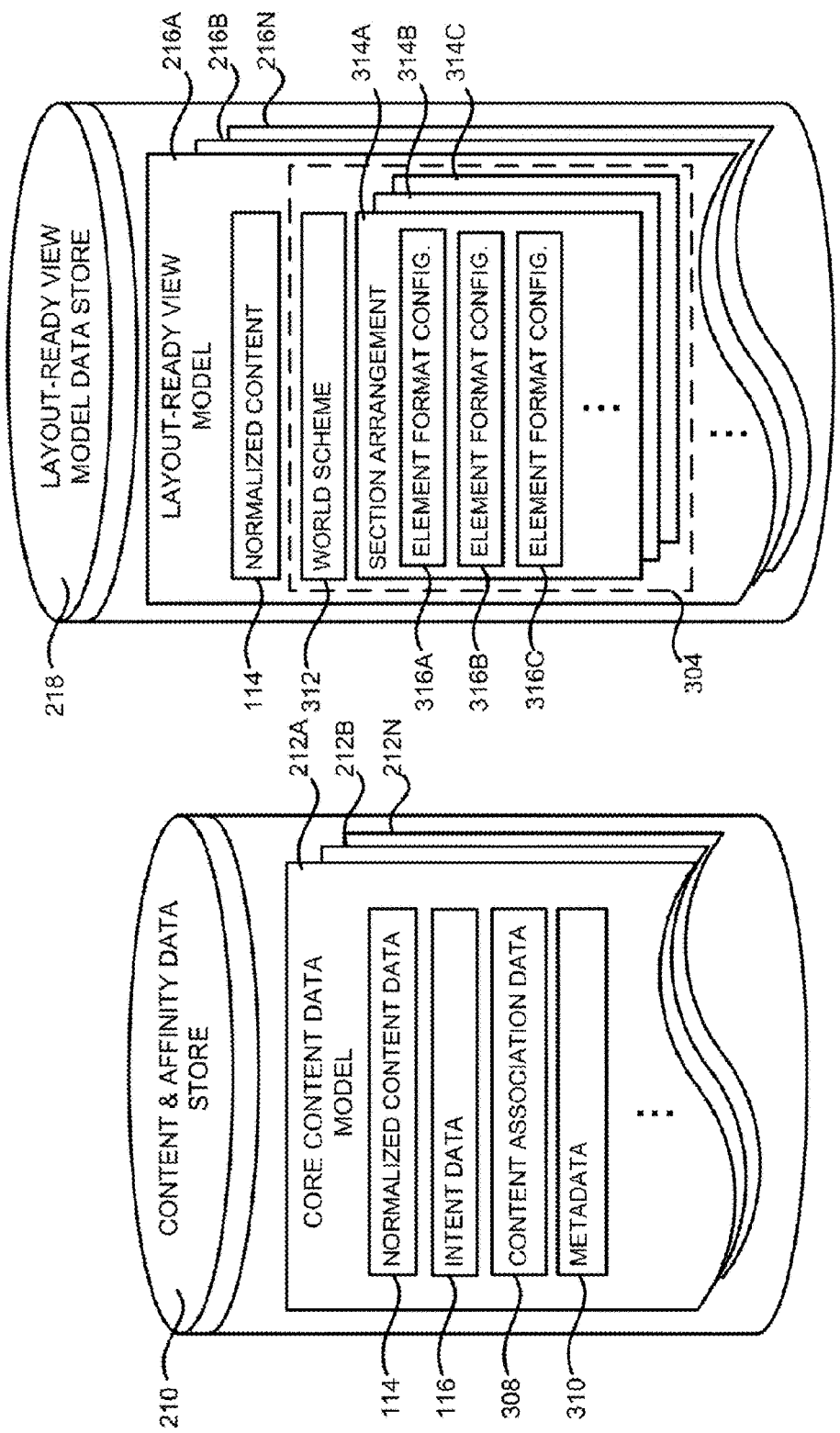
FIG. 3 is a data structure diagram illustrating a number of data elements contained in a core content data model and in a layout-ready view model.

FIG. 3 illustrates detailed data elements contained in a core content data model 212. As shown in FIG. 3, a content and affinity data store 210 may contain one or more core content data models 212A-212N, which may be referred to herein individually as a core content data model 212 or collectively as the core content data models 212. Each of the core content data models 212 may correspond to authored content to be presented as one output. As illustrated in FIG. 3, a core content data model 212 may include normalized content data 114, intent data 116, content association data 308, metadata 310 and potentially other data. The normalized content data 114 may include content data elements that do not have any formatting associated therewith. For example, if a content data element of the normalized content data 114 includes a block of text, the content data element may only include American Standard Code for Information Interchange ("ASCII") codes of the characters included in the text.

The core content data model 212 may further include the intent data 116 that describes the intent of the author 102 on how the content data 114 should be presented. The intent may include the explicit or implicit intent of the author. The intent may be conveyed by the author 102 through indicating relationships or selecting presentation choices for the content data elements contained in the content data 114. By using intent, an author 102 may avoid providing specific formatting instructions, and thus allow the content data 114 to be dynamically presented in a variety of arrangements that are suitable for different rendering devices without deviating from the original intent of the author 102.

The intent of the author 102 may include intent relating to the presentation of content, such as spacing, appearance (e.g., modern, traditional, professional, etc.), animation level (e.g., no animation, modest animation, or active animation), timing, and other aspects. Data defining the intent may be referred to herein as intent data 116.

The intent of the author 102 may also include the intent of the author 102 to convey content through particular semantic expressions. Semantic expressions describe the specific, but often implied relationships represented in recognizable visual exemplars of content. Semantic expressions need not be explicitly stated by the author and may instead be inferred by choices of the author regarding visual exemplars with which to present content. To facilitate the author 102 communicating intent, various visual exemplars may be designed and offered to the author 102 for the author to choose from. These visual exemplars can represent editorial intent, including the expression of specific semantic expressions. Semantic expressions can describe such aspects as structure, layout, text, individual expression, flow and pacing, and others.

Figure 4A:
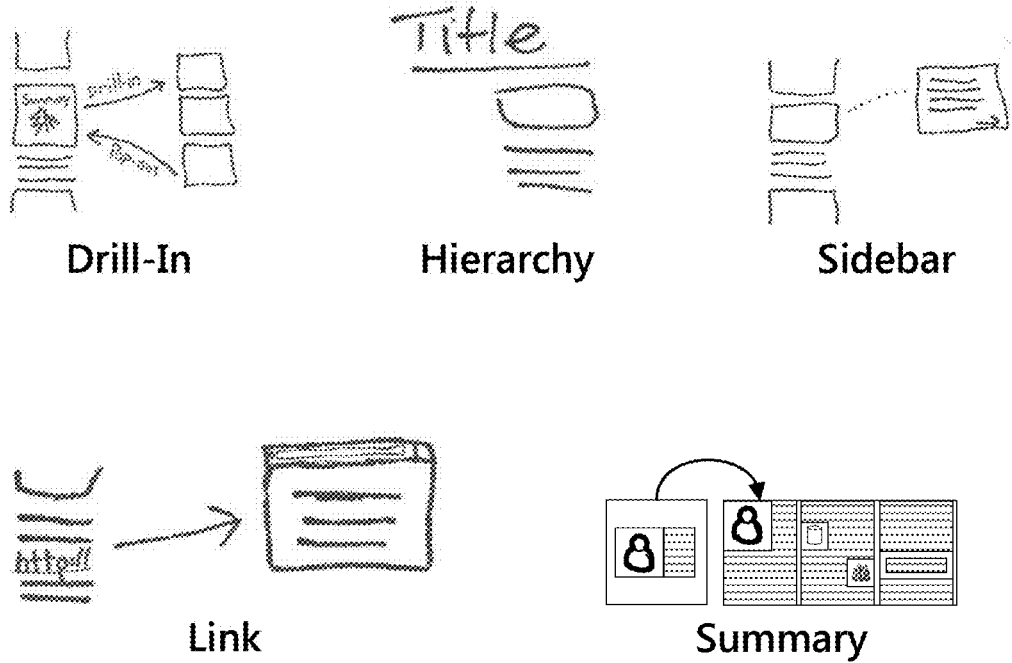
FIG. 4A illustrates example semantic expressions for structure, including hierarchy, drill-in, summary, hyperlink, and sidebar.

FIG. 4A illustrates example semantic expressions relating to structure, including hierarchy, drill-in, summarization, hyperlink, and sidebar.

Hierarchy: The hierarchy semantic expression can be used to show an organization, such as rank or order, within a set of content. Examples of visual exemplars expressing hierarchy can include, for example, text expressing titles, headings, sub headings, and outlines.

Drill-in: The drill-in semantic expression can be used to show a deeper or more detailed view on particular content. Examples of output expressing drill-in can include a button or link that moves attention to another view or world and pops back out to the main content flow when done. Another example output can include a collapsed outline with an interface element (e.g., displayed as a plus sign) that, when clicked or selected, expands or drills in to the details.

Summarization: The summarization semantic expression is content that expresses a brief view of a larger subject. The summarization semantic expression is often tied to the drill-in semantic expression where a visual exemplar of the summary is presented alongside a drill-in visual exemplar to allow the audience or presenter to access deeper information regarding the summarized content. Examples of visual exemplars expressing the summarization semantic expression can include a slide presenting an abstract of a paper.

Hyperlinks: The hyperlink semantic expression expresses an ability to jump to another point in an output (e.g., another slide in a presentation) or to a place outside of the output. Hyperlinks semantic expressions are generally embodied in a one-way flow of data (e.g., leaving the presentation to arrive at an external site). Examples of visual exemplars expressing the hyperlink semantic expression include text hyperlinks in a body text that allow a user to leave to a resource external to the content (e.g., a "buy now" hyperlink in a product presentation that takes a user to a purchase page).

Sidebars: Sidebar semantic expressions express a branch of related content with a visual teaser. Sidebars can be similar to hyperlinks, but provide a stronger correlation between the source and linked content by showing a preview. An example of a visual exemplar expressing the sidebar semantic expression can include a summary image link to additional content outside of the output. In an example, the sidebar can be visually related to some content within the output but is not part of a main story of the output.

In another example, semantic expressions can include semantic expressions for sets of content. In an example, a set of content can be expressed using a group semantic expression or a cluster semantic expression. Groups and clusters are nearly synonymous. The following description includes differences that are meant when reference is made to one or the other.

Clusters can be suited for loosely-related content. Clusters of content can be configured to flow across one or more screens and can be visually separate from other content. Content in clusters can be consistently sized, regardless of nesting and quantity of elements within a cluster. The sizing of an individual content element of a cluster can be influenced more by its shape and emphasis than the number of total elements in a cluster. An example of a cluster is the contents of a chapter.

Figure 4B:
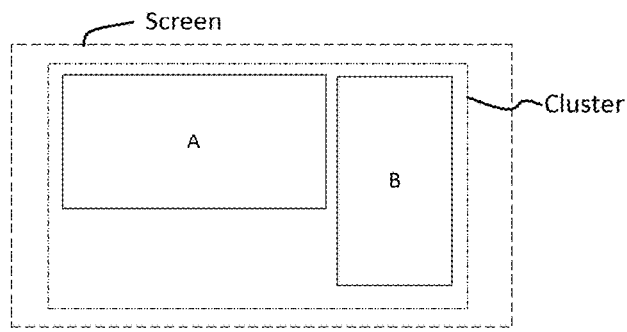
FIG. 4B illustrates an example cluster of content elements.
Figure 4C:
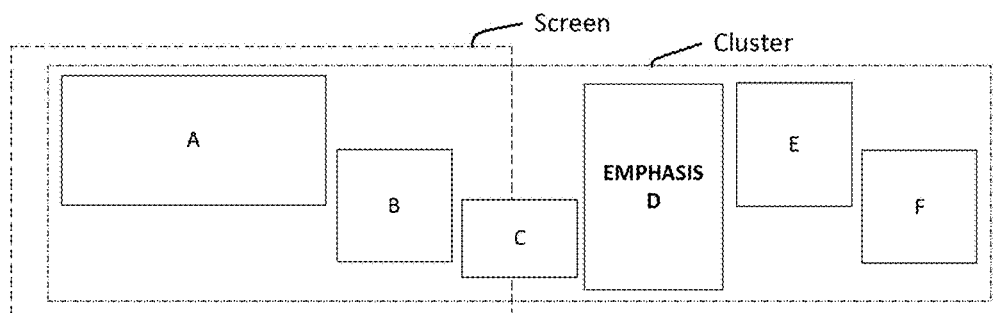
FIG. 4C illustrates another example cluster of content elements.
Figure 4D:
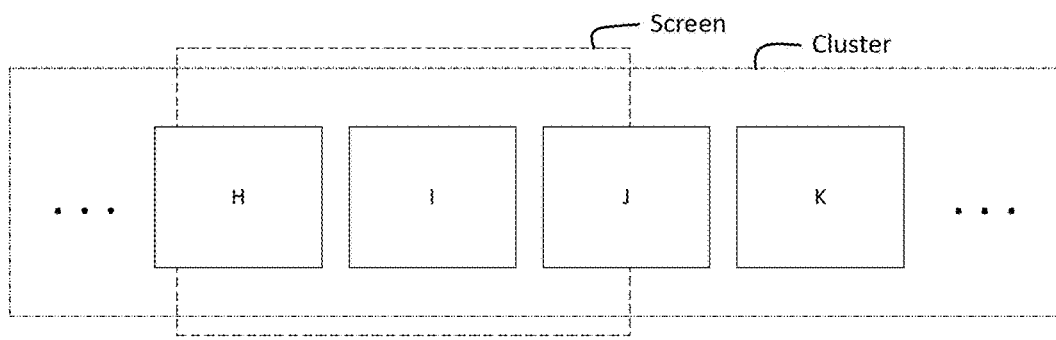
FIG. 4D illustrates an example cluster of content elements arranged according to a filmstrip visual exemplar.

FIG. 4B illustrates an example cluster of content elements A and B, which fit within a single screen of content. FIG. 4C illustrates an example of a larger cluster of content, which includes content elements A-F. Here, content elements A, B, and part of C are able to fit within a single screen, while the rest of C, D, E, and F are allowed to flow off screen. This additional content can be accessed by, for example, scrolling the screen. As illustrated, a user has given emphasis to content item D. FIG. 4D illustrates an example cluster of content elements H-K in a filmstrip visual exemplar.

Figure 4E:
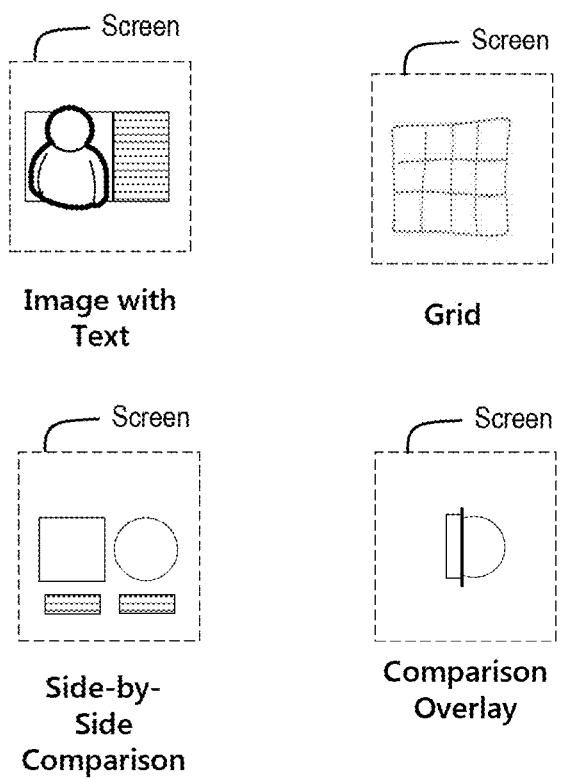
FIG. 4E illustrates examples of groups of content arranged according to visual exemplars, including image with text, grid, side-by-side comparison, and comparison overlay.

Generally speaking, the group visual exemplar can be suited for use with tightly-related content that a user would like to attempt to fit on a single screen. The sizing of grouped content can vary to fit the content, and are visually separated from other content. FIG. 4E illustrates examples of visual exemplars expressing the group-of-content semantic expression, including image-with-text, grid, side-by-side-comparison, and comparison-overlay visual exemplars.

The use of the semantic expressions of groups and clusters need not be limited to content elements. For example, a group can include a cluster or another group, and clusters can include a group or another cluster, in addition to content elements.

FIG. 4F illustrates an example of a cluster of content element A, content element B, and a cluster of content elements C, D, and E.

FIG. 4G illustrates an example of a cluster of groups. As illustrated, the groups each include an image content element and a text content element. Such an arrangement can be used to keep quotes or captions together with the image with which they belong. In an example, the layout generation engine 108 can add uniformity to the groups within the cluster, such that the positioning of the text is consistent between groups and the images are cropped to the same aspect ratio.

FIG. 4H illustrates an example group including content elements D, E, and F, along with a group of content elements A, B, and C. As illustrated, the elements within the outer group are sized to fit within the outer group's container. This has the effect of resizing the container size of the inner group, which, in turn, affects the size of the group of elements A-C, which are all consistently sized with each other within the size of the container of the inner group.

FIG. 4I illustrates an example group including content elements D, E, and F, along with a cluster of elements A-C. As with FIG. 4H, the elements of the outer group are consistently sized. This also affects the size of the cluster. The size of the elements of the cluster need not be scaled to all be visible within the cluster. Instead, the elements can be allowed to flow outside of the cluster (in this case element C), but the cluster remains within its own cell of the grid formed by the group. Such elements can be accessible through a user interface (e.g., a scroll element, as illustrated).

In some output, changes in perspective can occur with sub-groups and sub-clusters. For example, a sub-group or sub-cluster can be treated as an individual element when viewed at a group or cluster level. Perspective can change to focus on the sub-group or sub-cluster and it can be treated as a cluster or group having its own elements. For example, a piece of content can be viewed as a summary when viewed among other content elements of its group, but when focus is placed specifically on the summary element, the summary element can be expanded to show the content that it embodies.

Grouping and clustering of content can be specified explicitly by the author, implied by author choices, or entirely automatically generated. In an example, an author splits content across multiple sections but does not explicitly group or cluster the content of the respective sections. The layout generation engine 108 can automatically group or cluster content within the section. In an example, the automatic grouping or clustering of content can be by the system automatically choosing a visual exemplar, rather than letting the layout generation engine 108 generate a layout. This automatic choice of a visual exemplar for the content can allow for the previously-discussed feedback loop, which allows the author to make corrections.

In addition to or instead of semantic expressions such as grouping and clustering, sets of content can also express other semantic expressions, including continuity, uniformity, and ordering.

Continuity: The continuity semantic expression can describe how closely a set of content is related, whether the content goes together, whether the content should be shown together, and how separate the content is from other content. Example variations of continuity can include: no continuity, loose continuity, and tight continuity.

In an example, content having no continuity can be kept apart from each other and shown one at a time. Content having no continuity can include separate ideas or thoughts (e.g., separate destination options when presenting options for a family trip).

Content having loose continuity can flow together, and can include ideas or concepts that have some continuity but need not all be presented at the same time (e.g., presenting activities that the family can do while at a respective destination). The loose-continuity content can be visually separated from content coming before and after it. The loose-continuity content need not be kept on the same screen together, but techniques can be used to emphasize the relatedness of the grouped items, including scrolling, separation, white space, headers, decorators, animations, clustering, and organization. For example, the content can be allowed to flow across screens once there is too much content to fit on a single screen. An example of visual exemplars expressing loose continuity include the filmstrip of content shown in FIG. 4D, which allows the content of the cluster to flow off screen if there is too much content to fit on a single screen. Visual exemplars of clustered content typically express the semantic expression of loose continuity.

Visual exemplars expressing tight continuity can include visual exemplars for circumstances where it is important that a set of content be seen together as a whole (e.g., the visual exemplar of image comparison, such as a before-and-after picture of a sandcastle that was destroyed by a wave). In some examples (e.g., where there is more content than can be fit on a single screen), attributes of the content (e.g., size) can be modified so the content can be seen together. Examples of visual exemplars that are express tight grouping include images with quotes, images with captions, side-by-side comparisons (e.g., two images side by side for comparison), diptychs, comparison overlays (e.g., two images placed one over the other, and a visual divider that can move from one end to the other showing a portion of either image, one on each side of the divider.), tile words, and grids of content (e.g., a grid of class photos or flags of the world). Visual exemplars of grouped content typically express the semantic expression of tight continuity.

Uniformity: The semantic expression of uniformity can describe the homogeneity of sets of content. Examples of variations of uniformity can include strict uniformity, loose uniformity, or no uniformity. Visual exemplars expressing strict uniformity can include visual exemplars having sets of content where all or substantially all of the attributes (e.g., height, width, alignment, spacing between adjacent content, etc.) of the content are identical to other content within the set. For example, the grid visual exemplar expresses the semantic expression of strict uniformity (e.g., a grid of student yearbook portraits). As another example, visual exemplars of comparisons often express strict uniformity to aid the user in the comparison (e.g., before-and-after comparison images). Loose uniformity can be seen in visual exemplars where some attributes of content in a set of content are fixed and others are variable across the content of the set. Examples of visual exemplars expressing loose uniformity include triptychs having a wider center image. The semantic expression of no uniformity can be seen in sets of content where content elements have attributes that vary from one another such that the overall set conveys randomness (e.g., the content of the set is scattered about, rotated, of different sizes, or unaligned). The semantic expression of no uniformity need not mean that there are no similarities among content attributes within a set of content. Rather, the semantic expression of no uniformity can include situations where there is substantially no uniformity or the overall impression to a viewer is a lack of uniformity. For example, a collage of photos having the same or similar size may nonetheless convey a lack of uniformity based on rotation, overlap, and other attributes.

Figure 4J:
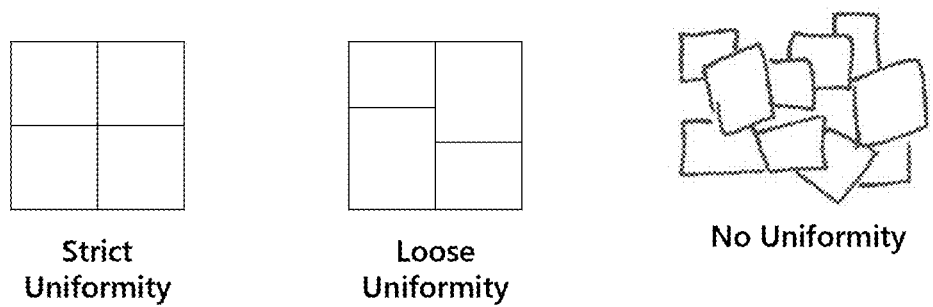
FIG. 4J illustrates examples of content having strict, loose, and no uniformity.

FIG. 4J illustrates examples of content having strict, loose, and no uniformity.

Ordering: The ordering semantic expression can describe the organization of content in a particular way. Variations of ordering can include strict ordering, loose ordering, and no ordering. Visual exemplars expressing strict ordering express to the audience a precise ordering of content. Examples of visual exemplars expressing strictly-ordered content often include lists (e.g., a numbered list of steps for carrying something out, such as cooking a meal or building a birdhouse). Visual exemplars expressing loose ordering can include visual exemplars expressing content in a manner in which the content can benefit from ordering but need not occur in a strict process. In an example, a collection of photos from a trip can benefit from ordering but need not be strictly-ordered and may be expressed using a visual exemplar expressing loose ordering. When assembling output for visual exemplars of loosely-ordered sets of content, the layout generation engine 108 can attempt to respect the order of the content, but may rearrange some groups of items to present a more aesthetic view or for other reasons. Visual exemplars expressing no ordering convey no particular order to the content. Such visual exemplars can be used with sets of content with where order of the content is unimportant. Ordering and uniformity often occur together, and they can be found together in such visual exemplars as numbered or bulleted list.

Figure 4K:
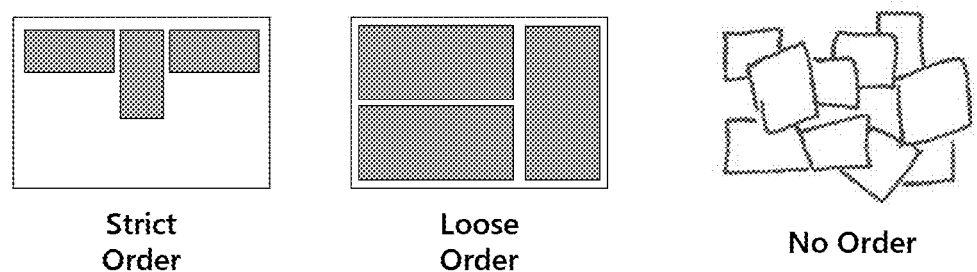
FIG. 4K illustrates examples of content having strict, loose, and no order.

FIG. 4K illustrates examples of content having strict, loose, and no order. For example, as shown in FIG. 4K, strict ordering can include landscape content followed by portrait content followed by landscape content. This content can be rendered with loose ordering by having the landscape content arranged one over the other and the portrait content arranged to the side, as shown in FIG. 4K.

Equality: The semantic expression of equality can relate to the relative importance of two or more content items. For example, equality can be expressed in a layout of a text and an image having a similar size, such as where the text is a quote and the image is an image of the person who said the quote. In another example, inequality can be expressed in an image being made larger than other images on a screen.

Semantic expressions regarding text can include various aspects of the placement and use of text. Text semantic expressions can include block text, quotation, the relationship between text and images, body text, citations and attribution, text sizing, and titles.

Block text: The semantic expression of block text relates to the relationship between text and other content and can be used to relate to setting text off from main content as a block. For example, the expression of this semantic expression (e.g., with the visual exemplar of text as block text) is often used with a quotation, such as block quotes, to set the quotation off from a main body of content.

Quotation: The semantic expression of quotation relates to the relationship between, usually text, content and an author of the content. For example, the expression of this semantic expression (e.g., with the visual exemplar of text as quotation) is often used to indicate that particular content is from a source other than the author of the output.

Text and media: The semantic expression of text and media (e.g., image, video, or audio media content) can relate to the relationships between media and text, including media with block text, text with background media, captions, body text with one or more media items, and citations.

For visual exemplars expressing the semantic expression of media with block text, the visual exemplars express media and text in a substantially equal manner and the text is usually in a larger typeface than regular, body text. An example visual exemplar expressing the semantic expression of media with block text includes a visual exemplar showing a quotation next to an image or video of the author of the quotation.

For visual exemplars expressing the semantic expression of text with background media, the visual exemplar often expresses text superimposed over a background image, but other kinds of background media may also be used. In expressions of text with background media, the background media often expresses the semantic expression of media as background, in which the background media is subservient to content placed on top of it. For example, background video can be subservient to text placed over it, and it is usually okay to obscure the background media with the text. Further, the text is usually in a larger typeface than regular, body text. The background media typically serves to enhance the overall experience and are not usually intended to be closely inspected. A variation of text with background media can include a title or header text with media. In an example, title or header text that is placed over media can be consistent with other title or header text in the output. Another variation of text with background media can include poster text. The size of the poster text can be directly related to the size of the media that the poster text is being superimposed over.

Figure 4L:
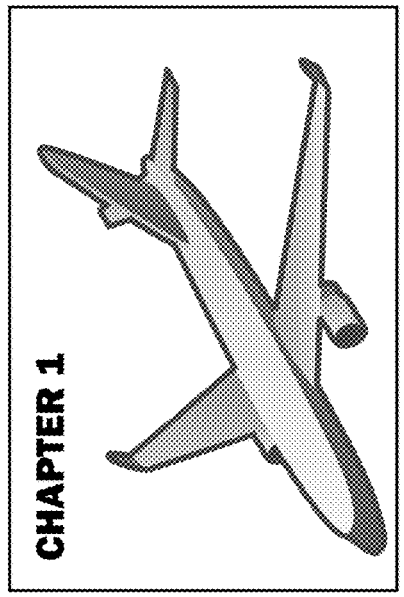
FIG. 4L illustrates examples of text with media.
Figure 4L:
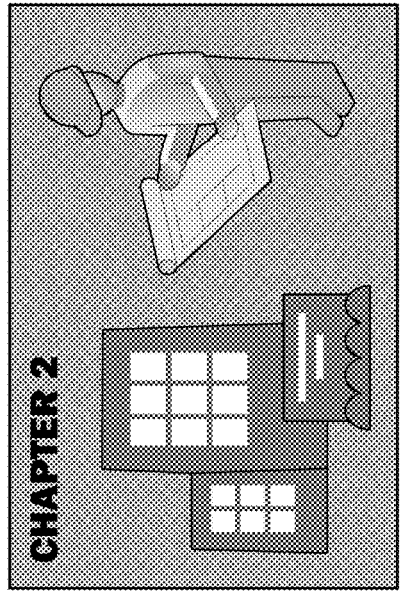
Figure 4L:
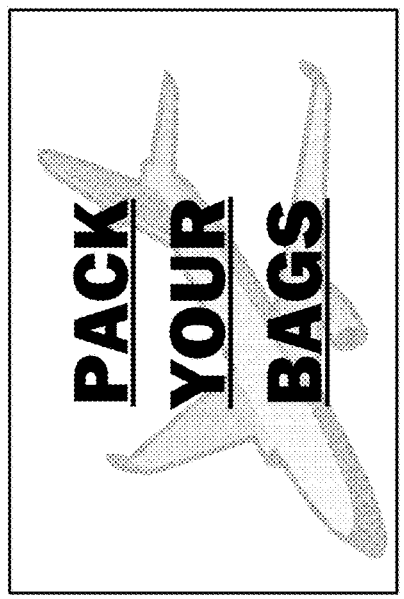
Figure 4L:
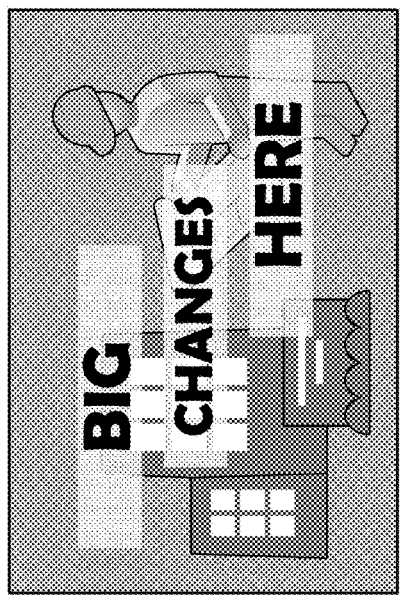

Examples of text with background media are shown in FIG. 4L.

The semantic expression of captions serve as an annotation and are typically descriptive and informative. When expressed in a visual exemplar, caption text is subservient to the media itself and placed in close proximity to the media in a small typeface. A single caption can apply to one or more media items.

Body Text: The semantic expression of body text describes the relationship between body text and other content. Body text is often used for large quantities of text. Images can appear in close proximity to the body text, such as before, after, inline, or with text wrapping around the image.

Citations: The semantic expression of citations describes the relationship between a piece of, usually text, content that is a quotation from or a reference to another work. The citation semantic expression is often used to reference a book, paper, or author in a scholarly context.

Attribution: The attribution semantic expression describes the relationship between a piece of content that provides credit to a source of content. In an example, attribution is typically used with image content but can be used with other content, such as text or video content. Attributions can be required for reuse of certain licensed content. Citations and attributions are often placed in a manner in which they are associated with the media being referenced but not necessarily directly next to the media.

Titles and headings: The semantic expression of titles and headings describes the relationship between a piece of, usually text, content that is used to describe a content element or a set of content elements.

In another example, the semantic expressions can include semantic expressions relating to the individual expression of content. These semantic expressions can include, for example, emphasis, accent, and showcase.

Emphasis and Accent: The semantic expression of emphasis and accent relate to one or more individual pieces of content standing out in relation to its peer content. Both can serve to make things more noticeable, with accented content being subtler than emphasized content. Emphasis often leverages size. Accent often makes content look different while retaining the same visual impact level and layout. Applying emphasis can involve increasing the size or color of media, modifying the position or spacing of media, and adding borders or decorators to media. Applying emphasis can involve using italics, drop shadow, glow, saturation, and color to make a content item stand out. The semantic expression of emphasis and accent can be used to, for example, draw attention to an author's favorite picture in a set of pictures or highlight an important phrase in a quotation.

Showcase: The showcase semantic expression can relate to content that stands on its own. Showcase is often applied to content when it is important to see the content as large as possible, rather than needing to understand the context of the content around it. Visual exemplars expressing the showcase semantic expression often place a content element so it fills an entire screen, such that the surrounding content may not even be visible, which can thereby make the showcased content stand on its own. Expressions of showcase can contrast from expressions of emphasis because emphasis often describes the relationship between one or more individual content elements and their relationship to peer content, while expressions of showcase often have the showcased content standing on its own. The semantic expression of showcase can be used to, for example, present a gorgeous, high-resolution image that is a centerpiece of the authored content (e.g., a painting that is a subject of the output)

In another example, semantic expressions can include semantic expression relating to flow and pacing, such as optional and reveal.

Optional: The semantic expression of optional can be expressed by visual exemplars that make particular content available on request, but not part of the main progression through the output. In this manner, visual exemplars expressing the semantic expression of optional can be used to alter the flow of the content within an output. Optional content can include content that is obscured, hidden, or otherwise deemphasized unless accessed. In an example, optional content is skipped. In an example, a user can navigate through optional content as far as the user wishes and then skip the rest. Examples of option content include verbose product details or back-up content accessed in response to a particular question from an audience member.

Reveal: The reveal semantic expression can be expressed by pacing elements and that allows the user to build suspense to a conclusion in a situation where the conclusion should not be visible until the author is ready for it to be revealed. In this manner, the reveal semantic expression can allow the author to build up to a point and then release it when the author is ready. Examples can include a punch line, a culmination of a story, an answer to a question. An example of a visual exemplar expressing reveal can include a flip card that reveals an amount of content on demand. Another example is an explicit wait-to-reveal option that pauses for the presenter before moving on to reveal what comes next.

Certain semantic expressions can be expressed by entire sets of content at once (e.g., a set of photos can express strict uniformity), while others apply to one or more items of content within a set of content (e.g., an image of a set of images can have emphasis). Some expressions, such as reveal, emphasis, and showcase are examples that an author may prefer to apply on a per-content basis, regardless of the level of the content (e.g., group level sub-group level, sub-sub-group level, etc.).

Figure 4M:
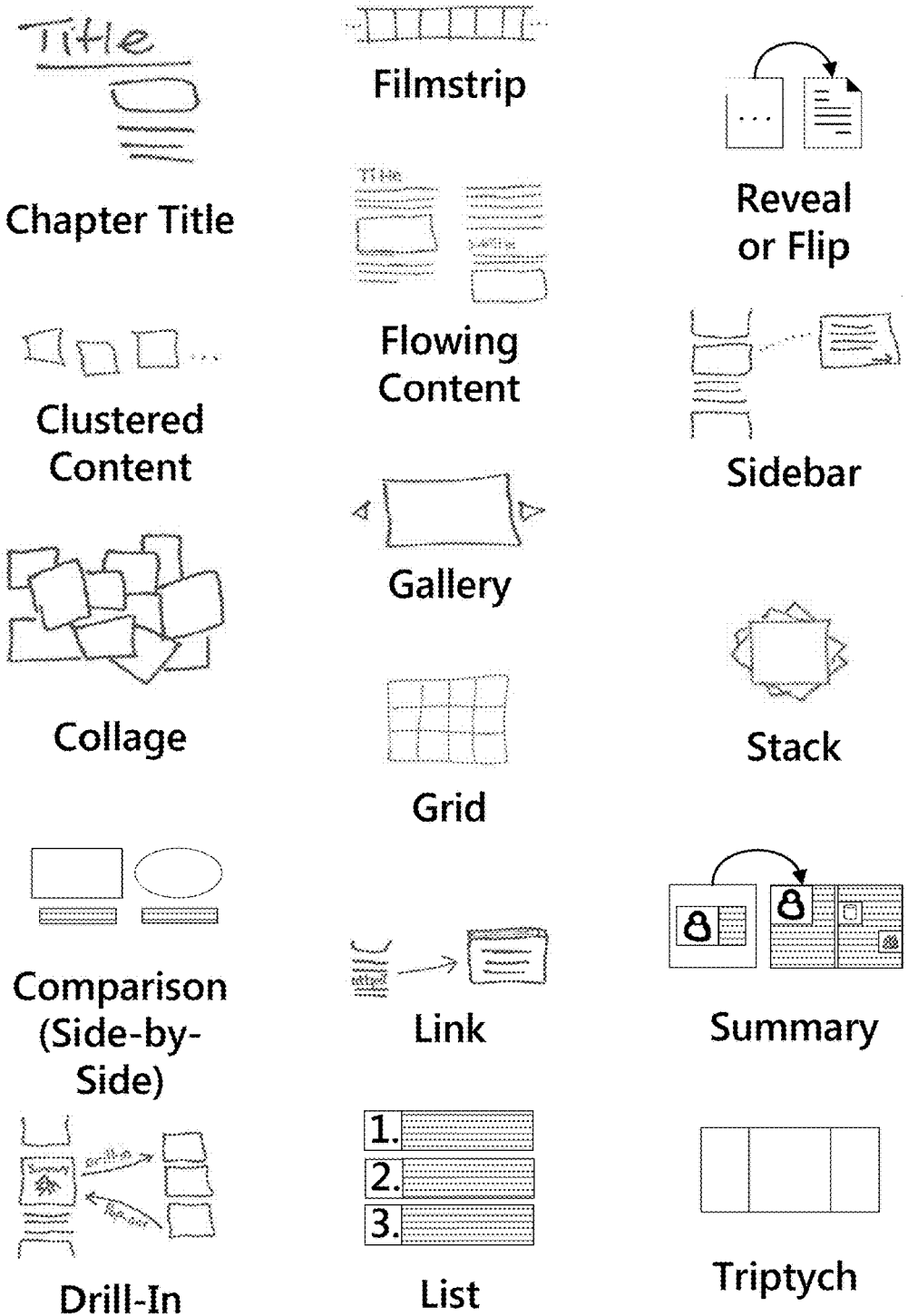
FIG. 4M illustrates example visual exemplars.

Semantic expressions, such as those discussed above, reflect low-level storytelling techniques that can be used to communicate complex relationships to viewers. The semantic expressions can be expressed by visual exemplars of content, which can form the building blocks upon which the output is based. Examples of visual exemplars are shown in FIG. 4M and examples of associated semantic intent are shown in TABLE II below. The shown relationships need not be exclusive. Other semantic expressions may apply to respective visual exemplars.

TABLE II

| Visual Exemplar | Semantic Expressions |
| --- | --- |
| Chapter Title, headings, subheadings | Hierarchy |
| Clustered Content | Loose Continuity |
| Collage | Non-uniform |
|  | Tight continuity |
| Comparison (e.g., side-by-side comparison) | Tight Uniformity |
|  | Tight continuity |
| Drill down | Drill-in |
|  | Optional |
|  | Hierarchy |
| Filmstrip | Tight Uniformity |
|  | Loose Continuity |
| Flowing content | Loose continuity |
| Gallery | Optional |
|  | Tight Uniformity |
| Grid | Tight Uniformity |
|  | Tight continuity |
| Link | Optional |
|  | Hyperlink |
| List | Strict Ordering |
|  | Strict Uniformity |
| Reveal or Flip | Reveal |
| Sidebar | Branching |
| Stack | Optional |
|  | Loose continuity |
| Summary | Summarization |
| Triptych | Loose uniformity |

The author 102 need not explicitly express which semantic expressions that the author 102 would like to use with particular content. Rather, the author 102 can be provided with visual exemplars from which to select. The layout system can then extract from those visual exemplars the semantic expressions that the author intended to convey by choosing that visual exemplar.

The intent data 116 may also be obtained from sources other than the author 102. For example, the intent data 116 may be derived from a structure or formatting information of content data retrieved from content resources 126. When an article is retrieved from the content resources 126, the structure of the article may help to identify the title of the article and the titles of each section as semantic titles, rather than body text. The titles of the article or the sections can be inferred from, for example, the point size and spacing of each of the titles, even if the content was not explicitly identified as a title in the source (e.g., by using explicitly-defined title styles). Similarly, the intent data 116 may also be inferred from other content or documents related to the content data 114, such as a document provided by the author 102 where content data 114 may be retrieved or a document having a similar style to what the author 102 wants. Based on the derived or inferred intent data 116, the author 102 may further make adjustment or additions to convey his/her intent for the content data 114.

Returning to the discussion of core content data model 212 of FIG. 3, according to further aspects, the core content data model 212 may also include content association data 308 that describes relationships between content data elements in the content data 114 and/or other content that may be related to the content data 114. For example, the normalized content data 114 may include an image with an original resolution of 2400 by 3200 pixels. When presenting such a high-resolution image on a smart phone device with a low resolution display, it may not be necessary to transmit the original image to the smartphone. Instead, the original image may be down-sampled to generate an image with a lower resolution to be transmitted to the smartphone. In such a scenario, the content association data 308 may be used to indicate that the original image has an image with a lower resolution associated therewith and may be used when proper. Similarly, when scaling down such an image, it may become too small to be viewable. In such scenarios, cropping may be used to focus on the area of the image that is deemed important by the author.

In addition, content related to the content data 114 may be explored and retrieved from content resources 126. The content association data 308 may also be used to describe the relationship between the retrieved content and the content data 114. It should be noted that during the lifecycle of the content data 114, related content may continuously be identified and/or retrieved, and thus the content association data 308 may be updated periodically to reflect the newly identified related content.

Depending on the content data 114, some of the content data elements may have metadata associated therewith. Such metadata may be stored in the metadata 310 of the core content data model 212. For example, the metadata 310 may include metadata of a picture contained in the content data 114, such as the location where the picture was taken, a time when a picture was taken, and/or the size of the picture. Although the metadata 310 may not be the intent directly specified by the author 102, it may be useful in deriving or inferring the intent of the author 102, and/or in generating the layout for the content data 114. It will be appreciated that additional data elements may be contained in the core content data model 212 beyond those described herein, and that not every data element described will be available for authored content.

FIG. 3 further illustrates layout-ready view models 216A-216N stored in the layout-ready view model data store 218 (which may be referred to herein individually as a layout-ready view model 216 or collectively as the layout-ready view models 216) and the data elements that may be contained in a layout-ready view model 216. A layout-ready view model 216 may be generated by the layout generation engine 108 based on a core content data model 212 in the content and affinity data store 210. When generating the layout-ready view model 216, the layout generation engine 108 may transform the intent data 116 into various formatting configurations that may together define the layout for the content data 114. These formatting configurations and the content data 114 may be stored in a layout-ready view model 216 and be ready for rendering by a rendering device 110.

Specifically, the layout-ready view model 216 illustrated in FIG. 3 includes the normalized content data 114 that is to be presented, and the layout 304 of the content data 114. As discussed above, a layout of content data may include a macro-level scheme for presenting the content data, a mid-level scheme of arrangement for a group of content data elements of the content data, and a micro-level scheme for each of the content data elements. The layout 304 shown in FIG. 3 includes a world scheme 312 which may be employed as the macro-level scheme of the layout 304.

The world scheme 312 may specify an overall structure of the layout 304, and describe high-order interaction assumptions, layout constraints, and/or potentially other constraints/ assumptions. Worlds can provide a sense of flow through various sections and can allow for various navigation schemes through the content. For example, worlds can have a horizontal or vertical flow through the content. As another example, worlds can have a stage or fixed viewport through which the content moves. In another example, the world can be arranged as a canvas across which the content can be spread in a variety of directions. In addition to horizontal and vertical directions, worlds can also have flow in a depth direction (e.g., z-direction) and can convey a sense of three-dimensional space. Worlds themselves can be visual exemplars of semantic expressions to convey the author's intent.

Figure 5A:
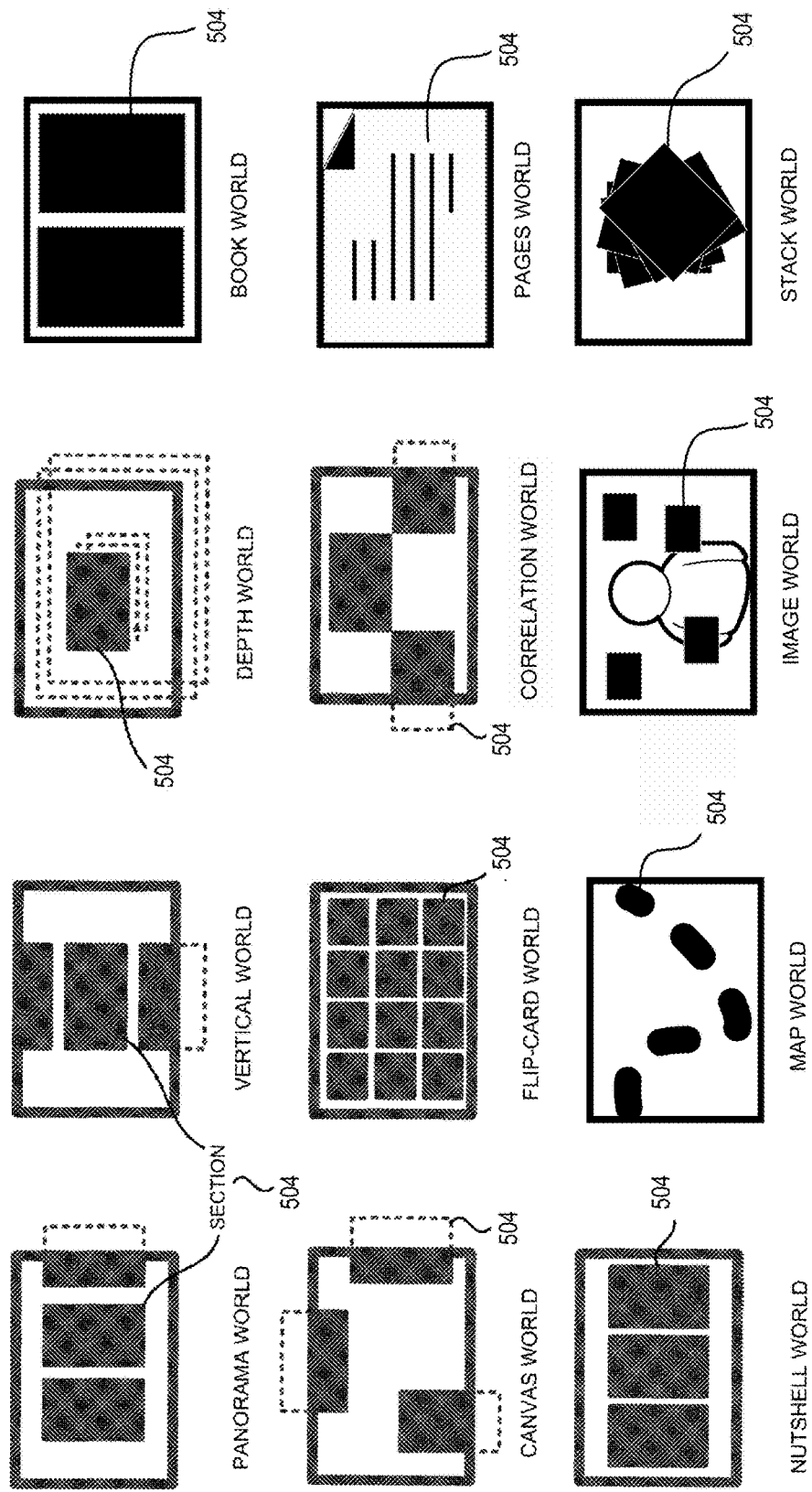
FIG. 5A illustrates example world schemes that may be used to generate a layout for content data.

FIG. 5A illustrates several example world schemes that may be used in the layout 304 of the content data 114. A detailed description of each of the world schemes shown in FIG. 5A is provided in Table III. It should be understood that the world schemes presented in Table III are for illustration only, and should not be construed as limiting. Additional world schemes may be designed and used beyond those described herein.

TABLE III

| World Scheme | Description |
| --- | --- |
| Panorama World | A continuous, horizontally-scrolling arrangement of content. The panorama world can include, for example, parallax effects, clustering or sub-grouping, simple adorning animations, and varied rates of panning to give the content a dynamic sense of liveliness |
| Vertical World | The vertical world can share similarities with the panorama world, and convey a continuous, vertically-scrolling arrangement of content. |
| Depth World | A 3D-rendered world in which the content ultimately fits into a collection of "sections" or stories. A consumer can switch from section to section by panning in the horizontal axis, and then dive into more detail for a particular section by traversing into the world along the z-axis. In another example, the consumer can switch from section to section, by traveling deeper into the world along the z-axis. In another example, the consumer can follow a three-dimensional map through the world. In another example, the user can jump to different points within the 3D space. |
| Book World | Sections in a book world can be arranged as though pages or chapters within a book that the consumer flips through to traverse content. |
| Canvas World | A canvas world can include a seemingly-infinite canvas with the potential for a variety of layouts. This world can use a pan-and-zoom approach to navigation, an ability to drill-in to details which may be at a deeper zoom level than the main content, and can support rotation, both in layout and navigation. |
| Flip-card World | The flip-card world can express a random-access experience in which a set of information is displayed on screen (e.g., in a grid like format), and the consumer may pick content from the set that he or she would like to explore next to reveal more about the topic. |
| Correlation World | The correlation world can include an arrangement that relies upon correlation among metadata associated with the content data elements. The world can use the correlation to represent content in a dynamically scaled and correlated sequence. For example, the content can be arranged as part of a timeline, points along a map of a place, or in other manners. The correlations can be explicitly specified by the author or inferred, (e.g., through EXIF date of images). |
| Pages World | The pages world can include an arrangement as though sections of content are pages. |
| Nutshell World | The nutshell world can include a 2D rendition of depth world where top-level categories are traversed along a horizontal axis and diving deeper into a topic can be performed by panning in the vertical axis. |
| Map World | The map world can include an arrangement where sections are laid out along a path and the consumer follows the path as the content is consumed. |
| Image World | The image world can include an arrangement where sections are laid out over a background image and the consumer moves around different portions of the image to reach the sections. |
| Stack World | The stack world can include an arrangement where sections are laid out as though they were a stacked on top of each other. |

As shown in FIG. 5A, each of the example world schemes may include one or more sections 504 (which may be referred to herein individually as a section 504 or collectively as the sections 504). The sections 504 may be employed as mid-level schemes to arrange content data elements as sets, with each set filling one or a few pages or screens. One example section may include a single image scaled to fill an entire screen with some title text and some caption text super-imposed over two different regions of the image. Another example section may include a large block of text broken into three columns which wrap around a 16 by 9 aspect ratio video playback widget with a video thumbnail inside it. The sections may be designed to be generalized and multi-purpose, so that a section of a screen-full of content can be used as a building block during the build-up of a wide variety of world schemes. In some configurations, the sections may include a screen at a time, but they can also extend beyond the screen in any logical fashion. For instance, viewing thirty closely-related images, they may be shown clustered together, but scrolling off the screen. In such configurations, the end of the cluster may include white space before the next content.

As discussed above, world schemes may be stored in the layout resource data store 214. Additionally, or alternatively, the world schemes may be stored in any data storage that is accessible to the layout generation engine 108. It should be further understood that 3rd parties may also build world schemes which may be incorporated into the system, stored in the layout resource data store 214, and/or used by the layout generation engine 108.

Referring back to FIG. 3, the layout 304 may further include section arrangements 314A-314C, each of which may describe the arrangement or design of a corresponding section 504 of a world scheme 312. Since each section 504 may typically include one or more content data elements, the formatting of these content data elements may be used as the micro-level scheme of the layout. Such micro-level scheme may be described in the element format configurations 316A-316C contained in the layout 304.

It should be noted that the above-described data elements of layout-ready view model 216 are for illustration only. Additional data elements may be contained in the core content data model 212 beyond those described herein, and that not every data element described will be available for authored content. For example, a section 504 contained in a world scheme 312 may also include a world scheme 312 in itself, and thus resulting in a nested world scheme or a "world-within-world" scheme. Similarly, a section 504 may be nested in another section, thus creating nested section arrangements. In such scenarios, the data elements contained in a layout-ready view model 216 may contain more information than that shown in FIG. 3. It should also be noted that following the nesting idea, a large variety of world schemes and/or section arrangements may be created and used in generating the layout 304 for content data 114.

It should also be appreciated that the mappings of the world scheme, section arrangement and element format configuration to the macro-level, mid-level, and micro-level schemes are only illustrative and should not be construed as limiting. Various other ways of building the macro-level, mid-level, and micro-level schemes may be employed. For example, in a nested world scheme, the mid-level scheme may be built to include the world schemes nested inside another world scheme, which may include the high-level structure as well as the sections arrangements of the nested world scheme. Alternatively, the nested world scheme may be regarded as the macro-level scheme and the sections of the nested world may be considered as the mid-level scheme.

The layout 304, the world scheme 312, the sections 504, and the content data elements contained in the section may be further explained using the example layouts illustrated in FIGS. 5B and 5C. FIG. 5B illustrates an example layout using a panorama world scheme, which contains a section 506. Within the section 506, there are several content data elements 508: section title, text block 1, text block 2, image 1, caption 1, image 2, caption 2, image 3 and caption 3. These content data elements 508 are arranged in three columns: the first column is for section title; the third column is for image 3 and its caption 3; and the second column is for the remaining content data elements 508. In the second column, the content data elements 508 may further be arranged into two sub-columns, each holding a text block and an image along with the image caption. Such a design of section 506 may be specified in the section arrangement 314 corresponding to section 506. In addition, the section arrangement 314 may further specify other aspects of the section 506, such as page margin, the width of each column/sub-column, the relative position of content data elements 508 within each column, animation of the section, and so on. Furthermore, each of the content data elements 508 may have its own format configuration, such as the size, color, font type and the like. The format configuration for each individual content data element 508 may be stored in the element format configuration 316.

When a different scheme is selected for presenting the content data elements 508, the section arrangement 314 and element format configurations 316 may be different, and may be adapted to the selected world scheme. FIG. 5C shows a layout to present the content data elements 508 shown in FIG. 5B in a vertical world scheme. In the layout shown in FIG. 5C, the content data elements 508 are also grouped in one section 512, and they are arranged in rows, rather than columns. Other arrangements, such as page margin, row spacing, and animation of the section 512 may also be different from that of section 506. Similarly, each of the elements 508 may be formatted differently in the vertical world scheme, and thus the element format configuration 316 contained in the layout 304 may also be different.

It should be understood that the layouts shown in FIGS. 5B and 5C are merely illustrative and other ways of laying out the content data elements 508 may be used. For example, the content data elements 508 contained in the section 506 of the panorama world scheme shown in FIG. 5B may be laid out in different sections 512 in the vertical world scheme shown in FIG. 5C. There need not be section title for each of the sections 506 and 512. Content data elements 508 contained in section 506 shown in FIG. 5B may also be organized in one column, rather than multiple columns or sub-columns. Additionally, the content data elements 508 may be laid out using various other world schemes and/or combination of those world schemes. Across different layout variations, the one or more semantic expressions identified in the contracts of the visual exemplars can be constant, such that even where the content is laid out differently, the contract semantic expressions are still observed. For example, where a comparison visual exemplar is used, the comparison can still occur entirely on a single view (e.g., a single screen) across a variety of layouts.

Figure 6:
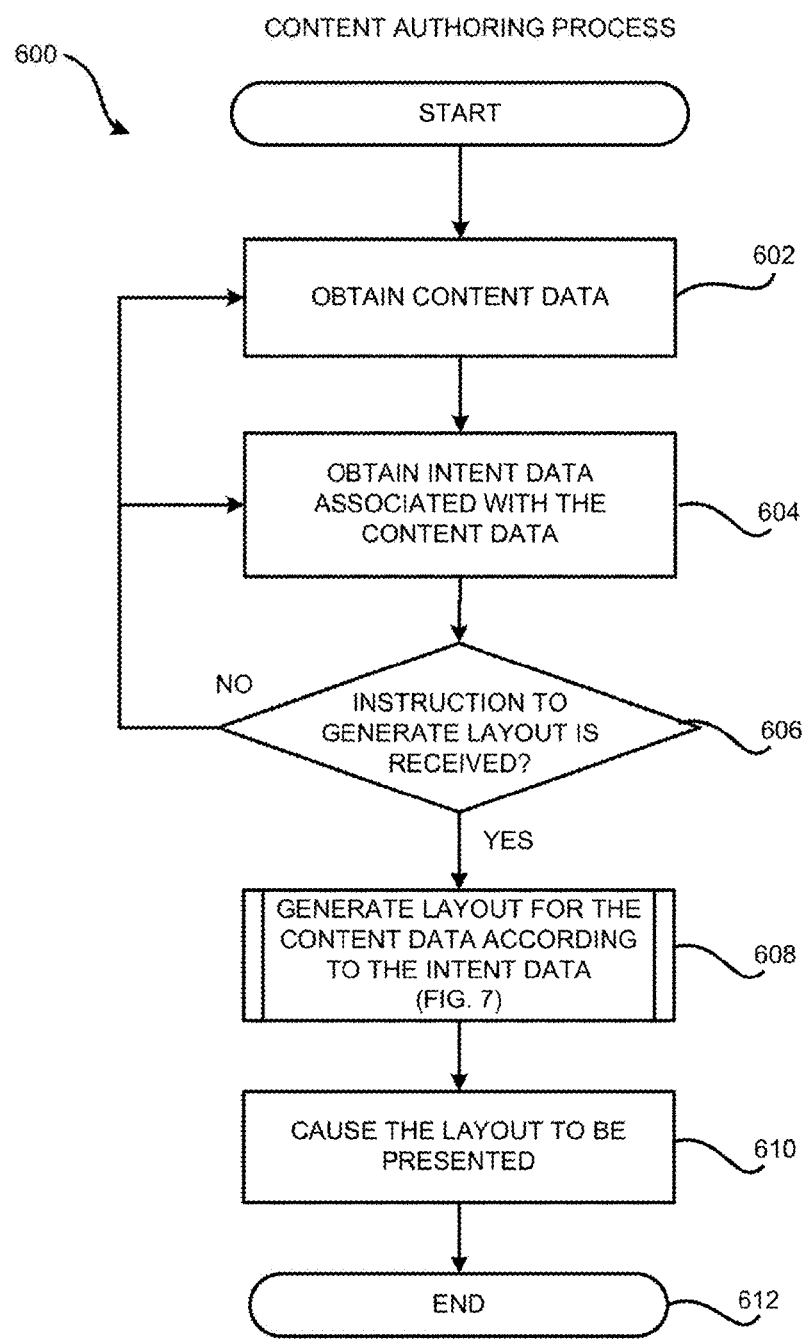
FIG. 6 is a flow diagram illustrating aspects of a process for content authoring.

Turning now to FIG. 6, aspects of a routine 600 for content authoring are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The operations of the routine 600 are described herein as being implemented, at least in part, by an application, such as the content collection/generation module 106 and the layout generation engine 108. Although the following illustration refers to the content collection/generation module 106 and the layout generation engine 108, it can be appreciated that the operations of the routine 600 may be also implemented in many other ways. For example, the routine 600 may be implemented by one module that implements functionality of both the content collection/generation module 106 and the layout generation engine 108. In addition, one or more of the operations of the routine 600 may alternatively or additionally be implemented, at least in part, by a web browser application or another application working in conjunction with, for example, an application service.

With reference to FIG. 6, the routine 600 begins at operation 602, where the content data 114 is obtained. As discussed above regarding FIGS. 1 and 2, the content data 114 may be provided by the author 102, such as through a user interface or through an API exposed by content collection/generation module 106. In addition, the content data 114 may be retrieved from various content resources 126 by the content collection/generation module 106.

From operation 602, the routine 600 proceeds to operation 604, where the intent data 116 for the content data 114 may be obtained. As described above, the intent data 116 describes the intent of the author 102 on how the content data 114 should be presented to consumers without necessarily using specific formatting instructions. The intent data 116 may describe the intent by describing relationships among two or more of the content elements in the content data 114 and/or by specifying presentation choices for the content data elements. Additionally, or alternatively, the intent data 116, or at least a part of the intent data 116, may include semantic expressions derived from an author-selected visual exemplar. In another example, the intent data 116 can be derived from the content data 114 itself, such as through the underlying structure of the content data 114. The intent data 116 may further indicate an intended use of the content data 114. Similar to the content data 114, the intent data 116 may be obtained from the author 102 through a user interface, or through an API exposed by content collection/ generation module 106. In an example, obtaining the intent data can occur as a background process, and the layout process can proceed even if there is no intent data available.

For instance, the intent data can be extracted from an already-made document. The intent data can be extracted as part of background process, and the layout can proceed. The layouts can be updated once the background process finishes.

Next, at operation 606, a determination is made as to whether an instruction to generate the layout 304 has been received. If the instruction to generate the layout 304 has not been received, the routine 600 may return back to operation 602 to obtain more content data 114 or back to operation 604 to obtain more intent data 116. If it is determined at operation 606 that the instruction to generate the layout 304 has been received, the routine 600 proceeds to operation 608, where the layout 304 may be generated for the content data 114 based on the obtained intent data 116.

As discussed above, the layout 304 may be generated by the layout generation engine 108 based on the core content data model 212 that contains the content data 114 and the intent data 116. The layout 304 may be generated to fit the content data 114 and to satisfy the intent of the author 102. The layout 304 may include a multiple-level configuration, which may contain a macro-level scheme, a mid-level scheme, and a micro-level scheme. According to one mechanism, the macro-level scheme may be a world scheme that may specify an overall structure of the layout, describe high-order interaction assumptions, layout constraints, and/ or potentially other constraints/assumptions.

A world scheme may include one or more sections to arrange content data elements as groups, with each group corresponding to one section and filling one or a few pages or screens. A section of a world scheme may also include other world schemes, thereby forming a nested world scheme. It should be understood that the arrangements of different sections may be similar in terms of style and configuration to form a consistent presentation of content. These arrangements, however, may also be different. For example, the content structure, the page margin, the color scheme, the style, the background in one section may be different from another section. In the nested world scheme, the world scheme nested in one section may also be different from the world scheme nested in another section. The section arrangement along with the nested world scheme, if there is any, may be used as the mid-level scheme of the layout. Furthermore, each of the content data elements may have its own format configuration, and the element format configuration may be used as the micro-level scheme.

As discussed above, the layout generation engine 108 may have access to other information that may be used when generating the layout 304. For example, the device capability 118 may be obtained from the rendering device 110 that describes aspects of the rendering device 110, such as resolution, orientation, memory constraints, graphics capabilities, browser capabilities, and the like. Similarly, the layout generation engine 108 may also be provided with the consumer preferences 120 to indicate features and/or styles according to which the consumer 132 may prefer the content is to be presented, such as the overall structure of the content, color schemes, background, animation style, and others. The additional information may facilitate the layout generation engine 108 to generate a layout 304 for the content data 114 in a way that satisfies the intent/preference of the author 102 and the consumer 132, and is suitable to the rendering device 110. The generated layout 304 along with the content data 114 may be output as a layout-ready view model 216. Additional details regarding one mechanism disclosed herein for generating the layout 304 for the content data 114 will be provided below with regard to FIG. 7A.

From operation 608, the routine 600 proceeds to operation 610, where the layout-ready view model 216 may be sent to a rendering device causing the generated layout 304 to be presented. From operation 610, the routine 600 proceeds to operation 612, where it ends.

Figure 7A:
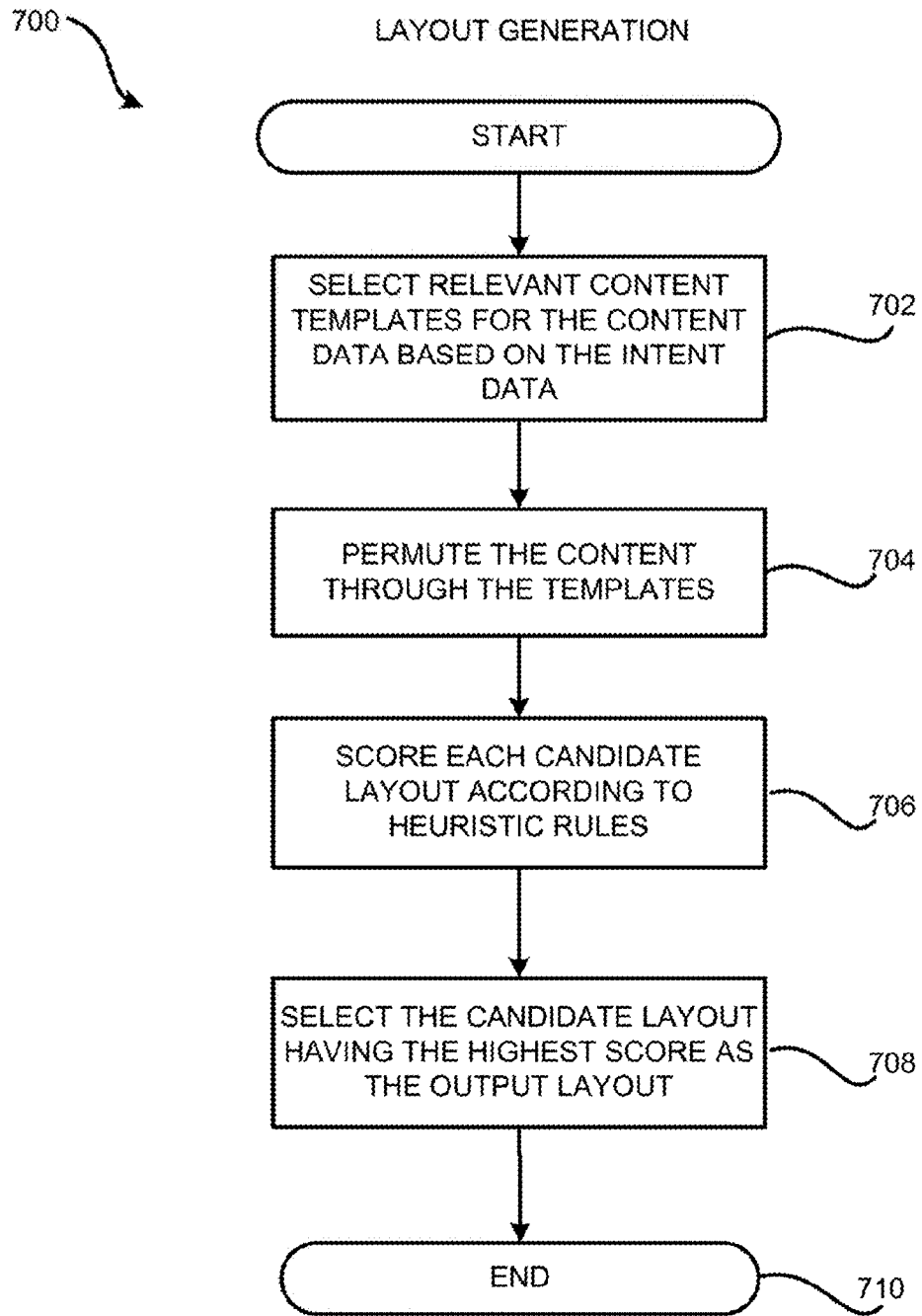
FIG. 7A is a flow diagram illustrating aspects of a method for generating a layout for content data based on author intent.

FIG. 7A shows a routine 700 that illustrates aspects of a method for generating a layout 304 for content data 114 based on user intent data 116. FIG. 7A will be described in conjunction with FIG. 8, where examples of templates used during generation of the layout 304 are illustrated. In some implementations, the routine 700 may be performed by the layout generation engine 108 described above in regard to FIGS. 1 and 2. It should be appreciated, however, that the routine 700 may also be performed by other systems and/or modules in the operating environment illustrated in FIGS. 1 and 2.

The routine 700 begins at operation 702 where multiple content templates that may be used for presenting the content data 114 may be selected or generated. The content templates may include templates that correspond to the macro-level schemes, such as templates for world schemes, and/or templates that corresponding to the mid-level schemes and micro-level schemes, such as templates for sections of a world scheme and for content data elements contained in the sections. Some of the templates may further include multiple sub-templates, each of which may be considered as one template and may be changed or replaced as a single unit. As such, the templates selected in operation 702 may have various sizes, scales, and/or styles, and depending on the amount of content data, the number of selected templates may be on the scale of thousands, tens of thousands or even hundreds of thousands. The templates can be expressed in various formats, such as using XML. The templates can be stored with metadata (e.g., metadata describing associated visual exemplars and/or relative score of expression of semantic expressions) to allow the templates to be selected based on the metadata.

The selection of the content templates may be based on the data available at the layout generation engine 108, including the core content data model 212, and/or any additional information, such as the device capability 118 and the consumer preferences 120. In some implementations, the data available at the layout generation engine 108, such as the intent data 116 and/or the device capability 118, may be converted into one or more formatting constraints, and the layout generation engine 108 may select content templates that satisfy the formatting constraints. For example, when presenting two images with a first image having more emphasis than a second image, as indicated by the intent data 116, techniques herein may select a template with an arrangement that presents the first image in a larger viewing area than the second image. Likewise, when the device capability 118 indicates that the target rendering device 110 is a smart phone with a small screen size, templates that are suitable for presenting content in smaller screens may be selected.

In an example, the layout generation engine 108 selects one or more templates that express one or more particular visual exemplars. The intent data 116 can include a selection by the author 102 of one or more visual exemplars to be applied to the content data 114. Templates can then be selected that match the visual exemplar. For example, the author input 112 can include a collection of photographs from a trip, along with a selection of a collage visual exemplar. Based on this visual exemplar, collage layouts can be selected.

In another example, the layout generation engine 108 can select a template that expresses particular semantic expressions expressed by a particular visual exemplar. For example, the stack visual exemplar expresses the semantic expression of optional. The layout generation engine 108 can use the selection of the use of the optional visual exemplar for particular content as a way to understand the author's editorial intent: expressing optional content. The layout generation engine 108 can then select layouts associated with those semantic expressions, rather than just those layouts associated with the stack visual exemplar. For example, the layout generation engine 108 can select layouts associated with the gallery (expressing the semantic expressions of optional and uniform), drill down (expressing the semantic expressions of drill-in, optional, and hierarchy), or others that also match those semantic expressions.

In another example, templates may be scored according to their expression of semantic expressions and selected based on those scores. For example, the author may have selected content to be displayed using the grid visual exemplar, which expresses uniformity and continuity. Templates may then be selected based on their scores with respect to the visual exemplar's semantic expression of uniformity and continuity. For example, the templates may be scored based on the extent to which they express (or do not express) various sematic expressions and the templates can be selected based on that score. For instance a template that allows the presentation of content items in a grid can score high in its expression of the semantic expressions of uniformity and continuity among content items, while it may score low in the semantic expression of optionality because the content is presented on a same screen and the content items are not being expressed as optional. In another example, scores can be obtained for the visual exemplars with respect to their expression of semantic expressions, and templates with similar scores (e.g., within a threshold) can be selected. The scoring of templates can be performed algorithmically, manually, or a combination thereof. For example, an algorithm to score the uniformity of a template can assign a score based on a comparison of the attributes of content placeholders in the template (e.g., shape, size, rotation, etc.) to determine how similar respective content placeholders are.

In yet another example, the layout generation engine 108 can select templates that express semantic expressions including one or more semantic property variants. For example, the semantic expression of uniformity can include semantic property variants, such as non-uniformity, loose uniformity, and tight uniformity. If the selected visual exemplar expressed optional and loose continuity and did not have uniformity in its contract, then evaluated templates may include templates with any setting of uniformity but including optionality and loose continuity, such as a gallery or stack but not a grid.

Figure 7B:
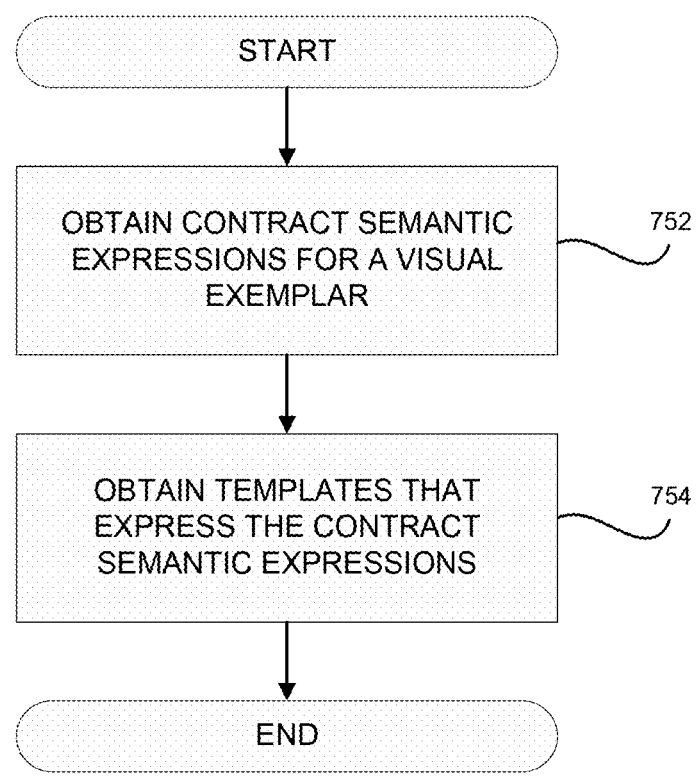
FIG. 7B is a flow diagram illustrating aspects of an example of a template selection process.

FIG. 7B illustrates another example template selection process 750. The layout generation engine 108 can select templates based on contract semantic expressions of the visual exemplars. The selection process 750 begins with operation 752, where contract semantic expressions are obtained for a visual exemplar. Each visual exemplar can identify a contract, which specifies values for one or more semantic expressions to observe in any visual representation that is generated using the visual exemplar. The contract semantic expressions can be viewed as one or more primary semantic expressions behind the visual exemplar. Remaining, non-contract semantic expressions can be modified across different layouts without changing the primary meaning and author intent behind the visual exemplar. For example, loose continuity can be the contract semantic expression for the flowing content visual exemplar. This semantic expression can be the contract semantic expression for the flowing content visual exemplar because loose continuity reflects a primary meaning behind the flowing content visual exemplar. Where layouts are generated for output that includes content expressed using the flowing content visual exemplar, any other non-contract semantic expressions could be varied because they do not affect the primary meaning behind the flowing content visual exemplar. The layouts may, but need not, permute on all other semantic expressions. Permuting on certain semantic expressions may change the author's perspective about the meaning or relationship behind what is expressed. In such instances, permuting on those semantic expressions may be avoided. The layouts may permute on a subset of the non-contract semantic expressions. In another example, the semantic expressions associated with respective visual exemplars in Table II can be considered the one or more contract semantic expressions for the respective visual exemplars, and any other semantic expressions being able to be varied when generating layouts. Obtaining the contract semantic expressions can involve looking-up pre-determined sets of contract semantic expressions for a given visual exemplar. Obtaining the contract semantic expressions could also involve generating the contract semantic expressions for a given visual exemplar. In an example, the generating can be based on various parameters, such as the visual exemplar, the author's intent, the content that the visual exemplar expresses.

After obtaining the contract semantic expression subsets in operation 752, the flow of process 750 can move to operation 754, in which the layout generation engine can obtain templates that express the contract semantic expressions, as long as the templates express the contract of the exemplar, the templates can also express other semantic expressions. For example, when locating templates for content associated with the chapter title visual exemplar (e.g., for which the hierarchy semantic expression can be considered a contract semantic expression), the layout generation engine 108 can select all templates expressing the hierarchy semantic expression and allow templates that vary on the unspecified semantic expressions. In an example, obtaining the templates can include permuting through different templates by varying the semantic expressions unspecified in the contract while preserving the contract semantic expressions. In another example, this process can be combined with previous selection techniques, such as scoring.

Figure 8:
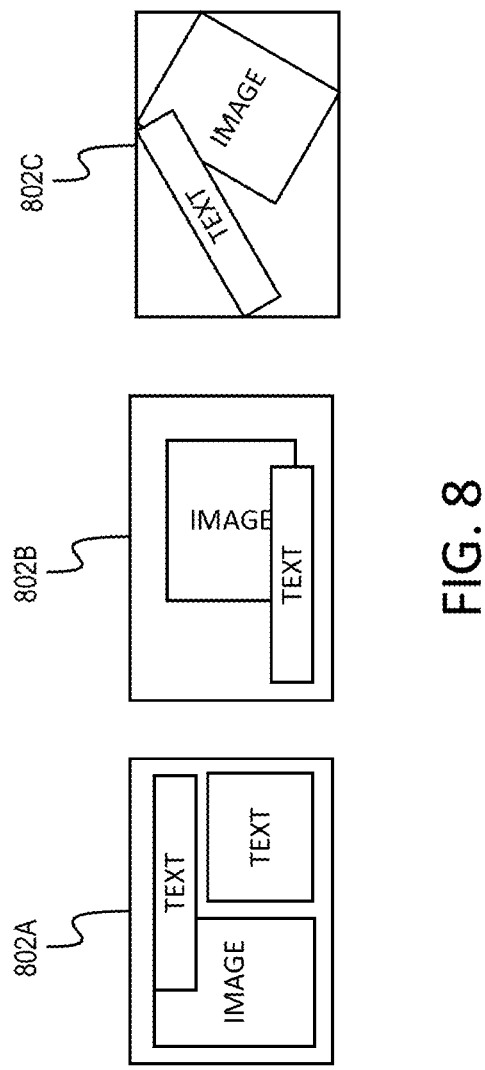
FIG. 8 illustrates examples of templates used during generation of the layout.

For a set of content data elements, more than one template may be selected. FIG. 8 illustrates example templates 802A-802C that may be selected to present an image element and a text block element. As shown in FIG. 8, all three templates 802A-802C may be able to lay out an image and a text block, but differ from each other in terms of the position, the orientation, and other aspects of the laid-out image and text block.

The selected templates may be pre-generated, such as by designers or by retrieving from existing resources, and stored in the layout resource data store 214, where the layout generation engine 108 may select and retrieve the templates. Depending on the type of templates, the templates may also be programmatically generated.

Returning to FIG. 7A, from operation 702, the routine 700 proceeds to operation 704 where the content data 114 may be permuted through the templates selected in operation 702. For example, an image and a text block may be put into each of the templates 802A, 802B, and 802C. When needed, the templates may be modified to accommodate the content data elements. For example, one or more objects in the template may be resized, shifted, rotated, or otherwise adjusted to fit the content data element contained in it. Alternatively, the template itself can be flexible to accommodate the content. For instance, a text paragraph followed vertically by an image could be described such that the image starts immediately below the text, but for different amounts of text, the template may place the image differently. Image corrections, adornments, and legibility treatments can also be applied. Permutations can also be created that vary based on crops of images within the content to be laid out, permutations for various font sets, and permutations for various kinds of text placement within the template. The templates for all the content data elements in the content data 114 may collectively form a candidate layout 304. Since there may be multiple selected templates for each set of content data elements, the combination of these templates may result in multiple candidate layouts 304.

From operation 704, the routine 700 proceeds to operation 706, where a score is computed for each of the candidate layouts 304. In situations when a candidate layout 304 includes a number of templates, the score for a candidate layout 304 may be computed by first computing a score for each templates and then combining the scores to generate the final score for the candidate layout 304.

In some implementations, the score for a template is computed according to a set of heuristic rules, which may be a weighted set of general rules, world specific rules, and style specific rules. By way of example, and not limitation, the heuristic rules may include legibility rules, crowdedness/proximity rules, fit-to-aspect-ratio or viewport rules, semantic matching rules, content occlusion rules, compositional balance rules, and/or other rules. The legibility rules may measure, for example, if a text has sufficient contrast to be read in the context of its background. The crowdedness/proximity rules may measure if objects as close or far apart from each other as required by the intent data 116, device capability 118, or the consumer preferences 120. The fit-to-aspect-ratio rules may measure how well the image or text fits to the prescribed layout. The semantic matching rules may measure if the visual results of the template represents a semantic expression and matches the semantic contract in the metadata of the content data 114. Content occlusion rules can measure the amount that that content blocks or obscures other content. The compositional balance rules can measure an amount of visual balance in visual results of the template.

Evaluation of templates can be calculated based on image analysis techniques. For example, where text is being applied over an image, the image can be analyzed to detect salient regions, invariant regions, horizons, faces (if any), and embedded text (if any). This data can be used to score layouts. For example, layouts that place text over faces, embedded text, horizons, and salient regions can receive lower scores because such arrangements can impair the readability of the text or otherwise create a suboptimal experience for the audience. In another example, where cropping is applied to images in a layout, the cropping can be scored using similar image analysis techniques. For example, crops that break up a single face (e.g., only show half of a person's face) can score lower than a crop that keeps an entire face in view. As another example, where there are multiple people in an image, crops that show less than all of the people can score lower than crops that keep all of the people in a single image. In another example, the image analysis technique can search for combinations of features (e.g., a cluster of faces, a face within a salient region, or groups of salient regions). Crops that split up or deemphasize the combinations of features can be scored lower than crops that keep combinations of features together or otherwise emphasize them.

Intermediate scores may be computed based on each of the above rules, and then normalized and weighted to generate the score for the template. The weight may be assigned to the corresponding intermediate score according to the relative importance of the various inputs of the layout generation engine 108, including the intent data 116, the device capability 118, the consumer preferences 120, and other factors. For example, a score computed based on the fit-to-aspect-ratio rules may indicate how well the template would satisfy the device capability 118. As such, if satisfying the device capability 118 is more important than satisfying the consumer preferences 120, a higher weight may be assigned to the score computed based on the fit-to-aspect-ratio rules.

Similarly, the scores for templates contained in a candidate layout 304 may also be normalized, weighted, or otherwise processed before calculating the final score for the candidate layout 304. From operation 706, the routine 700 proceeds to operation 708 where the candidate layout 304 having the highest score may be selected as the layout 304 for the content data 114, and stored in the layout-ready view model 216 along with the content data 114 for rendering. From operation 708, the routine 700 proceeds to operation 710, where routine 700 terminates.

It should be appreciated that the layout generation process described in FIG. 7A may be performed automatically and without human intervention. In addition, the templates contained in the layout 304 may be selected after the intent data 116 have been obtained. Comparing such a data-driven template/layout selection mechanism with a method where the author 102 fills content data 114 in a pre-selected template, the former may provide a more accurate template/ layout to present the content data 114. This is because, the author 102, when pre-selecting the template, may not have the knowledge of all the potential templates that may fit the content data 114. In addition, the content data 114 may change as the author 102 continues the authoring process. The pre-selected template may not be suitable for the updated content data 114. On the other hand, the data-driven template/layout selection mechanism may dynamically update the layout as the content data 114 changes by leveraging potentially all the template resources available to the layout generation engine 108. Such a process may also be made transparent to the author 102, and thus require no knowledge of the layout design from the author 102. Furthermore, since the layout 304 is selected based on user intent, rather than specific formatting instructions, the layout 304 generated by routine 700 may be able to adapt dynamically to various output formats and rendering devices while still satisfying the author's intent.

The layout generation process described in FIG. 7A can be considered to include a compositional layout approach whereby permutations of content layouts are generated and then selected using rules to evaluate optimal layouts. Such a process can be used for generating aesthetic layouts (e.g., as defined by rules) and can be suited for small multiples of content. The process can leverage calculated expressions to adapt to the content. The output can be a render model that describes the output.

In addition to or instead of the compositional layout approach, an algorithmic layout approach can be used. For example, an algorithmic layout approach can be used where the size and position of content can logically be calculated. For instance, algorithmic layouts can be used for a grid of images of skyscrapers (e.g., typically tall and thin) or a grid of images of dinosaurs (e.g., typically lending themselves to a landscape layout). An algorithmic layout could involve calculating the number of rows and columns by understanding a desired aspect ratio and then optimize for the number of rows and columns. In this manner, the size and position of each image can be reached through algorithmic decisions rather than rule-based decisions. The algorithmic layouts can generate a render model. Such algorithmic layouts can be well suited for high-level layout of larger sets of content or to achieve layouts that are calculated based on the number and shape of the content itself.

In addition to or instead of the foregoing layout generation processes, a declarative layout process can be used whereby developers can define how a hierarchy of recipes converts a content model into a render model. The recipes can describe how each type of content should be formatted. With the hierarchy of recipes created, the actual content can be walked through and appropriate recipes are invoked depending on the order and type of the content. Content types can map to specific recipes. Content can flow in specified patterns. Animations and interactions can be directly attached to an interactive element, rather than generating animations and interactions for an entire output after layouts are completed.

In an example, declarative templates can use a declarative markup language-like syntax (e.g., XAML-like XML, based syntax) for defining a hierarchy of recipes. The recipes can be read by a service when it starts, and the recipe is parsed into an object hierarchy. The elements can be interpreted as class names and the attributes can be interpreted as property values.

The following example creates an instance of the BorderRecipe class and sets the value of its Padding property to 12. It then sets its child recipe to an instance of the RectangleRecipe class, whose Width, Height and ImageName properties are set to "32px", "32px" and "FullScreen" respectively:

```
<?xml version="1.0" encoding="UTF-8"?>
<Border Padding="12">
    <Rectangle Width="32px" Height="32px"
    ImageName="FullScreen"/>
</Border>
```

The hierarchical nature of the syntax can advantageously provide each element an intuitive interpretation of what happens to child elements that it hosts. This can allow for easy and seamless composition of complex recipes out of simple building blocks. Recipes can define whether they support zero, one, or many child elements. In addition, common types can be represented as string attributes. For example, "Size=23,32" can initialize a Vector2 property. Further, expression can be added to property values.

Within the layout process, the system can analyze the content, observe recurring patterns, and can make inferences about what the author would like to express. For example, the engine can suggest new or better content to go along with the output for better communication and impact. The engine can add effects to the output. For example, where an author starts each chapter with an image followed by a blog-style block of text, the engine can choose to anchor the engine in place while the text scrolls by. In another example, the engine can recognize a series of photos from a photo burst, and choose to auto-group them or animate them. The engine can make decisions regarding the content, but then allow the author to confirm or correct the decision. For example, the engine may infer author's intent from the information available, optimize for the best-looking visuals, and then let the author provide feedback the presentation of the content. In some examples (e.g., where the engine makes bold assumptions or radical changes to the output), the engine can ask the author before making a change.

Figure 9A:
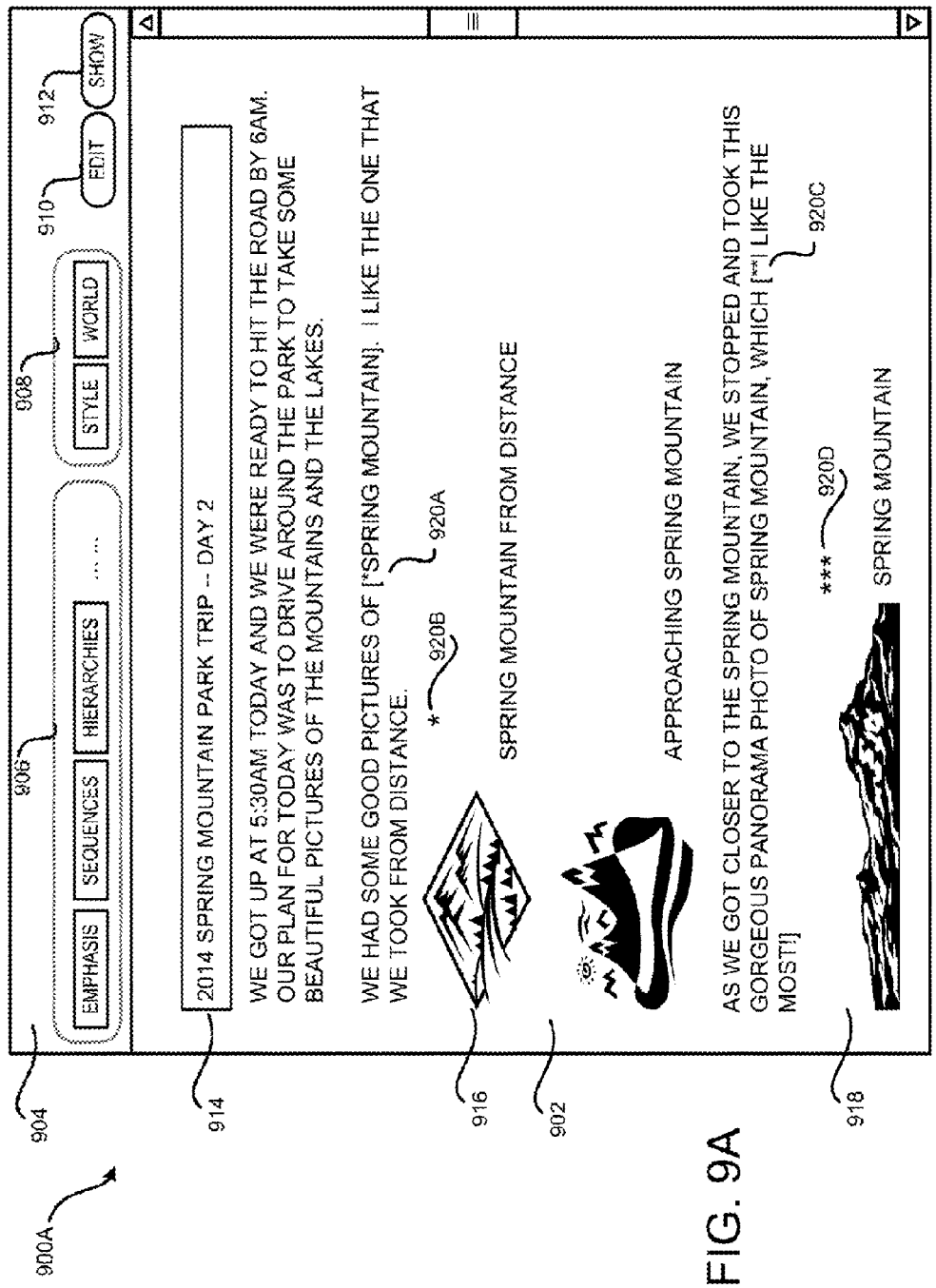
FIG. 9A illustrates a user interface that may be used by an author to input content data and specify author intent.

FIG. 9A illustrates an authoring user interface 900A that may be used by an author 102 to input content data 114, specify user intent data 116, and/or request a layout 304 to be generated for the input content data 114. The authoring user interface 900A may include an editing field 902, where the author 102 may input various content data elements (e.g., such as typing in texts, uploading images, etc.). In some implementations, the editing field 902 may include a title field 914 where the author 102 may specify a title for the content data 114, and/or a title for a portion of the content data 114.

The authoring user interface 900A may further include a user interface control field 904, where various user interface controls may be provided to facilitate the layout generation for the content data 114. As shown in FIG. 9A, the user interface control field 904 may include a set of user interface controls 906 for specifying author intent to the content data 114, such as user interface control(s) for adding emphasis, user interface control(s) specifying sequences between content data elements, user interface control(s) for specifying hierarchies among content data elements, and/or others.

For example, the author 102 may specify his/her intent through adding emphasis. FIG. 9A illustrates emphasis 920A-920D that are added to texts and images. A low emphasis 920A is added to the text "spring mountain" indicating that a small amount of emphasis should be added to this text. Similarly, a low emphasis 920B is added to the image 916. A medium emphasis 920C assigned to the text "I like the most" indicates that a medium amount of emphasis should be added to this text and a high emphasis 920D assigned to image 918 indicates that a large amount of emphasis should be added to image 918. In some implementations, the content data elements that have intent associated therewith may be formatted differently in the editing field 902 in order to signal the assigned intent. As shown in FIG. 9A, asterisks, brackets, or other symbols may be attached to the content data elements that have emphasis added on, and the number of asterisks may indicate the amount of emphasis that has been assigned.

Figure 9B:
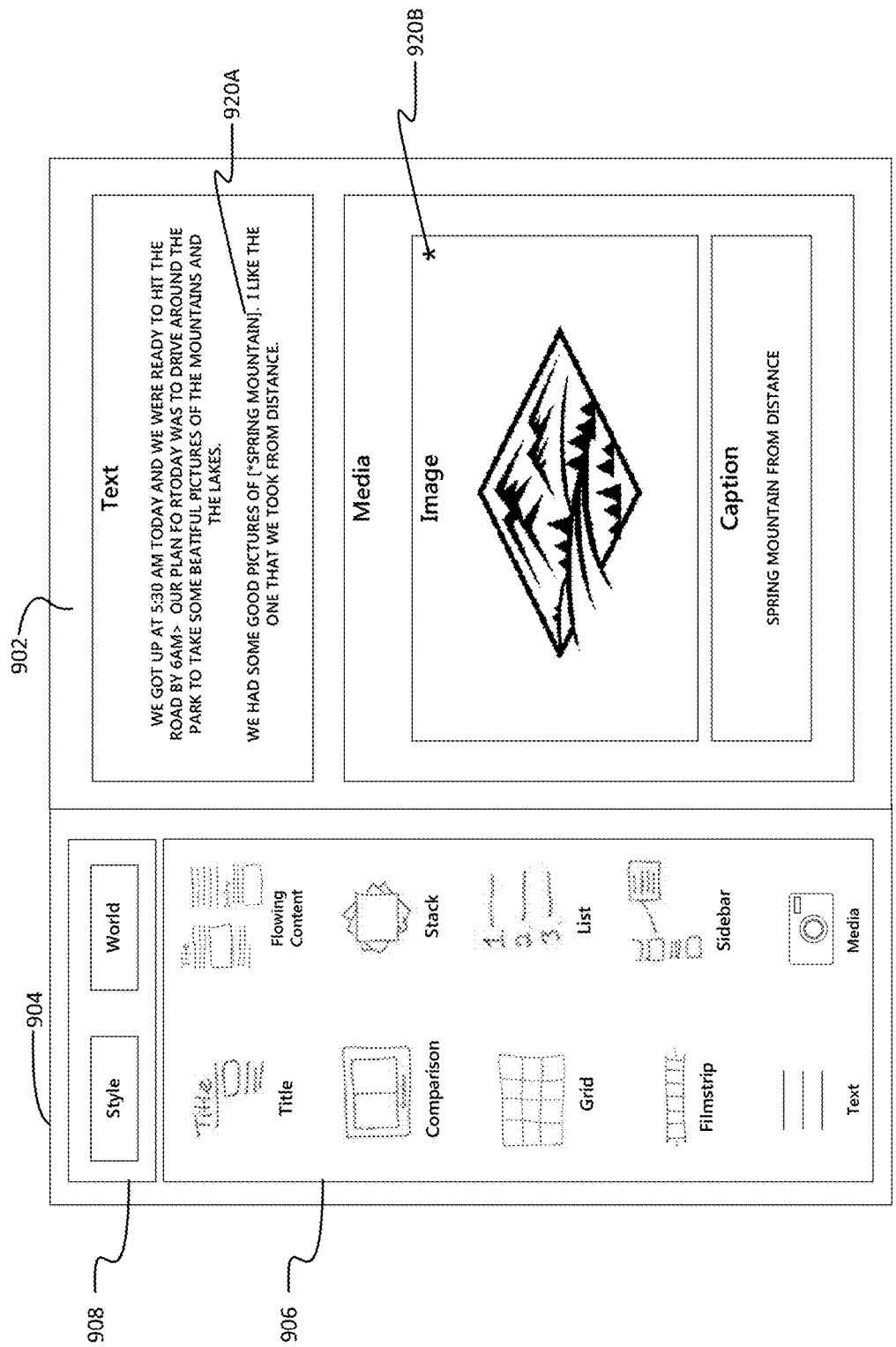
FIG. 9B illustrates an alternate user interface that may be used by an author to input content data and specify author intent.

FIG. 9B illustrates an alternative authoring user interface 900A. As shown in FIG. 9B, the user interface control field 904 may include a set of user interface controls 906 for specifying author intent to the content data 114. As illustrated, the user interface controls 906 include user-selectable visual exemplars, such as title, comparison, and grid, among others. The visuals of the exemplar itself can accentuate the specific values of the semantic expressions that make up the visual exemplar's contract and not strongly imply other semantics. The user can select visual exemplars and then provide content to be displayed using the visual exemplars. For example, as shown in the editing field 902, the user previously selected the text visual exemplar and provided content to be displayed using the text visual exemplar. The user further selected the media visual exemplar and provided an image and a caption to be displayed according to that visual exemplar. Advantageously, the use of selected visual exemplars can improve author efficiency by obviating the need for the author to provide specific formatting instructions. This can also provide for a reduced error rate because formatting errors can be introduced through the specific formatting instructions. The use of visual exemplars can also allow an editing user interface to be more efficient compared to user interfaces that allow the specification of multiple, specific formatting options. This can be especially useful where the author is creating content using, for example, a device having a small, touch input screen or when the author is using constrained authoring environments, such as certain inclusive design or accessibility interfaces.

The visual exemplars in the user interface control 906 region can be organized in a variety of manners. For example, all possible visual exemplars can be displayed in this section in alphabetical or another kind of order. The user interface control 906 could include a filter to help the user narrow down choices. However, there exists a challenge in balancing providing the author with a powerful, flexible selection of tools from which to choose, while avoiding overwhelming or confusing the author. In addition, there can be situations where an author chooses a high-level visual exemplar but expects a different value for one of the specified semantic expressions in the contract or they expect an additional semantic expression to be part of the contract. In an example, to address this challenge, the visual exemplars can be organized in a tiered manner. For example, at a first tier level, the user interface control 906 region can present visual exemplars having a high level of editorial intent, such as common visual exemplars (e.g., stack, grid, etc.) or visual exemplars having specific utility (e.g., side-by-side comparison, branching, flow, pacing, etc.). The first tier can also include visual exemplars having distinct semantic expressions that make up its contract. The first level of visual exemplars can provide coarse coverage of primary scenarios for a user.

There can also be a second tier level of visual exemplars that provide finer coverage, which the author can use to change the expectation for the visual exemplar. For example, the second tier level can present alternate visual exemplars that are close to what the author desires. These can include visual exemplars with additional specificity than a tier one visual exemplar (e.g., a tier one visual exemplar may be a comparison visual exemplar while a tier two visual exemplar may be the visual exemplar of a comparison with a slider or a visual exemplar of a side-by-side comparison). In another example, the second tier can also include variations on visual exemplars from the first tier. Variations can be alternate visual exemplars that convey similar but distinctly different semantic expressions, such as by varying on a single semantic expression or adapting to different content. For example, at the first tier, the user may be able to select the grid visual exemplar, which expresses the semantic expressions of uniformity and tight continuity. The user interface controls 906 can allow the user to specify content for the selected visual exemplar, and it can also allow the user to select a variation on that visual exemplar, such as visual exemplars that vary on a semantic property, such as the filmstrip visual exemplar (e.g., expressing uniformity and loose continuity) or the collage visual exemplar (e.g., expressing non-uniformity and tight continuity). As another example, at a first tier, the user may be able to select the stack visual exemplar, which expresses the semantic expression of optional. At a second tier, the user interface controls 906 can present the user with options, such as clustered content (e.g., expressing loose continuity, but not expressing optionality), drill down (e.g., expressing optional and hierarchy), or gallery (e.g., expressing optional and uniformity). In another example, with the stack visual exemplar, the top level exemplar of stack could exclude uniformity from the contract and therefore the output could sometimes show rotated stacks and other times non-rotated stacks. However, if a user found that this is not accurate for their expression, then they could select a second tier option that locks the visual exemplar to be either rotated or not-rotated.

Other visual exemplars or control options can be hidden from the user or provided through alternative user interface elements. These can include changes in colors, typeface, elements of style, flow, shape, and others. These can automatically be chosen by the layout engine to accommodate a current navigation scheme or a particular presentation device.

While it can be advantageous to abstract away the idea of semantic expression from the user to avoid confusion, well understood semantic expressions (e.g., ordered, optional, show together, etc.) can be introduced as options (e.g., on a property page for a particular visual exemplar). The user can be provided with other options to change as well. For example, some options for some visual exemplars can expose user interface elements (e.g., sliders) that a user can manipulate to change properties of a visual exemplar (e.g., change a smallest cell size of a grid). In addition, visual exemplars can allow for editorial variations that do not inherently change the card but do allow the author to specify an additional layer of editorial intent. This can include, for example, allowing the user to add emphasis to text or images in a visual exemplar. This can further include the option to show or hide captions or to crop an image. In another example, the user can be provided with an authoring option that changes contract semantic expressions. For instance, a grid visual exemplar can be strictly uniform and have tight continuity, but the user interface can include an option for the author that lets the grid flow across multiple screens. If the user selects that option, then the contract for that visual exemplar can be altered to include strict uniformity and loose continuity.

In some examples, the author need not be limited to specifying content using visual exemplars. The authoring user interface 900A can provide the author with custom authoring abilities that allows content to be added and then manually adjusted by the author. This can allow the author to be intentional about what content is shown.

As will be shown below in FIGS. 9C and 9D, to realize the emphasis 920A-920D, the layout generation engine 108 may choose format configurations, such as bold font, underlining, enlarged font, for the text, and select format configurations, such as enlarged image sizes, for the images. It should be noted that these format configurations need not be employed in the authoring user interface 900A to format the corresponding content data elements in order to avoid an impression by the author 102 that the format of these content data elements will be the format used in the generated layout 304. In other words, the manner in which the content data elements with intent associated therewith are formatted or presented during authoring may be different from the manner in which these content data elements will be presented in the generated layout 304. In other implements, however, the content data elements with associated intent may be formatted in the editing field 902 in the way that will be employed in the generated layout 304.

The user interface control field 904 may further include a set of user interface controls 908 for specifying the macro-level scheme of the layout 304 for the content data 114. As discussed above, the macro-level scheme may include a world scheme, which may be selected by the layout generation engine 108 based on the intent data 116 and other additional information. Alternatively, or additionally, the author 102 may select the world scheme for the layout 304 through the authoring user interface 900A. Similarly, the authoring user interface 900A may further provide user interface controls allowing the author 102 to specify other types of macro-level schemes, such as the style, overall color scheme, and the like.

Once the author 102 finishes the editing, or at any time during the editing, he/she may select the user interface control 912 to request a layout 304 to be generated for the provided content data 114 and to preview the rendered content data 114 in the generated layout 304. FIGS. 9C and 9D illustrate rendered content data 114 in the two different layouts 304. At any time during the previewing, the author 102 may choose the user interface control 910 to return back to the authoring user interface 900A. In another example, the author can be shown a preview of the output while authoring the output (e.g., the preview can be displayed in a separate window or a separate portion of a window). The layout can be automatically updated after an authoring change.

It should be understood that the user interface controls shown in FIGS. 9A and 9B are for illustration only, and should not be construed as limiting. Additional user interface controls/fields may be included in the authoring user interface 900A beyond those illustrated herein, and not all the user interface controls and/or fields illustrated need to be included in an authoring user interface. Furthermore, user interface controls/fields in an authoring user interface may be arranged or designed in a different way than the illustrated.

Figure 9C:
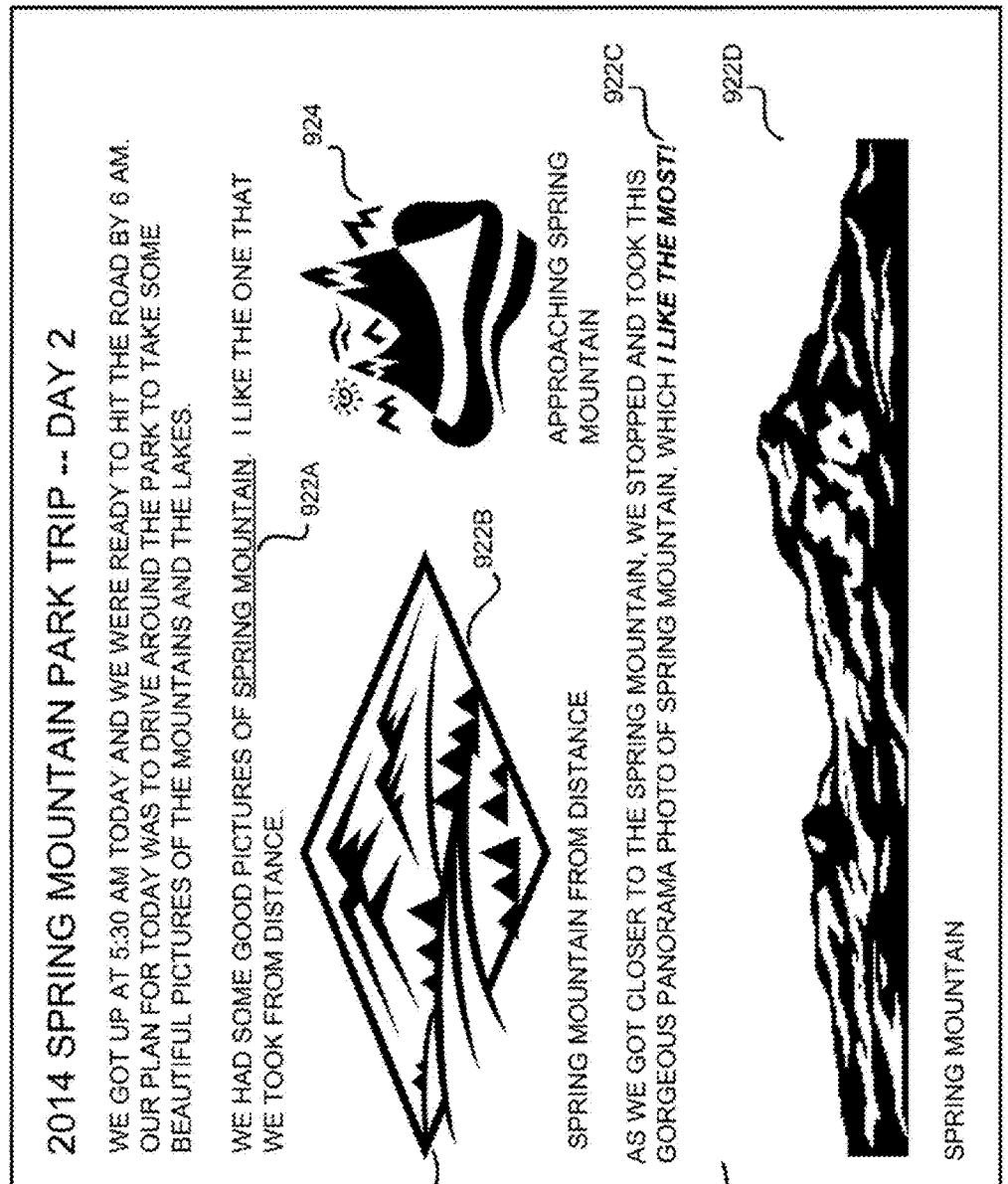
FIG. 9C illustrates a rendered view of content data presented in a layout generated based on author intent according to aspects of the techniques and technologies presented herein.
Figure 9D:
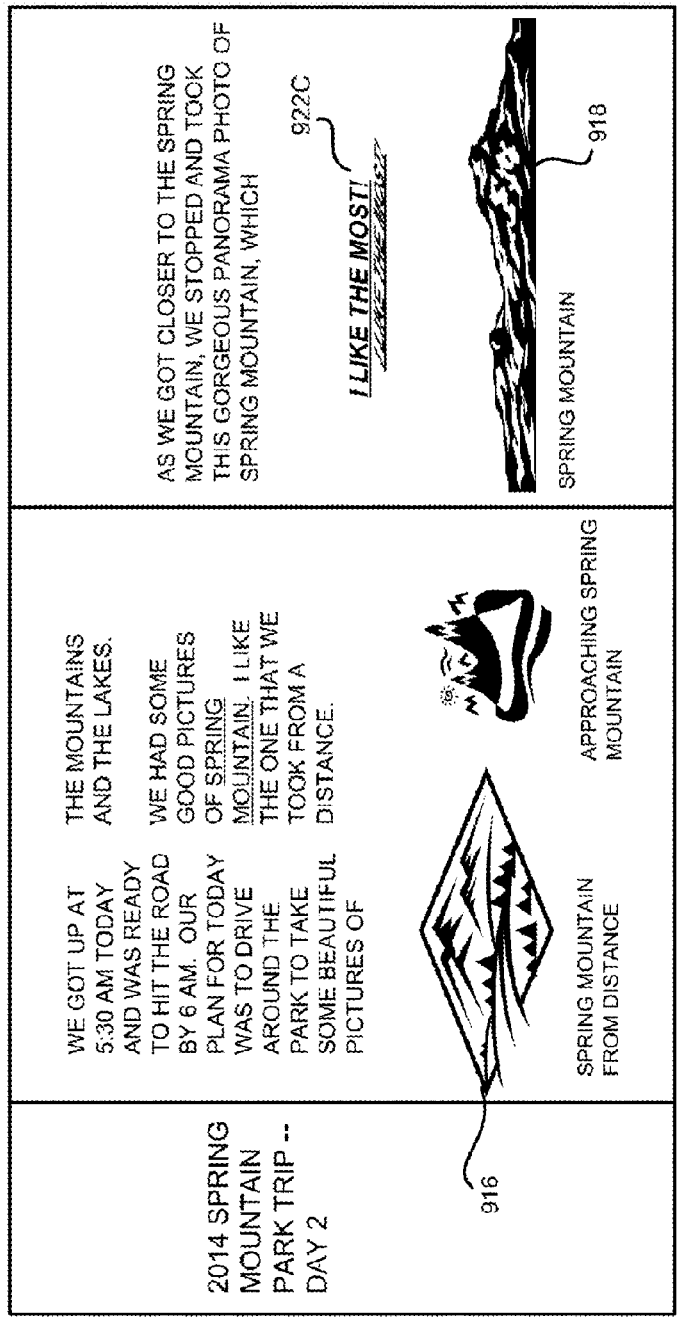
FIG. 9D illustrates another rendered view of content data presented in a different layout generated based on author intent according to aspects of the techniques and technologies presented herein.

Referring now to FIGS. 9C and 9D, where two rendered views of the content data 114 shown in the editing field 902 are illustrated. Specifically, FIG. 9C shows a rendered view 900B where the content data 114 is presented in a layout 304 built based on a vertical world scheme. In the rendered view 900B, the content data elements may be organized into one section of the vertical world scheme. The text in the title field 914 may be formatted using a large font size to make the section title more prominent. Emphasis 920A is implemented by underlining the text "spring mountain" as interpreted emphasis 922A, and emphasis 920C is implemented by make the text "I like the most" bold and italic as interpreted emphasis 922C. With regard to the images, emphasis 920B has been interpreted as resizing image 916 to have a larger size than image 924 as interpreted emphasis 922B. Likewise, emphasis 920D has been interpreted to lay out the image 918 to take the entire bottom portion of the screen as interpreted emphasis 922D.

FIG. 9D shows a rendered view 900C where the content data 114 is presented in a layout 304 built based on a panorama world scheme. As shown in FIG. 9C, the rendered view 900C may arrange the content data 114 in columns and sub-columns. The emphasis added to the text "spring mountain" and the images 916 and 918 are implemented in a similar manner to that shown in FIG. 9C. For the text "I like the most," however, the layout 304 shown in FIG. 9D may place it in a space between the text and the image 918 as interpreted emphasis 922C and further add a shadow effect to emphasize its importance. It can be seen that the same content data 114 may be presented differently using different layouts 304. Among these layouts 304, different world schemes 312 may be selected or specified, and the section arrangements 314 and the element format configurations 316 may be different. Furthermore, depending on the world scheme 312, section arrangements 314 and the element format configurations 316 of the layout 304, the same intent data 116 may be transformed into different format configurations in different layouts 304.

Figure 10:
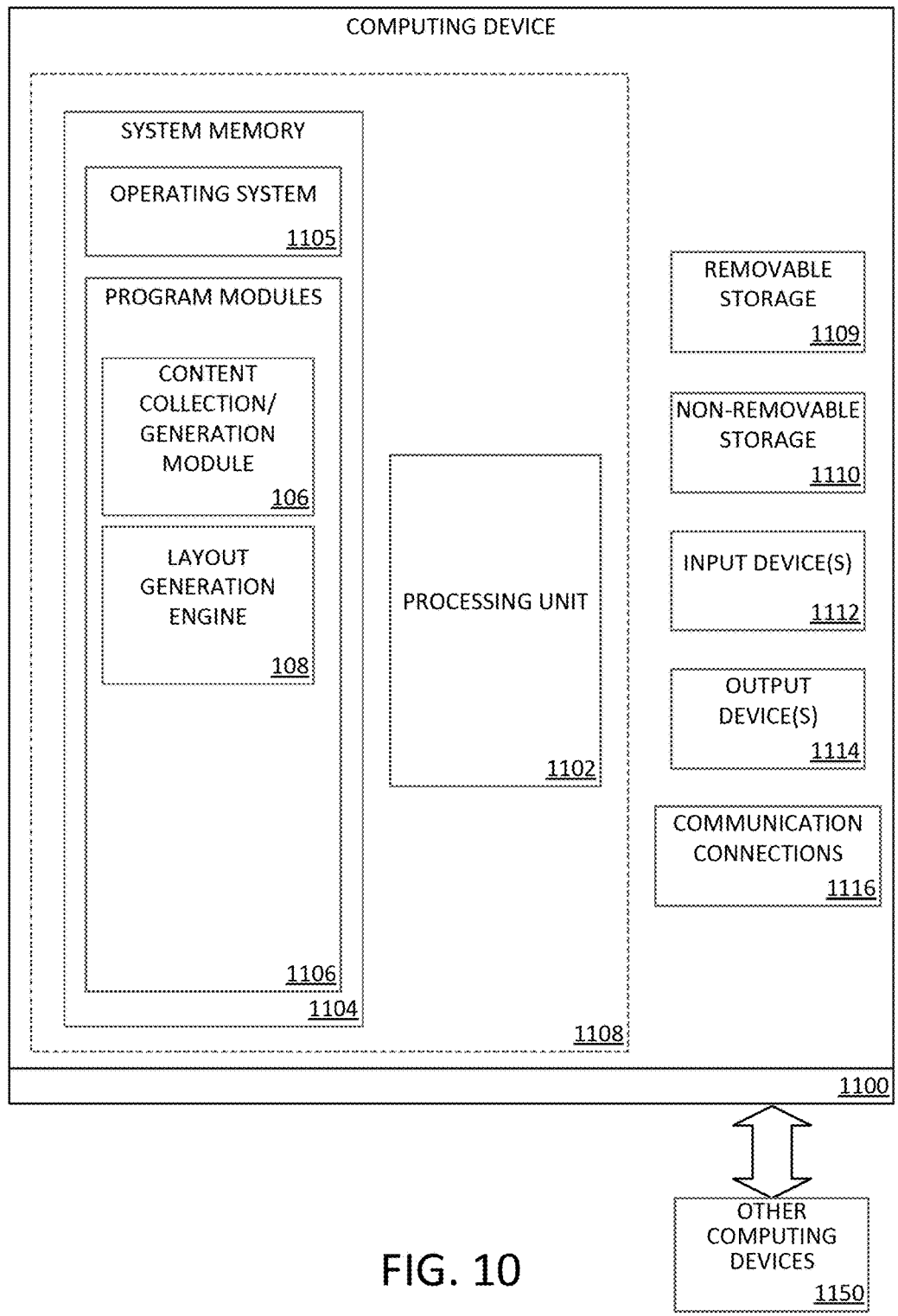
FIG. 10 is a block diagram illustrating physical components (e.g., hardware) of a computing device with which aspects of the disclosure may be practiced.

FIG. 10 is a block diagram illustrating physical components (e.g., hardware) of a computing device 1100 with which aspects of the disclosure may be practiced. The computing device components described below may have computer executable instructions for implementing the content collection/generation module 106 and the layout generation engine 108 on a computing device including computer executable instructions for the content collection/generation module 106 and the layout generation engine 108 that can be executed to employ the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running the content collection/generation module 106 and the layout generation engine 108 or one or more components described herein. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated by a removable storage device 1109 and a non-removable storage device 1110.

As stated above, a number of program modules and data files may be stored in the system memory 1104. While executing on the processing unit 1102, the program modules 1106 may perform processes including, but not limited to, the aspects, as described herein. Other program modules that may be used in accordance with aspects of the present disclosure, and in particular for providing an input system.

Furthermore, embodiments of the disclosure may be practiced in an electrical circuit comprising discrete electronic elements, packaged or integrated electronic chips containing logic gates, a circuit using a microprocessor, or on a single chip containing electronic elements or microprocessors. For example, embodiments of the disclosure may be practiced via a system-on-a-chip (SOC) where each or many of the components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, and other input devices. The output device(s) 1114 such as a display, speakers, a printer, and other output devices may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer-readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
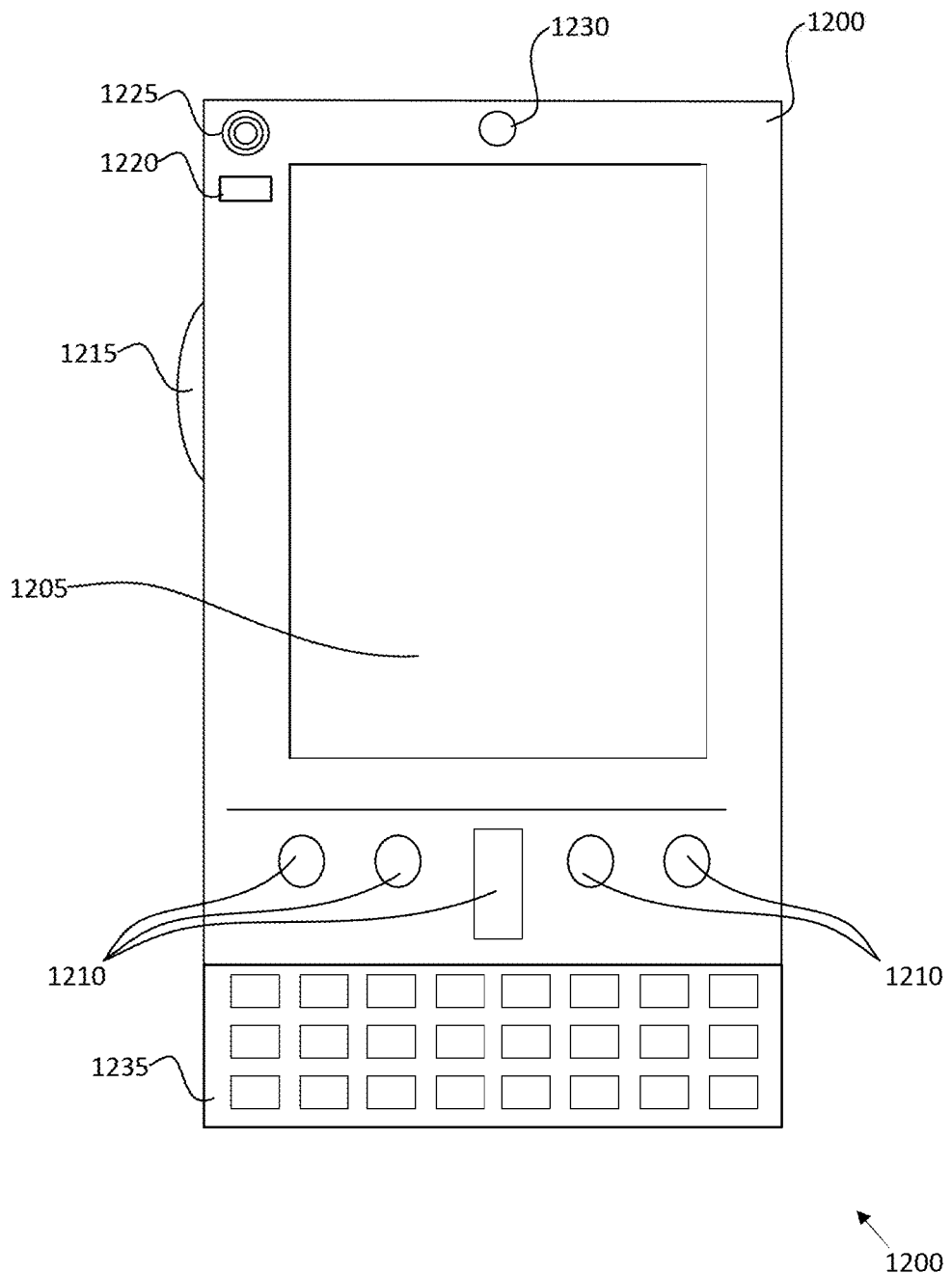
FIG. 11A and FIG. 11B illustrate a mobile computing with which embodiments of the disclosure may be practiced.
Figure 11B:
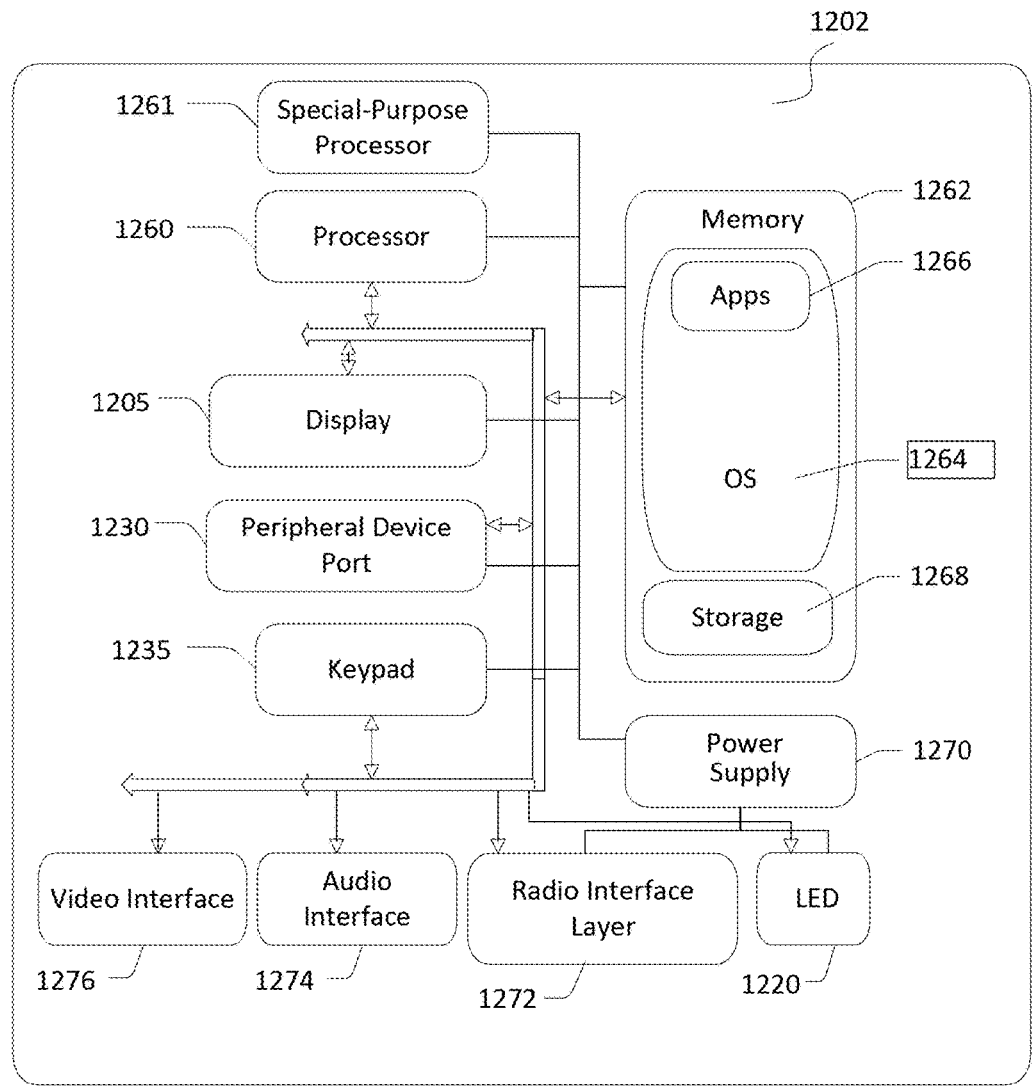

FIG. 11A and FIG. 11B illustrate a mobile computing device 1200, for example, a mobile telephone, a smart phone, wearable computer (such as a smart watch), a tablet computer, a laptop computer, set top box, game console, Internet-of-things device, and the like, with which embodiments of the disclosure may be practiced. In some aspects, the client may be a mobile computing device. With reference to FIG. 11A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 need not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display (e.g., a virtual input element). In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as email or other messages used by an email application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for providing an input system platform as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 10B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

Figure 12:
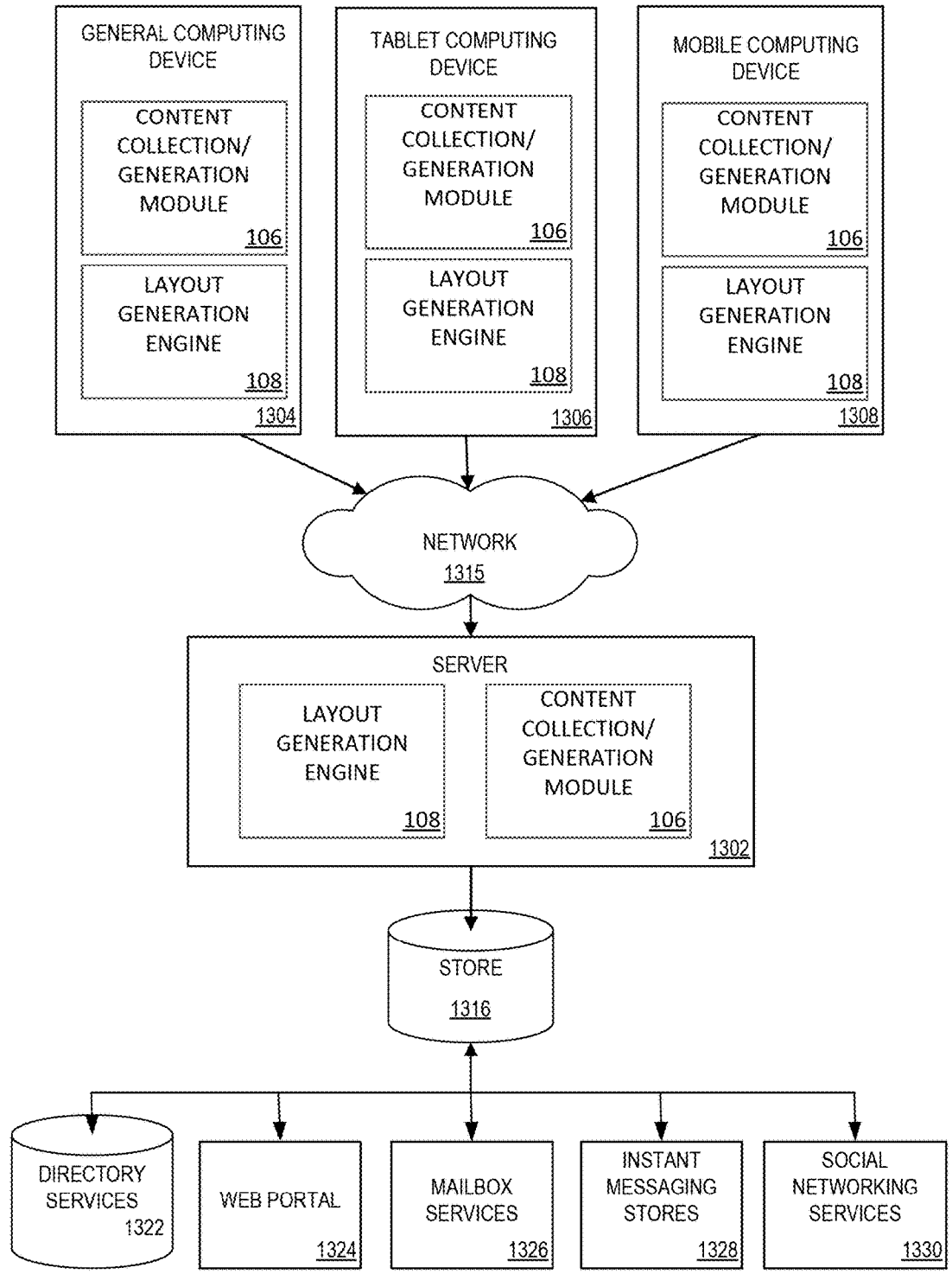
FIG. 12 illustrates one aspect of the architecture of a system for processing data received at a computing system from a remote source.

FIG. 12 illustrates one aspect of the architecture of a system for processing data received at a computing system from a remote source, such as a personal computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The input system platform 1120 may be employed by a client that communicates with server device 1302, and/or the input system platform 1120 may be employed by server device 1302. The server device 1302 may provide data to and from a client computing device such as a personal computer 1304, a tablet computing device 1306 and/or a mobile computing device 1308 (e.g., a smart phone) through a network 1315. By way of example, the computer system may be embodied in a personal computer 1304, a tablet computing device 1306 and/or a mobile computing device 1308 (e.g., a smart phone). Any of these embodiments of the computing devices may obtain content from the store 1316, in addition to receiving graphical data usable to be either pre-processed at a graphic-originating system, or post-processed at a receiving computing system.

Figure 13:
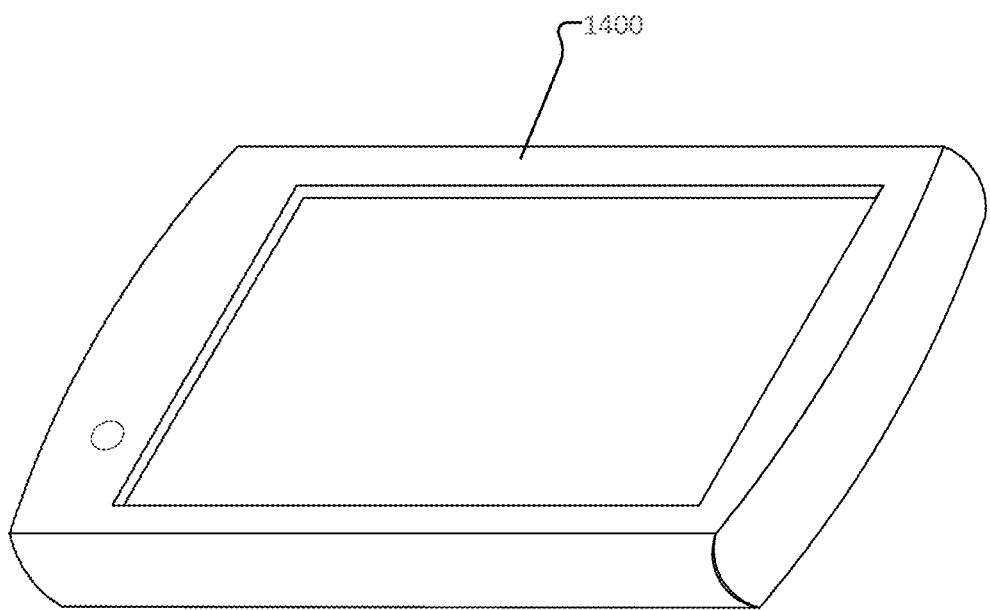
FIG. 13 illustrates an exemplary tablet computing device that may execute one or more aspects disclosed herein.

FIG. 13 illustrates an exemplary tablet computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
obtaining author input data, wherein obtaining the author input data includes receiving, over a user interface, a selection of a first visual exemplar with which to express content data, the selection conveying an editorial intent of an author of the author input data;
identifying the first visual exemplar expressed by the editorial intent;
identifying a set of semantic expressions expressed by the first visual exemplar, wherein the set of semantic expressions comprises two or more semantic expressions;
identifying a contract subset of the set of semantic expressions; and
generating an output that communicates the content data based on the contract subset, wherein generating the output includes generating an output that expresses the contract subset and varies a non-contract semantic expression,
wherein the first visual exemplar comprises a visual exemplar selected from the group consisting of: a heading, a sidebar, a list, an outline, a stack, flowing content, a filmstrip, a grid, a comparison, a triptych, a collage, drill-down content, clustered content, gallery, text expressing title, text expressing heading, text expressing caption, text expressing block text, text expressing quotation, text expressing body text, and a visual exemplar demonstrating a relationship between text and media;
wherein the set of semantic expressions comprises a semantic expression selected from the group consisting of: hierarchy, drill-in, summarization, hyperlink, sidebar, continuity, grouping, uniformity, ordering, emphasis, showcase, text size, text with media, equality, media as background, caption, attribution, block text, quotation, body text, optional, and reveal; and
wherein the set of semantic expressions comprises strict uniformity and strict ordering.

2. The method of claim 1, wherein generating the output that expresses the contract subset and varies the non-contract semantic expression comprises:
selecting a second visual exemplar for the content data, the second visual exemplar expressing the contract subset and varying the non-contract semantic expression,
wherein the output communicates the content data using the second visual exemplar.

3. The method of claim 1, further comprising:
causing a plurality of visual exemplars to be presented to a user at the user interface, wherein the plurality of visual exemplars comprises the first visual exemplar; and
receiving one or more content elements to express based on the first visual exemplar,
wherein the obtained author input data comprises the one or more content elements and the selection of the first visual exemplar.

4. The method of claim 3, wherein the one or more content elements comprise a content element selected from the group consisting of a text content element, an audio content element, a video content element, and an image content element.

5. The method of claim 1,
wherein the first visual exemplar comprises a list;
wherein uniformity expresses an extent of homogeneity of one or more of: content size, content rotation, and content alignment, to be maintained in content when generating output; and
wherein ordering expresses an extent to which an order of content is to be maintained when generating output.

6. The method of claim 1,
wherein the first visual exemplar comprises a grid;
wherein the set of semantic expressions comprises tight continuity and tight uniformity;
wherein uniformity expresses an extent of homogeneity of one or more of: content size, content rotation, and content alignment, to be maintained in content when generating output; and
wherein continuity expresses an extent to which content is to be separated when generating output.

7. The method of claim 1, wherein the first visual exemplar represents the editorial intent of the author of the author input data.

8. A computer-implemented method comprising:
obtaining author input data having an author input data visual exemplar, the author input data visual exemplar associated with two or more author input data visual exemplar semantic expressions, wherein obtaining the author input data includes receiving, over a user interface, a selection of the author input data visual exemplar with which to express content data, the selection conveying an editorial intent of an author of the author input data;
obtaining consumer data; and
generating an output based on the editorial intent of the author of the author input data and the consumer data, wherein generating the output comprises:
preserving a contract subset of the author input data visual exemplar semantic expressions in the output; and
varying one or more semantic expressions not in the contract subset,
wherein the author input data visual exemplar comprises a visual exemplar selected from the group consisting of: a heading, a sidebar, a list, an outline, a stack, flowing content, a filmstrip, a grid, a comparison, a triptych, a collage, drill-down content, clustered content, gallery, text expressing title, text expressing heading, text expressing caption, text expressing block text, text expressing quotation, text expressing body text, and a visual exemplar demonstrating a relationship between text and media; and
wherein the author input data visual exemplar semantic expressions include at least one semantic expression selected from the group consisting of: hierarchy, drill-in, summarization, hyperlink, sidebar, continuity, grouping, uniformity, ordering, emphasis, showcase, text size, text with media, equality, media as background, caption, attribution, block text, quotation, body text, optional, and reveal; and
wherein the author input data visual exemplar semantic expressions comprises strict uniformity and strict ordering.

9. The method of claim 8, further comprising providing the output to a presentation device, wherein the consumer data comprises one or more presentation device characteristics selected from the group consisting of a resolution, a screen size, a dots-per-inch value, a touch screen characteristic, a paper quality characteristic, and an accessibility characteristic.

10. The method of claim 8, wherein the consumer data comprises data selected from the group consisting of: distance-to-screen data, presentation mode data, kiosk data, and autoplay data.

11. The method of claim 8, further comprising:
obtaining style data,
wherein generating the output is further based on the style data.

12. The method of claim 11, wherein the style data comprises data selected from the group consisting of: typography data, color data, decorator data, layout data, and animation data.

13. The method of claim 8, wherein obtaining the author input data comprises:
causing a plurality of visual exemplars to be presented to a user at the user interface, the plurality of visual exemplars including the author input data visual exemplar.

14. The method of claim 13, wherein causing the plurality of visual exemplars to be presented to the user comprises:
causing a first visual exemplar of the plurality of visual exemplars to be presented to the user at the user interface, the first visual exemplar associated with one or more first semantic expressions; and
causing a second visual exemplar of the plurality of visual exemplars to be presented to the user at the user interface, the second visual exemplar associated with second semantic expressions,
wherein the second semantic expressions vary from the one or more first semantic expressions by a single semantic expression.

15. The method of claim 14,
wherein the second semantic expressions comprise uniformity and loose continuity;
wherein the one or more first semantic expressions comprise uniformity and tight continuity;
wherein uniformity expresses an extent of homogeneity of one or more of: content size, content rotation, and content alignment, to be maintained in content when generating output; and
wherein continuity expresses an extent to which content is to be separated when generating output.

16. A non-transitory computer-readable medium comprising computer-executable instructions stored thereon that, when executed by a processor, cause the processor to:
cause a plurality of visual exemplars to be presented to a user at a user interface;
receive a selection of a first visual exemplar from the plurality of visual exemplars over the user interface with which to express one or more content elements;
identify a set of semantic expressions associated with the first visual exemplar, wherein the set of semantic expressions comprises two or more semantic expressions;
identify a contract subset of the set of semantic expressions;
identify a non-contract subset of the set of semantic expressions, wherein the non-contract subset is disjoint with the contract subset; and
generate an output that communicates content data based on the contract subset and varies at least one semantic expression in the non-contract subset,
wherein the first visual exemplar comprises a visual exemplar selected from the group consisting of: a heading, a sidebar, a list, an outline, a stack, flowing content, a filmstrip, a grid, a comparison, a triptych, a collage, drill-down content, clustered content, gallery, text expressing title, text expressing heading, text expressing caption, text expressing block text, text expressing quotation, text expressing body text, and a visual exemplar demonstrating a relationship between text and media;

wherein the set of semantic expressions includes at least one semantic expression selected from the group consisting of: hierarchy, drill-in, summarization, hyperlink, sidebar, continuity, grouping, uniformity, ordering, emphasis, showcase, text size, text with media, equality, media as background, caption, attribution, block text, quotation, body text, optional, and reveal; and wherein the set of semantic expressions comprises strict uniformity and strict ordering.

17. The non-transitory computer-readable medium of claim 16, wherein of generating the output comprises:

selecting a second visual exemplar for the content data, the second visual exemplar associated with the contract subset and varying at least one semantic expression not in the contract subset, wherein the output communicates the content data using the second visual exemplar.

18. The non-transitory computer-readable medium of claim 16, wherein the set of semantic expressions comprises continuity and uniformity;

wherein uniformity expresses an extent of homogeneity of one or more of: content size, content rotation, and content alignment, to be maintained in content when generating output; and wherein continuity expresses an extent to which content is to be separated when generating output.

19. The non-transitory, computer-readable medium of claim 16, wherein the first visual exemplar represents an editorial intent of an author of the author input data.

20. The non-transitory, computer-readable medium of claim 16, wherein the instructions further cause the processor to obtain consumer data, wherein generating the output is based, in part, on the obtained consumer data.

* * * * *